United States Patent [19]
Nishio

[11] Patent Number: 5,523,888
[45] Date of Patent: Jun. 4, 1996

[54] ZOOM LENS

[75] Inventor: Akihiro Nishio, Kanagawa-ken, Japan

[73] Assignee: Canon Kabushiki Kaisha, Tokyo, Japan

[21] Appl. No.: 297,833

[22] Filed: Aug. 30, 1994

[30] Foreign Application Priority Data

Sep. 3, 1993 [JP] Japan .................................. 5-243837
Nov. 25, 1993 [JP] Japan .................................. 5-318968

[51] Int. Cl.$^6$ .................................................. G02B 15/14
[52] U.S. Cl. .................................................. 359/686
[58] Field of Search .................................. 359/683, 686, 359/676

[56] References Cited

U.S. PATENT DOCUMENTS

| | | | |
|---|---|---|---|
| 4,756,609 | 7/1988 | Estelle | 359/686 |
| 4,787,718 | 11/1988 | Cho | 359/686 |
| 5,111,338 | 5/1992 | Nakayama | 359/686 |
| 5,264,965 | 11/1993 | Hirakawa | 359/686 |

FOREIGN PATENT DOCUMENTS

| | | |
|---|---|---|
| 272316 | 3/1990 | Japan . |
| 3249614 | 11/1991 | Japan . |
| 3282409 | 12/1991 | Japan . |
| 437810 | 2/1992 | Japan . |
| 476511 | 3/1992 | Japan . |

Primary Examiner—Scott J. Sugarman
Attorney, Agent, or Firm—Fitzpatrick, Cella, Harper & Scinto

[57] ABSTRACT

A zoom lens comprising, from front to rear, a first lens unit of negative refractive power, a second lens unit of positive refractive power, a third lens unit of positive refractive power and a fourth lens unit of negative refractive power, zooming being performed by varying each separation between the first to fourth lens units in such a manner that, as compared with the wide-angle end, when in the telephoto end, the separations between the first and second lens units and between the third and fourth lens units are shorter and the separation between the second and third lens units is longer, satisfying the following conditions:

$$D1w-D1t<D2t-D2w$$

where $D1w$ and $D1t$ are the separations for the wide-angle end and the telephoto end between the first and second lens units, respectively, and $D2w$ and $D2t$ are the separations for the wide-angle end and the telephoto end between the second and third lens units, respectively.

8 Claims, 34 Drawing Sheets

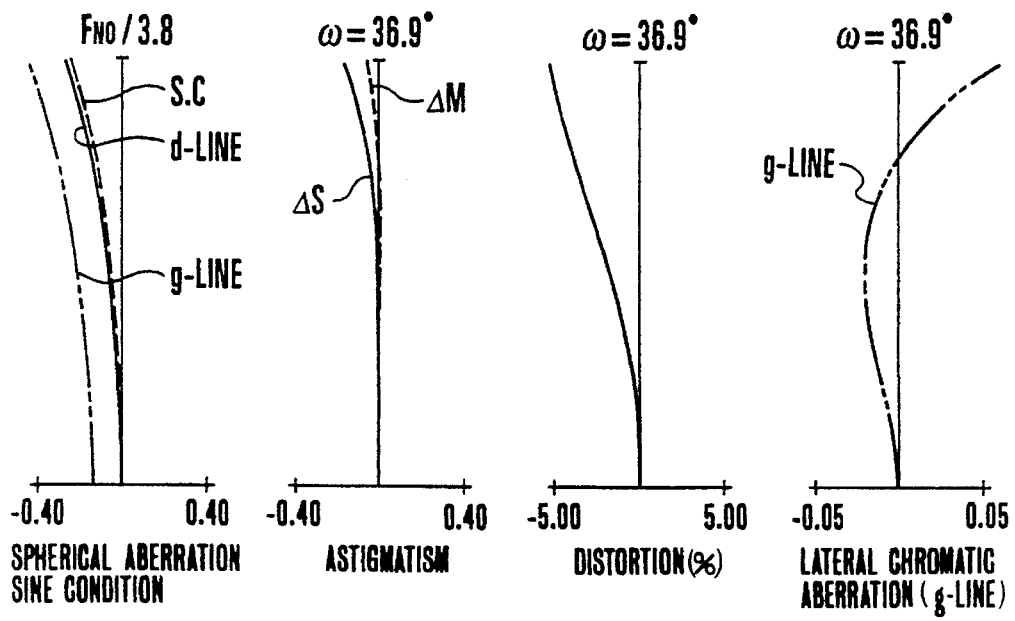
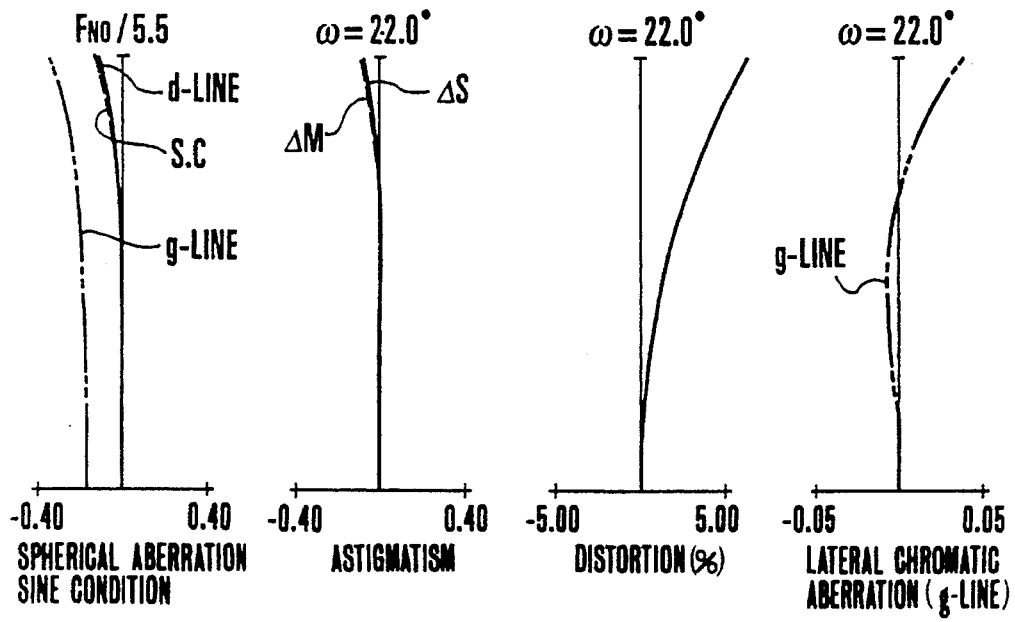

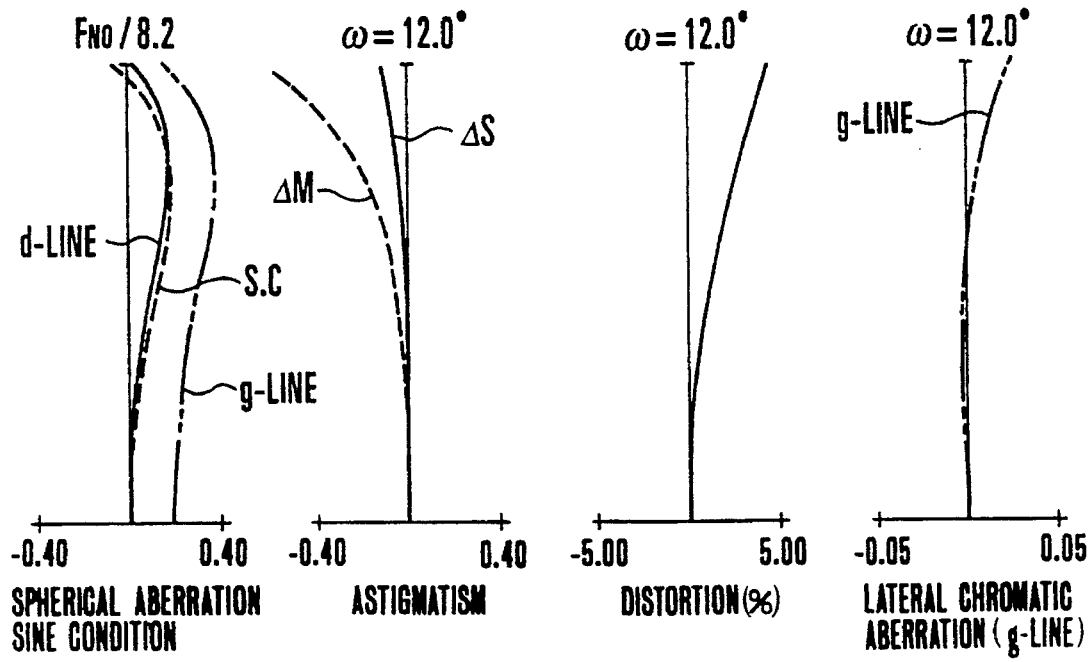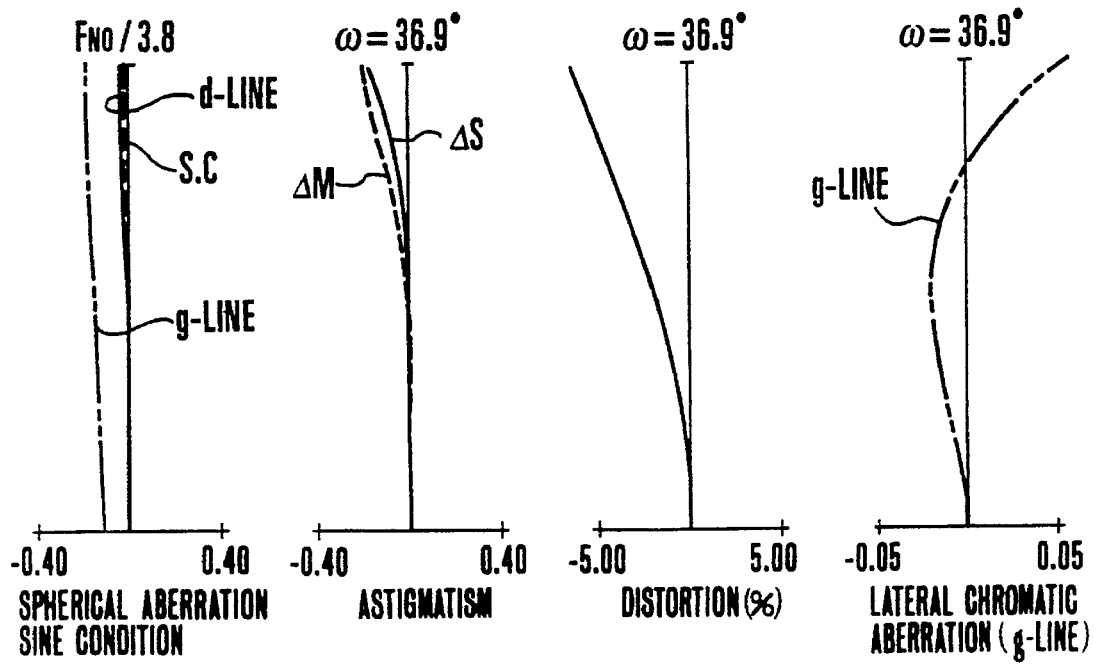

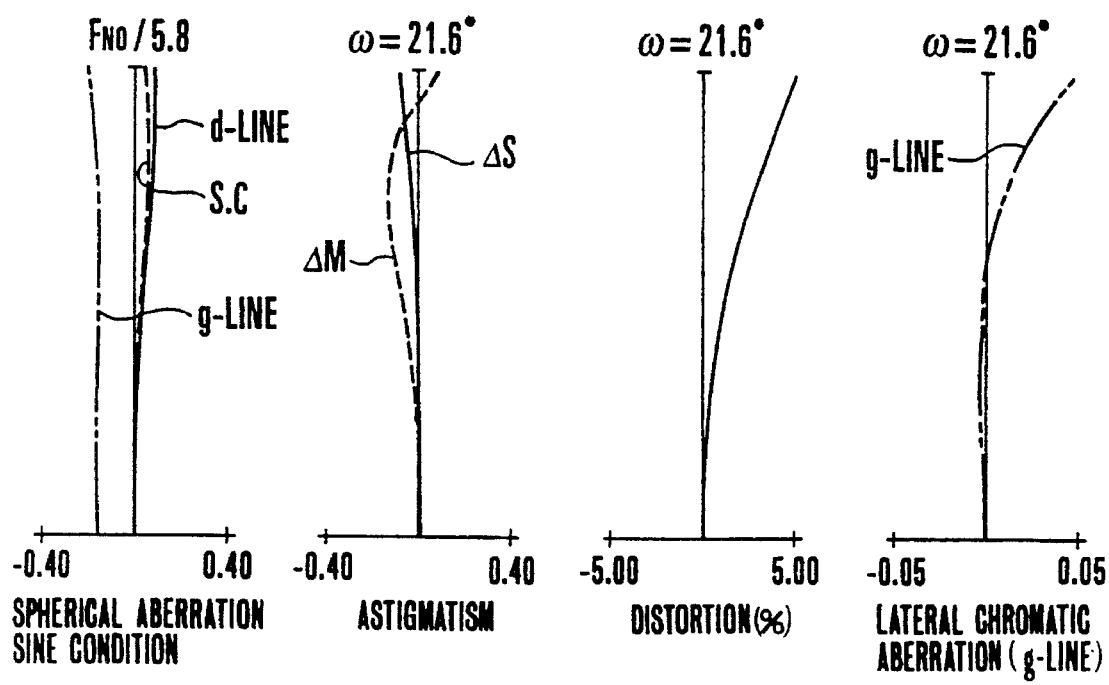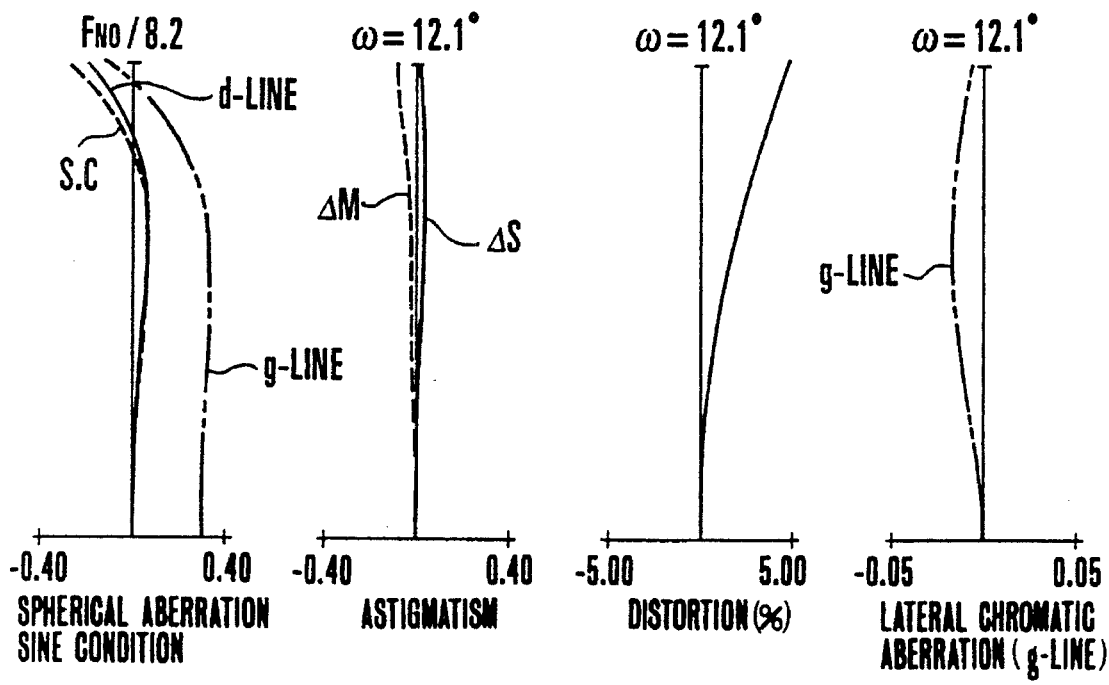

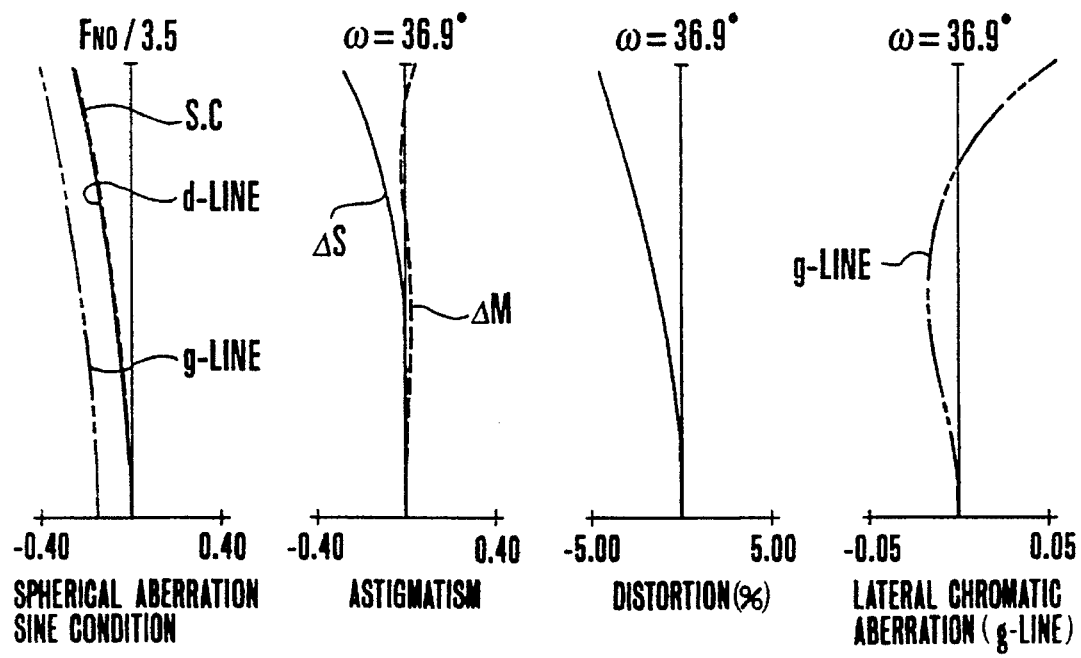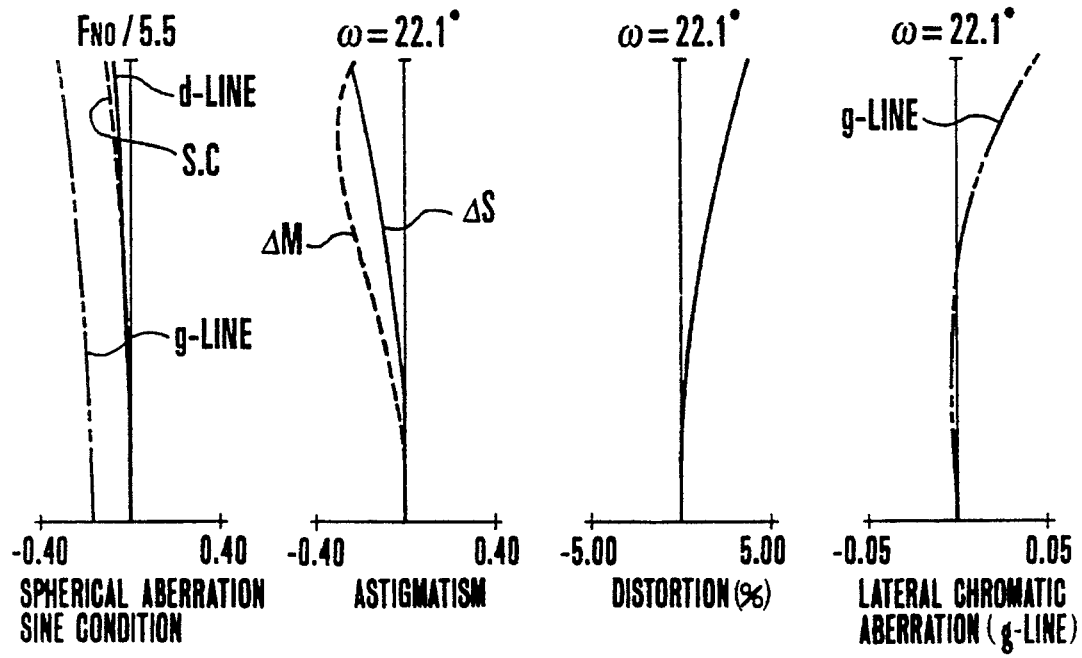

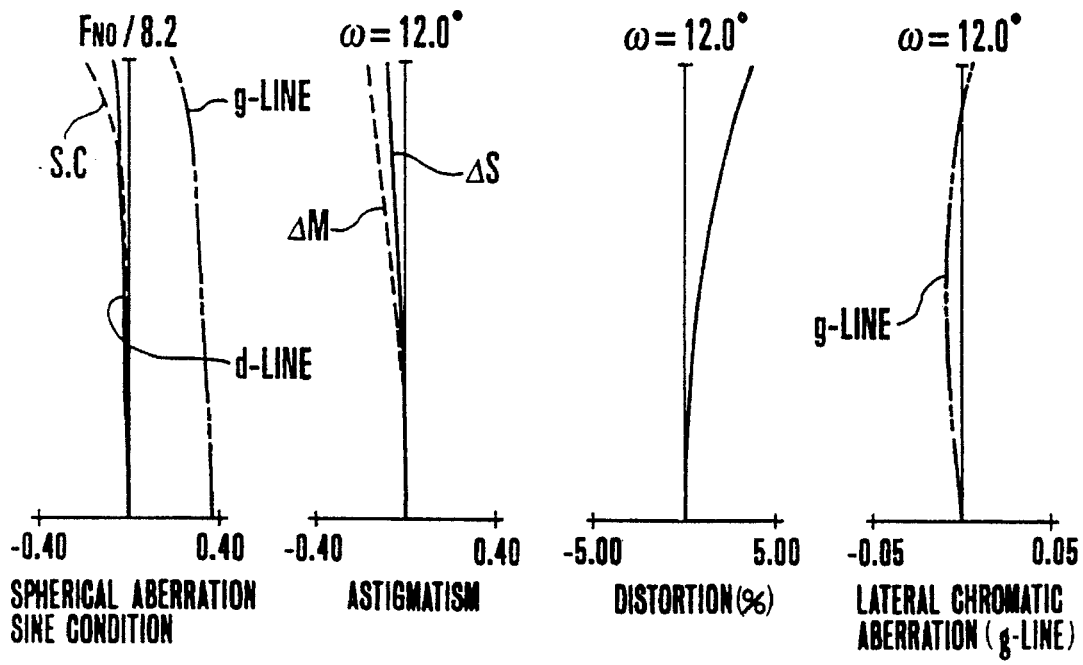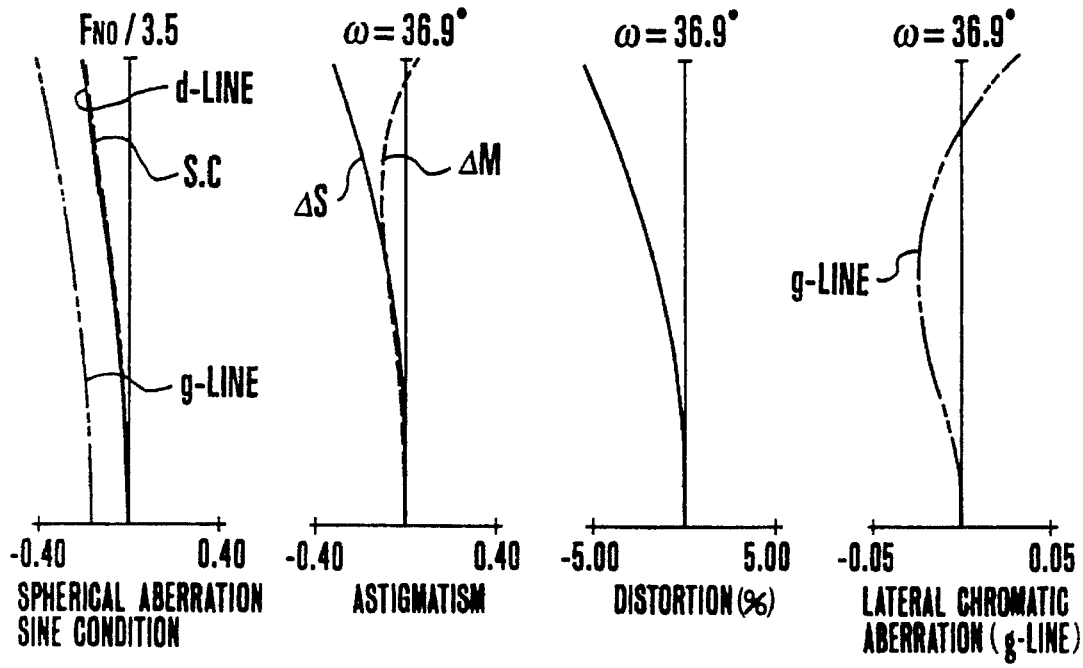

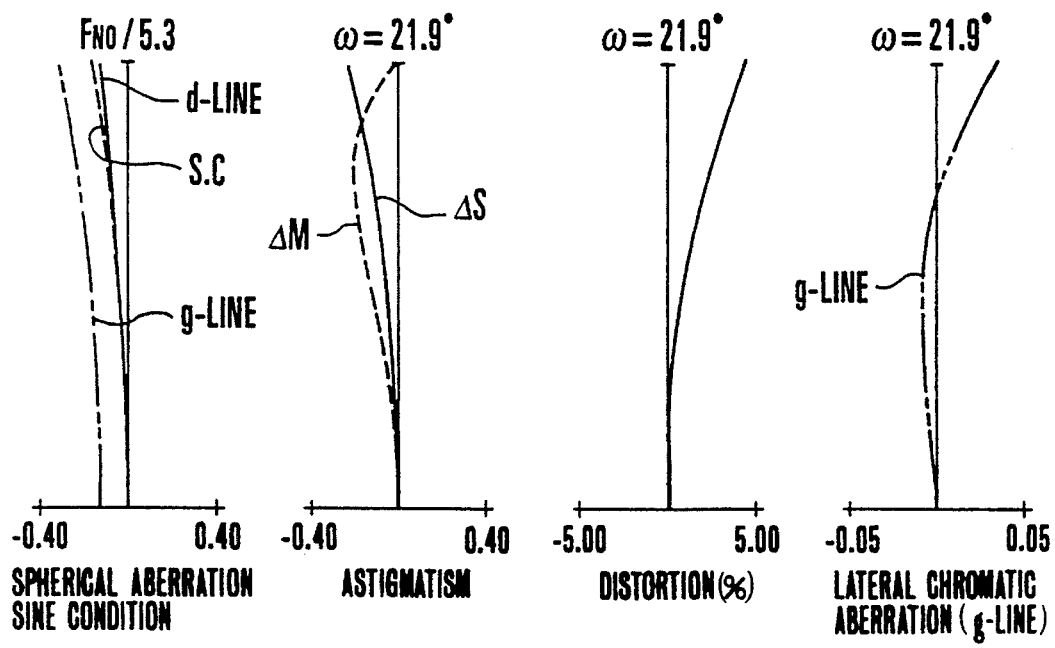
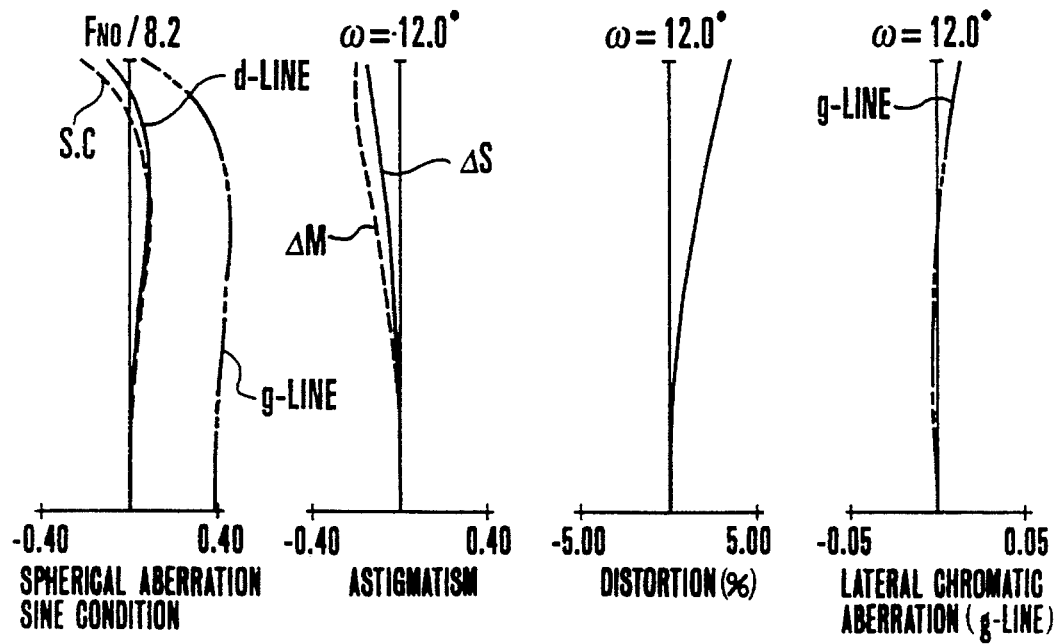

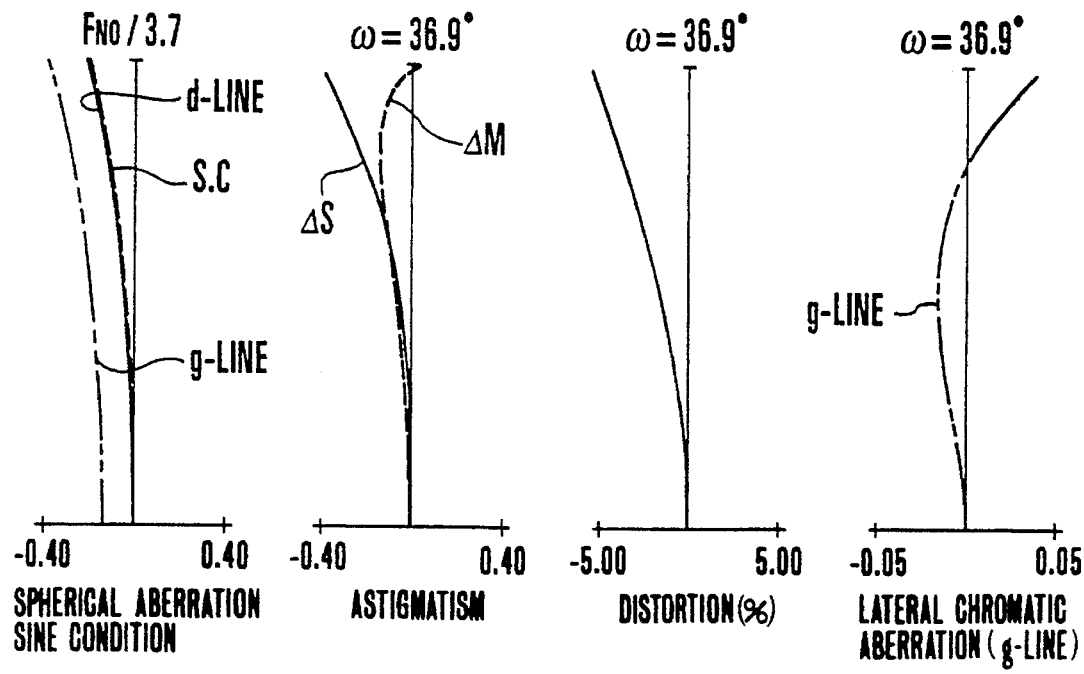
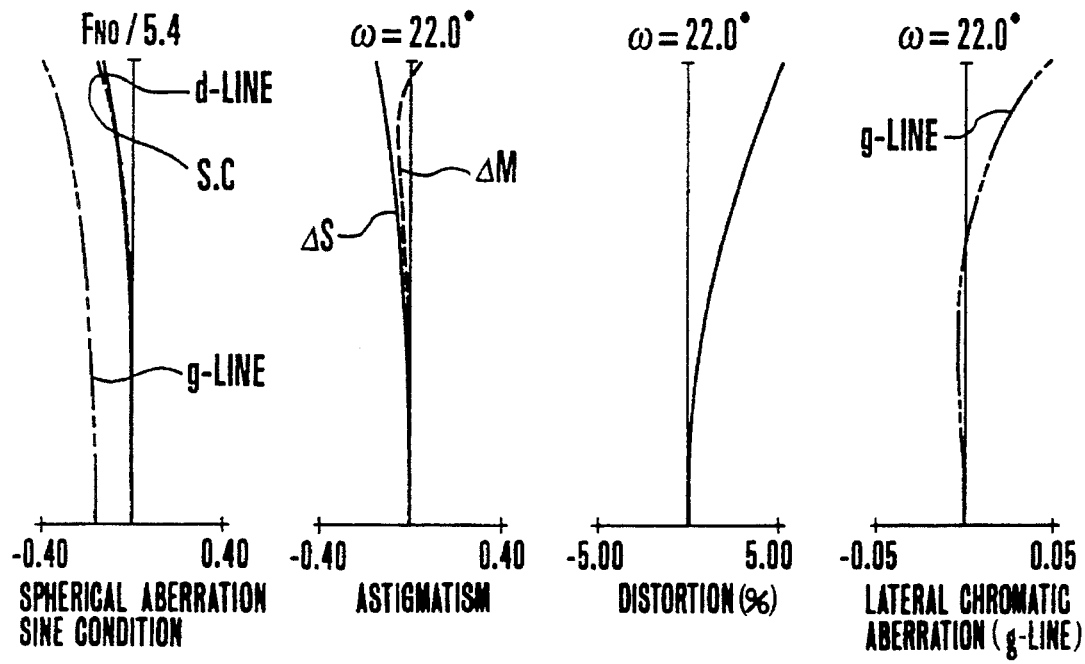

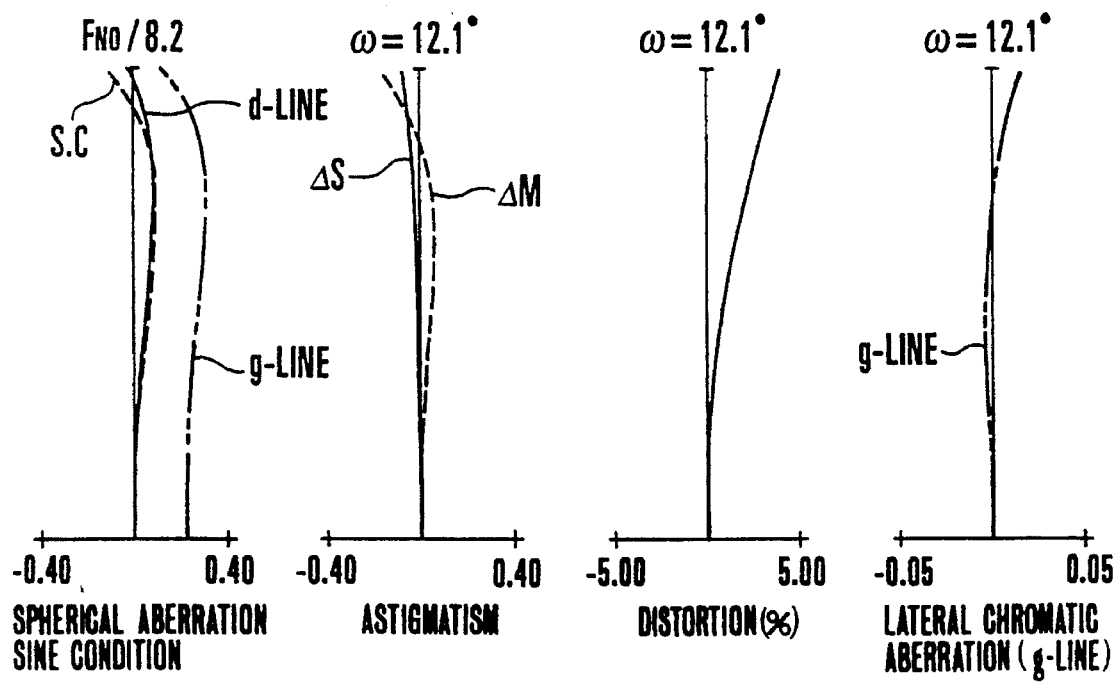
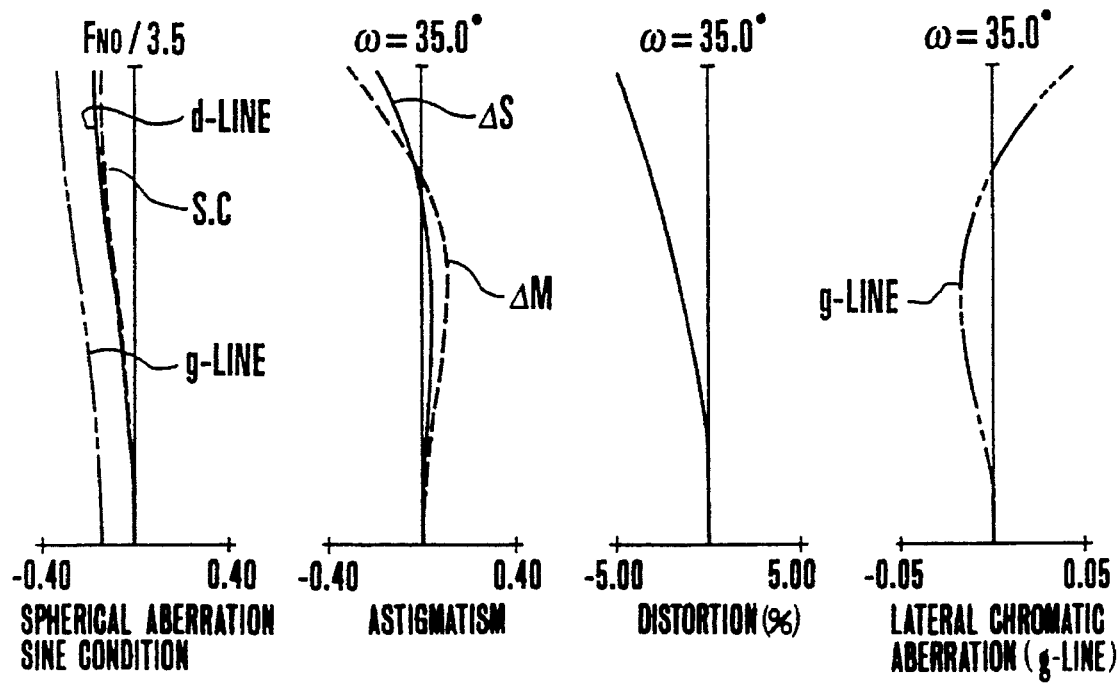

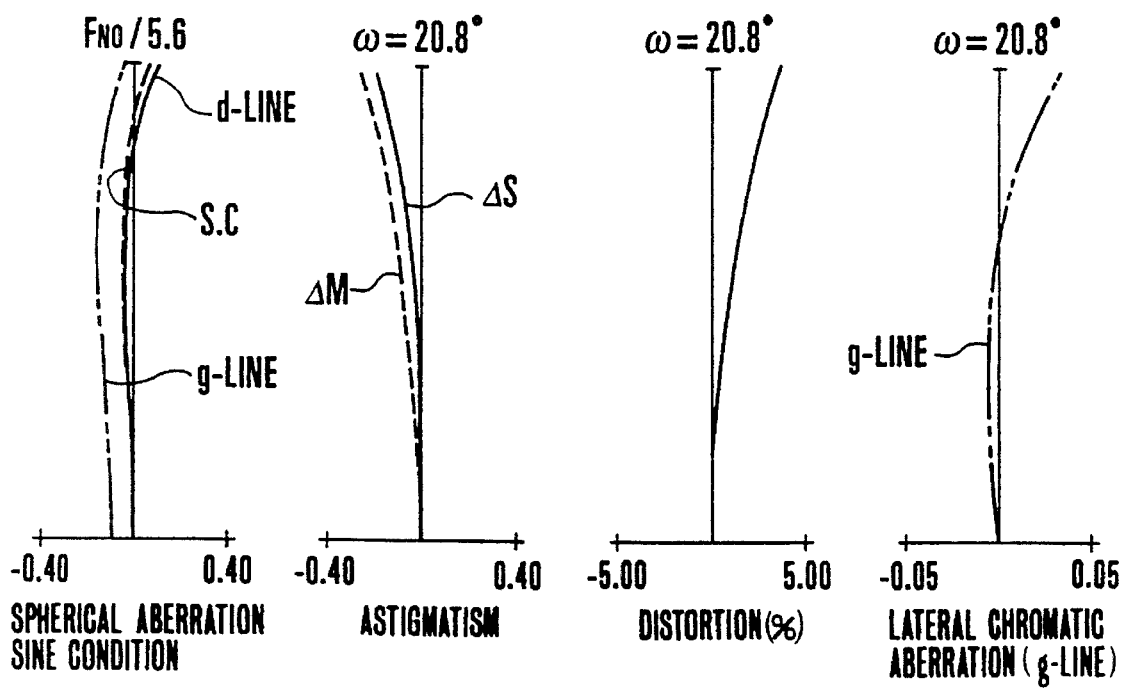
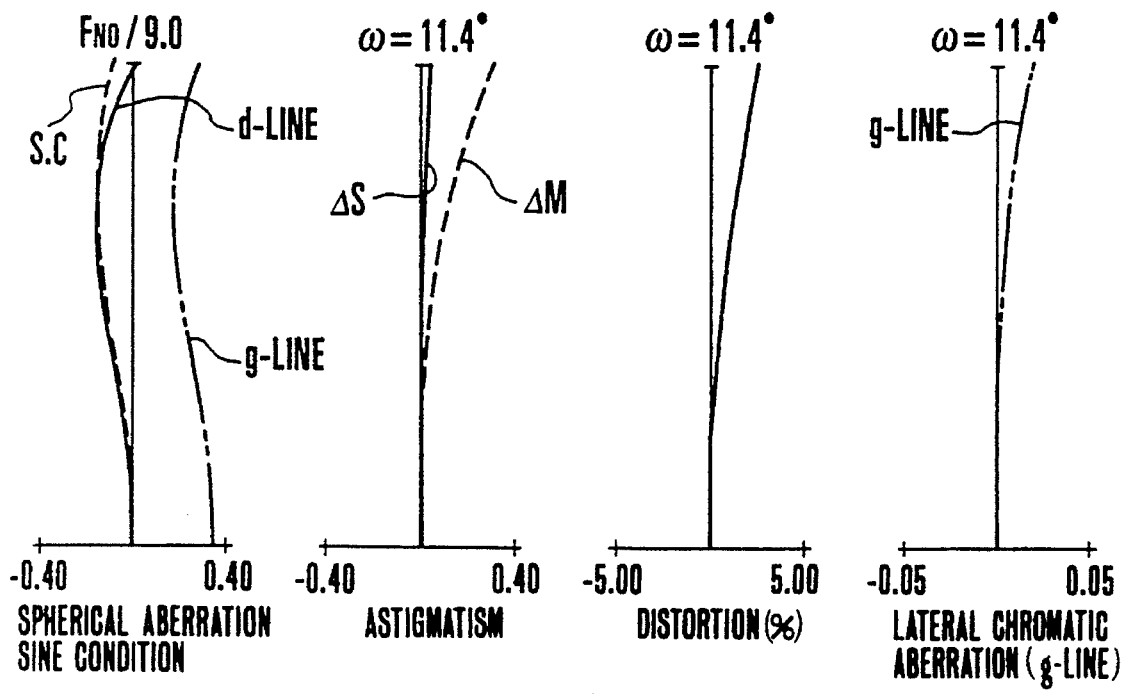

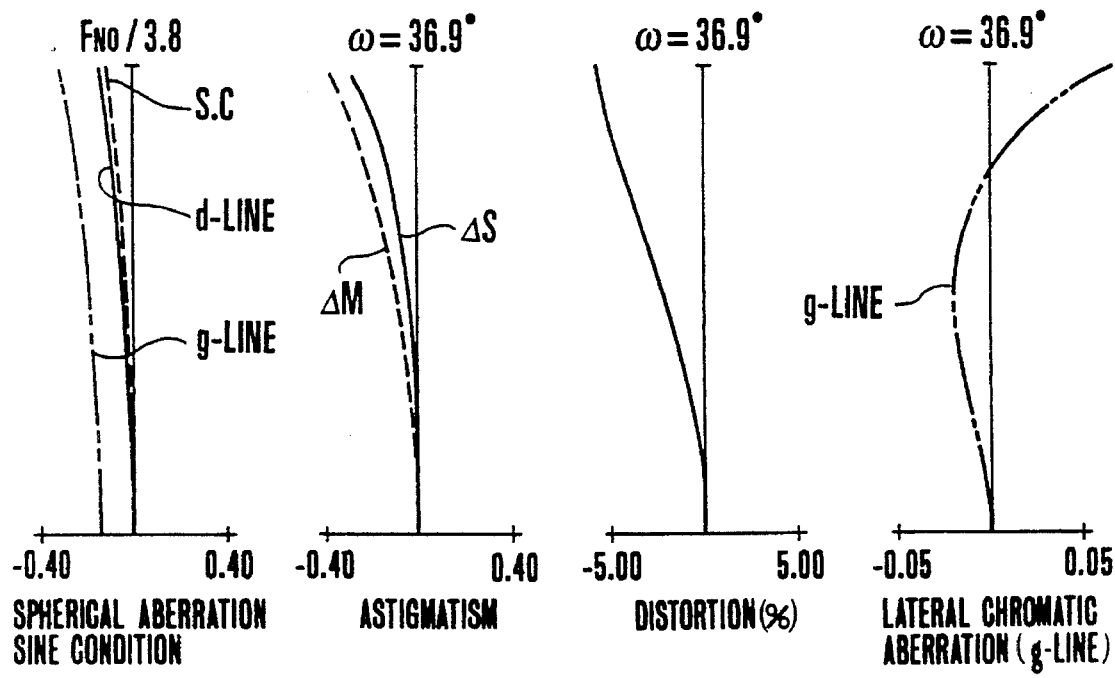
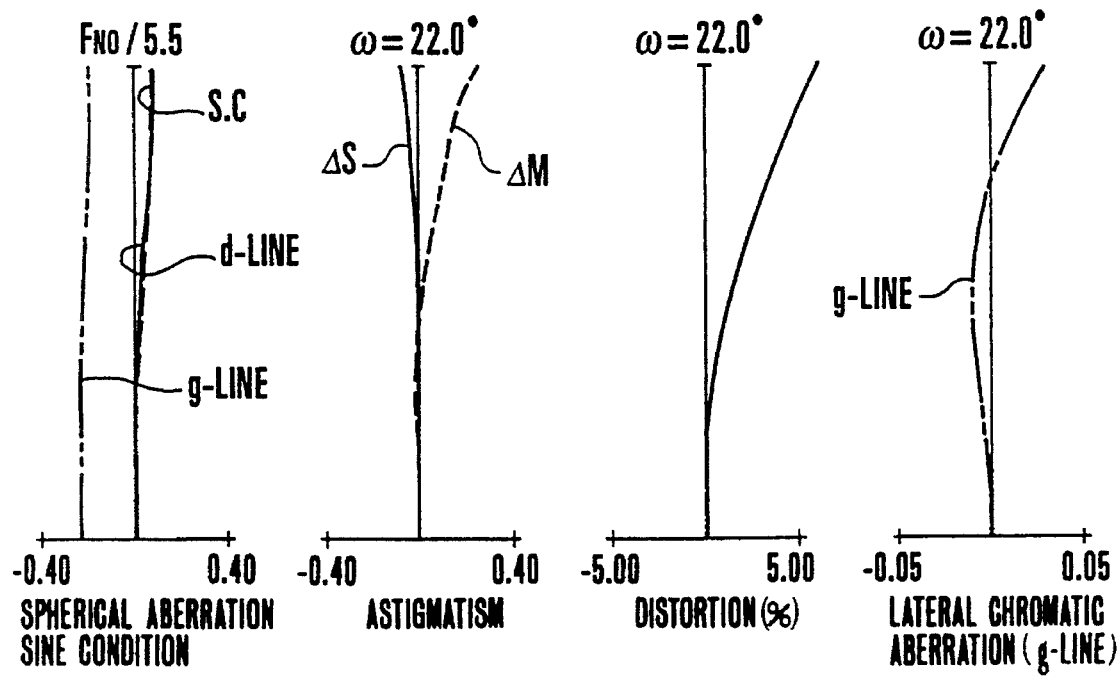

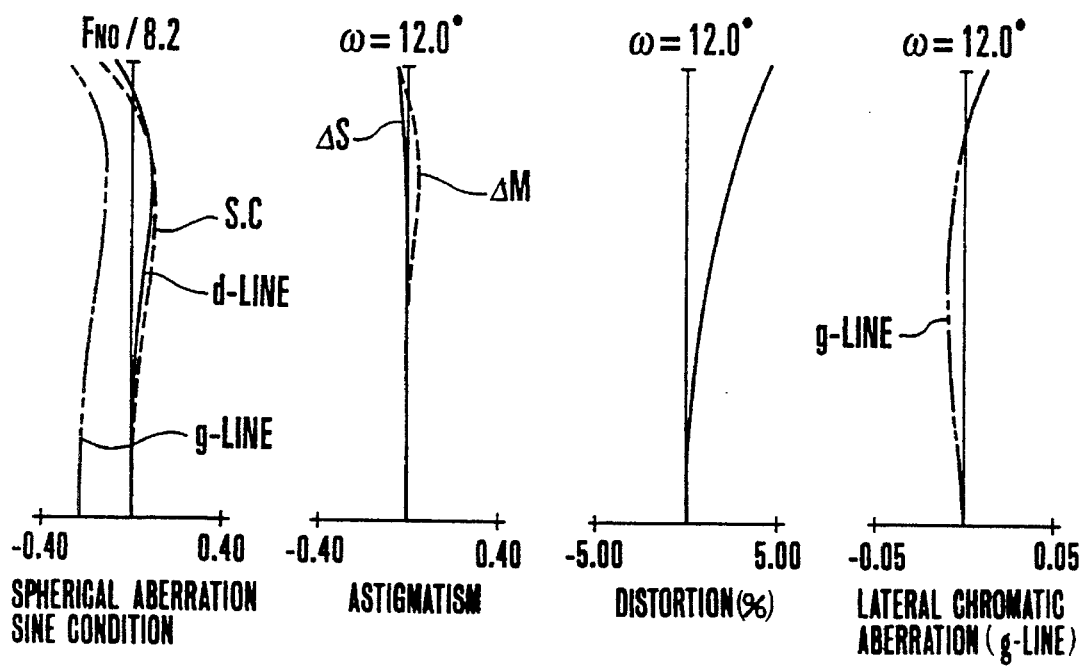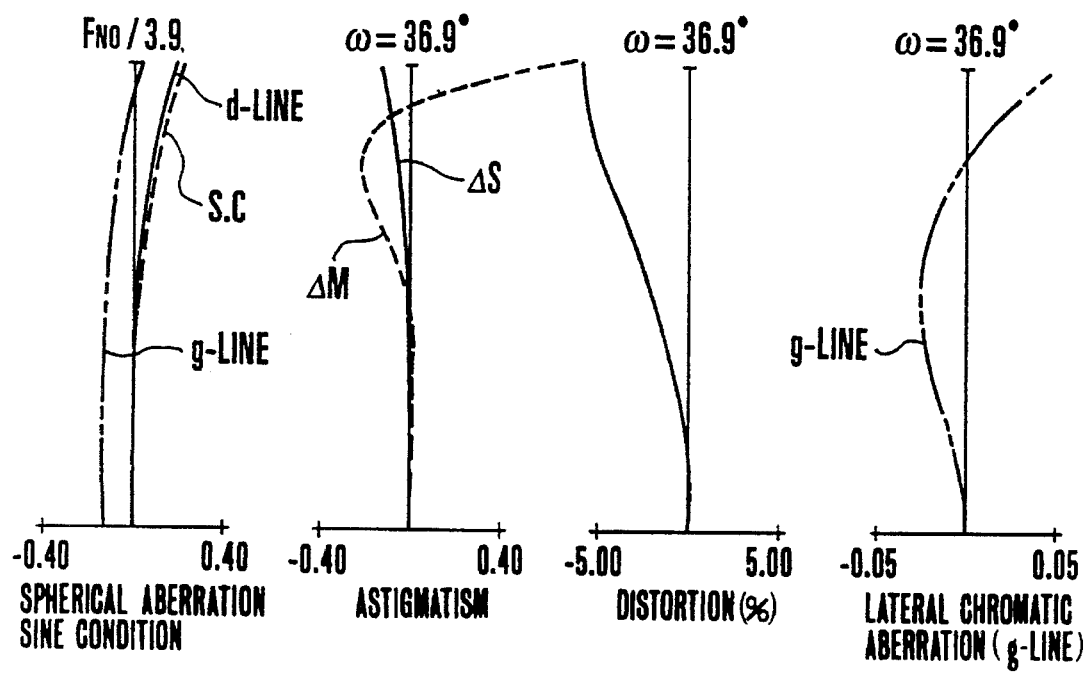

FIG. 33A  FIG. 33B  FIG. 33C  FIG. 33D
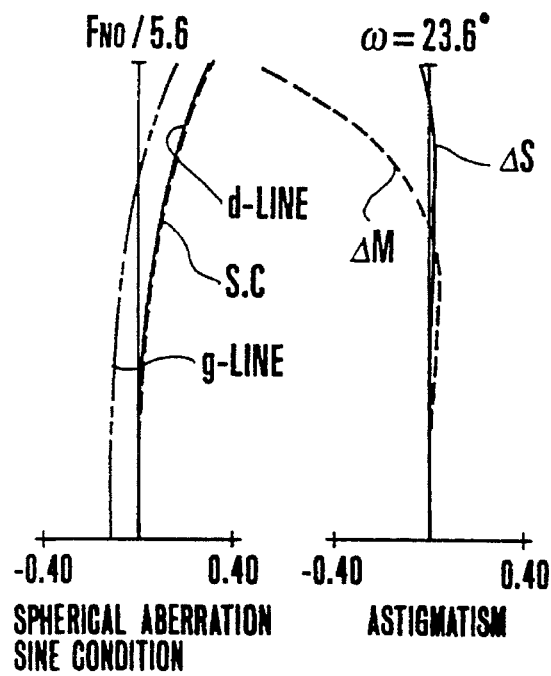
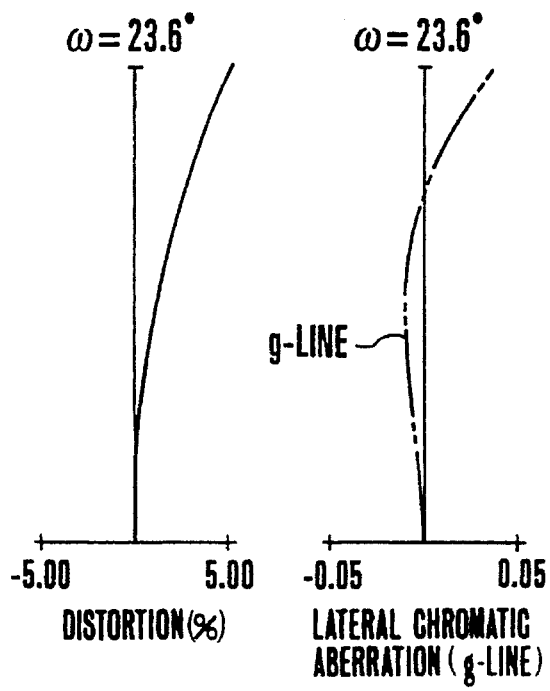
FIG. 34A  FIG. 34B  FIG. 34C  FIG. 34D
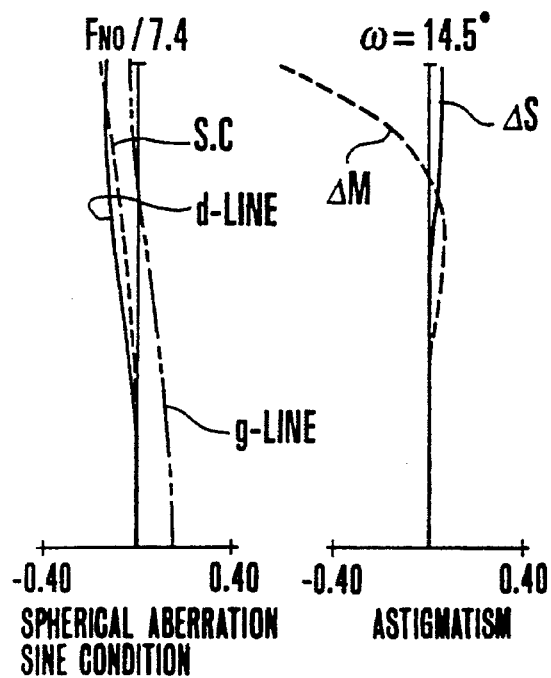
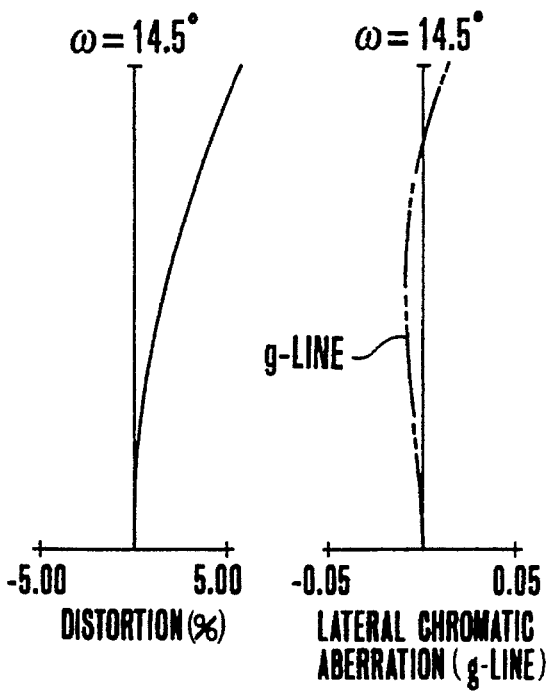

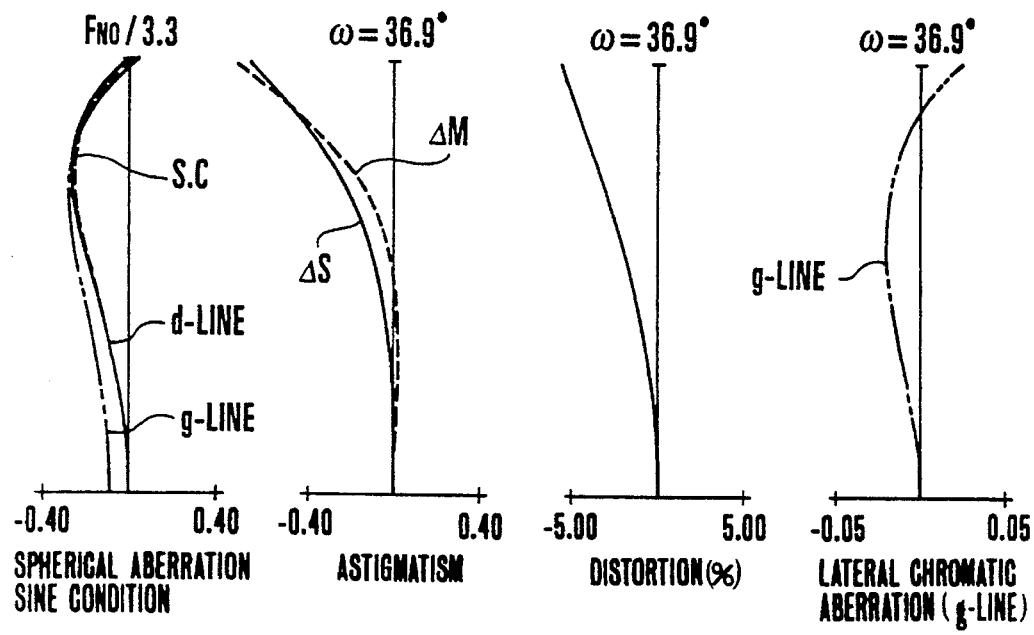
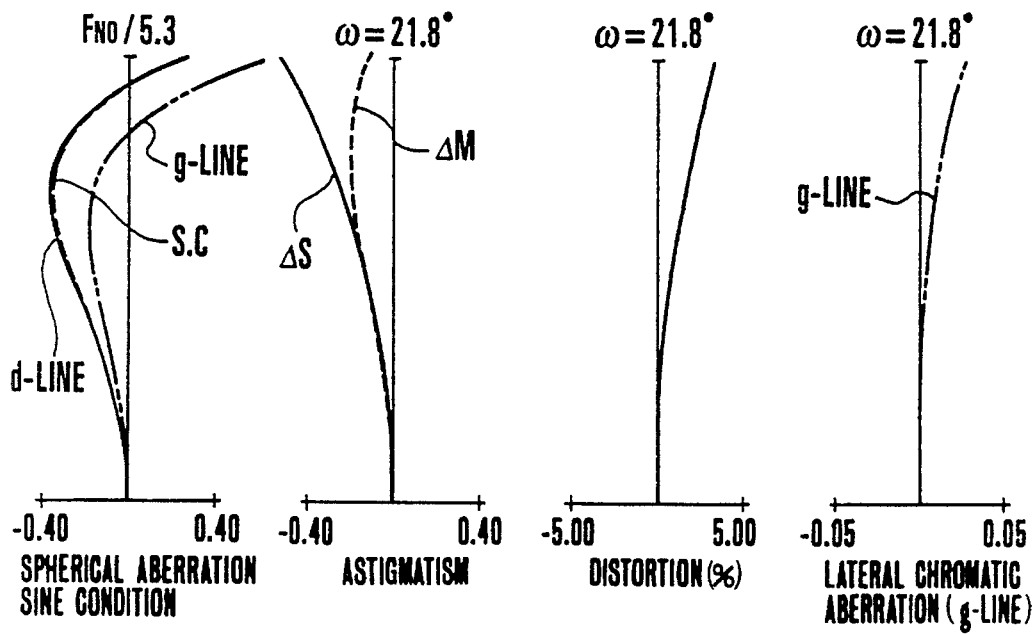

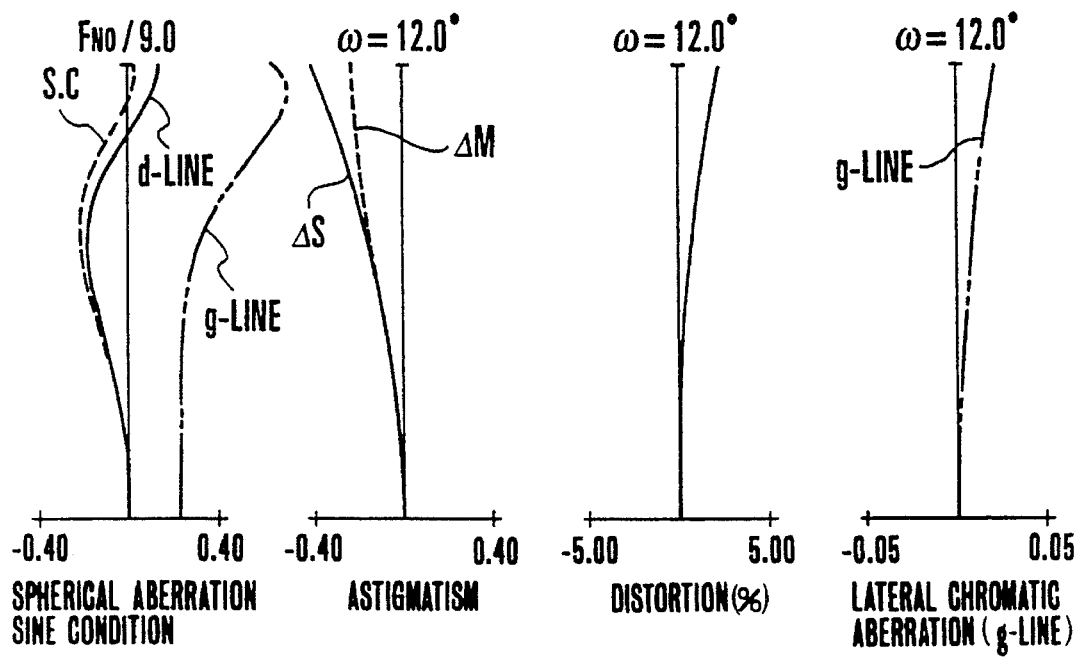

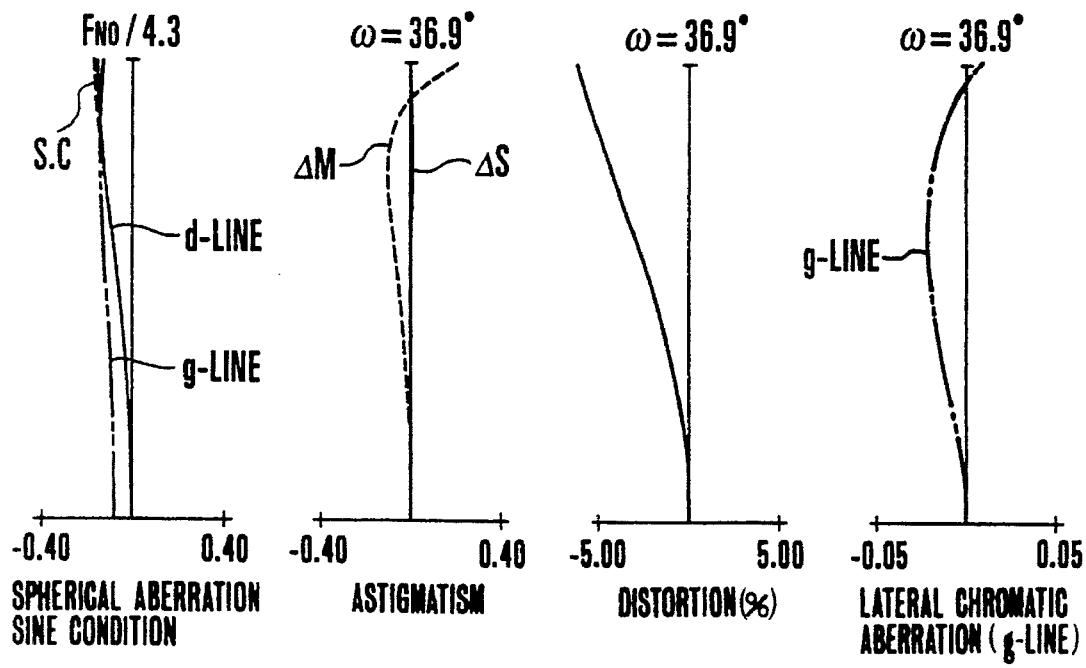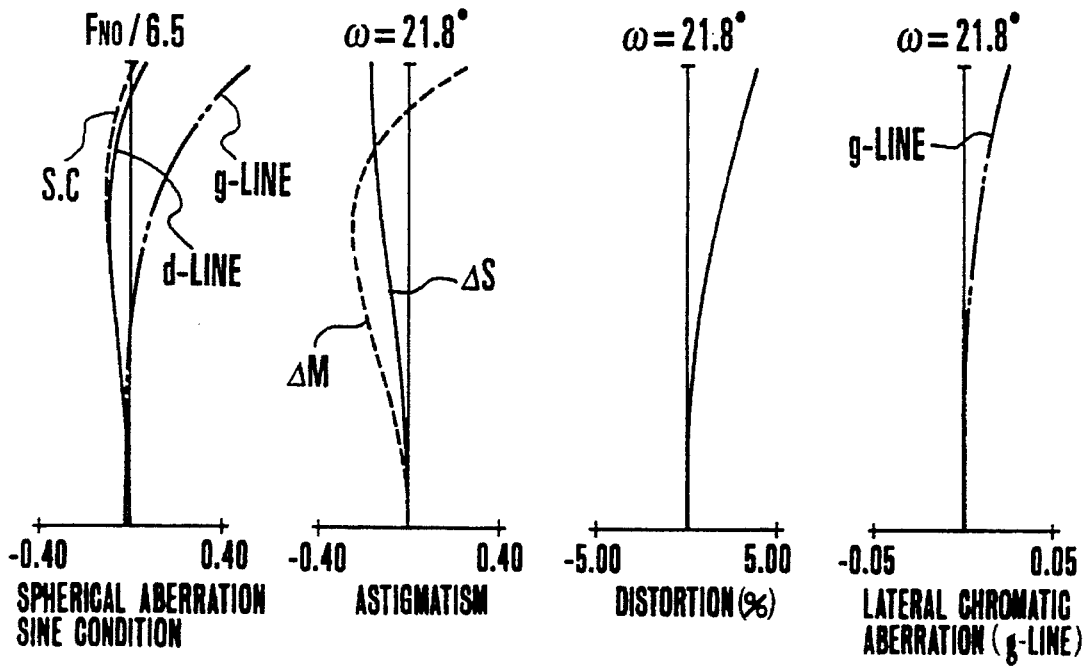

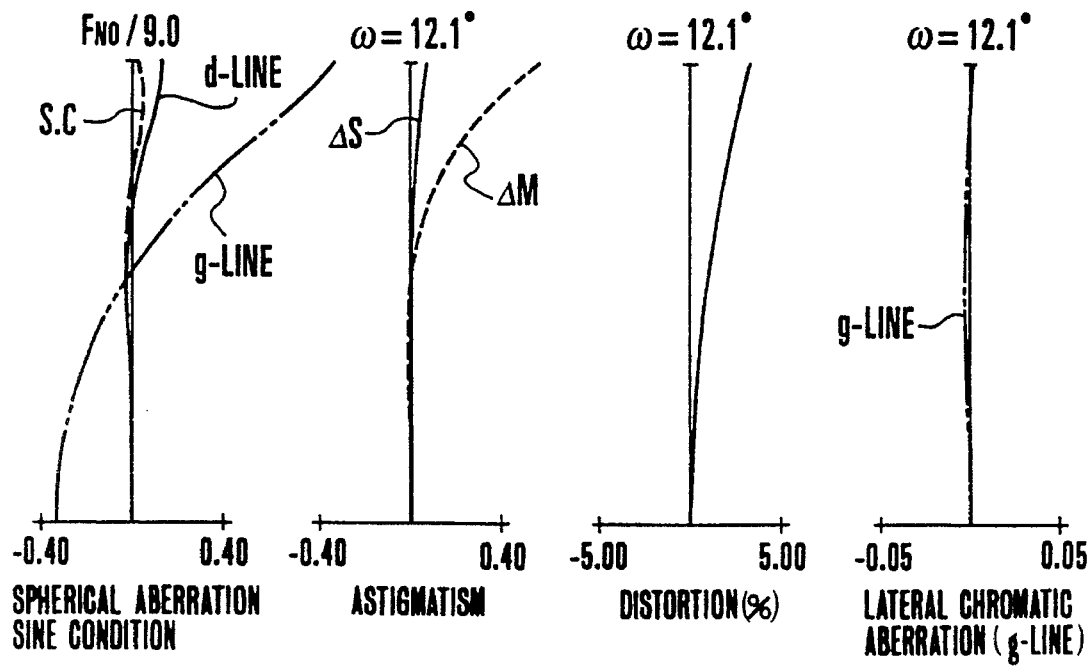
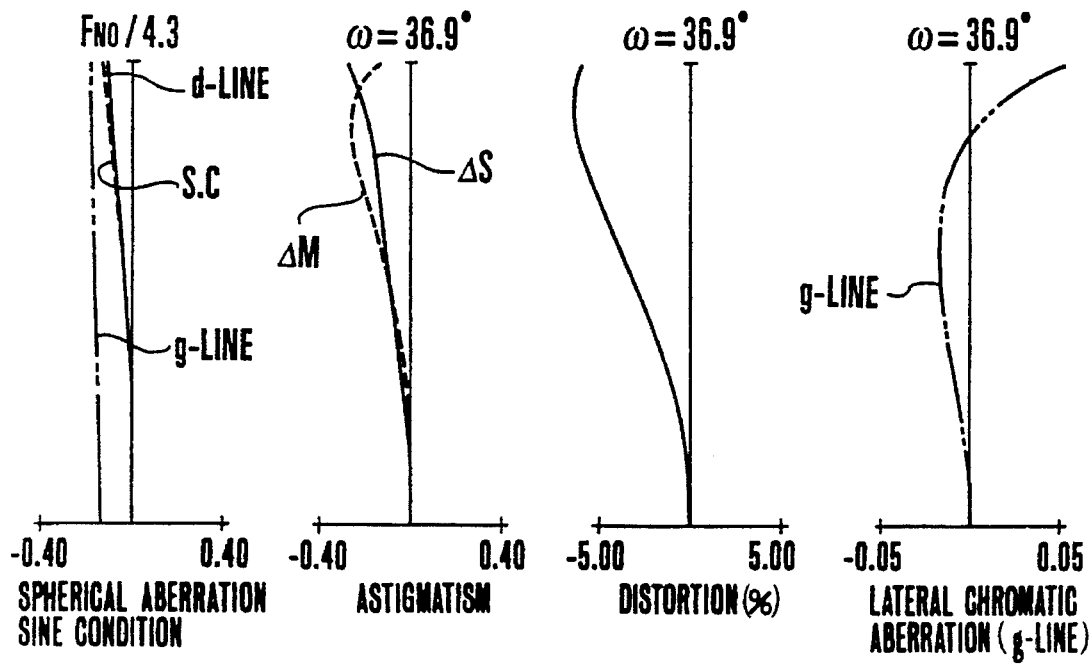

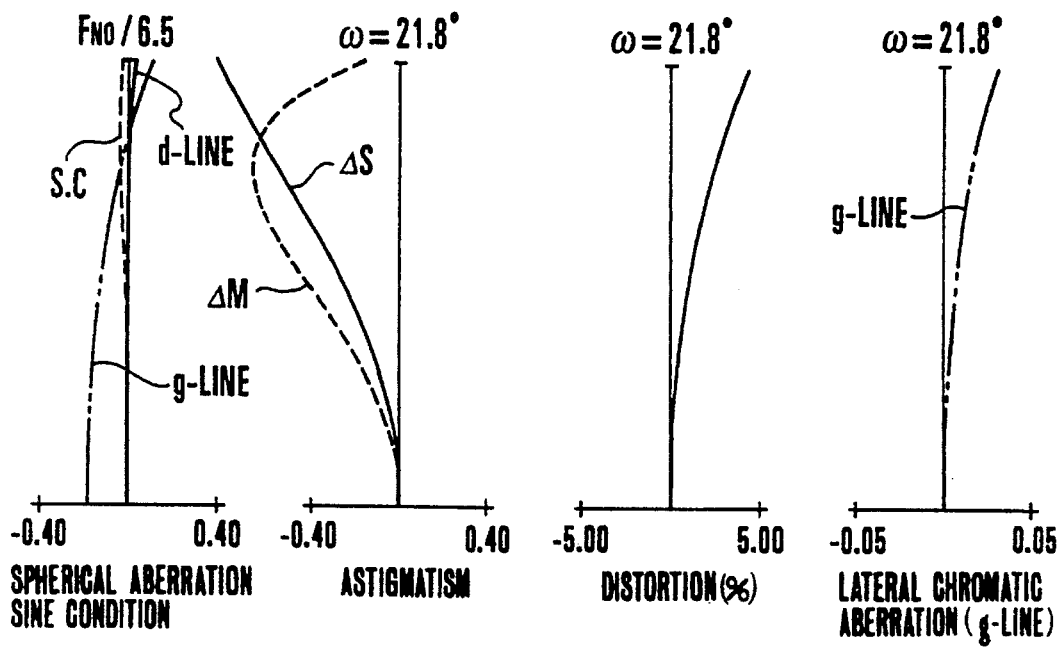
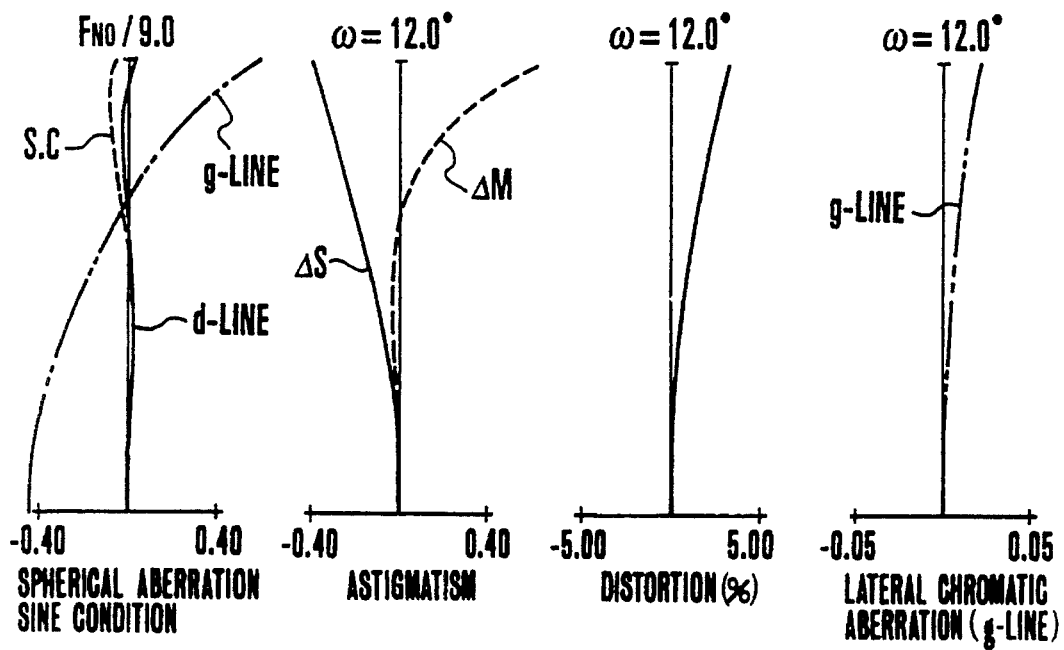

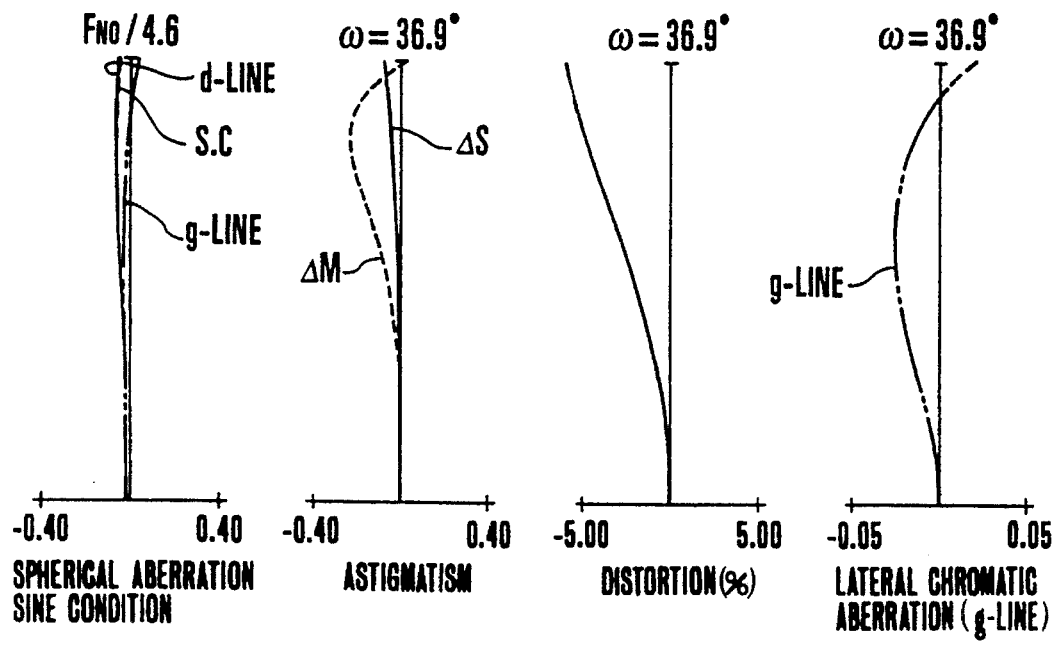
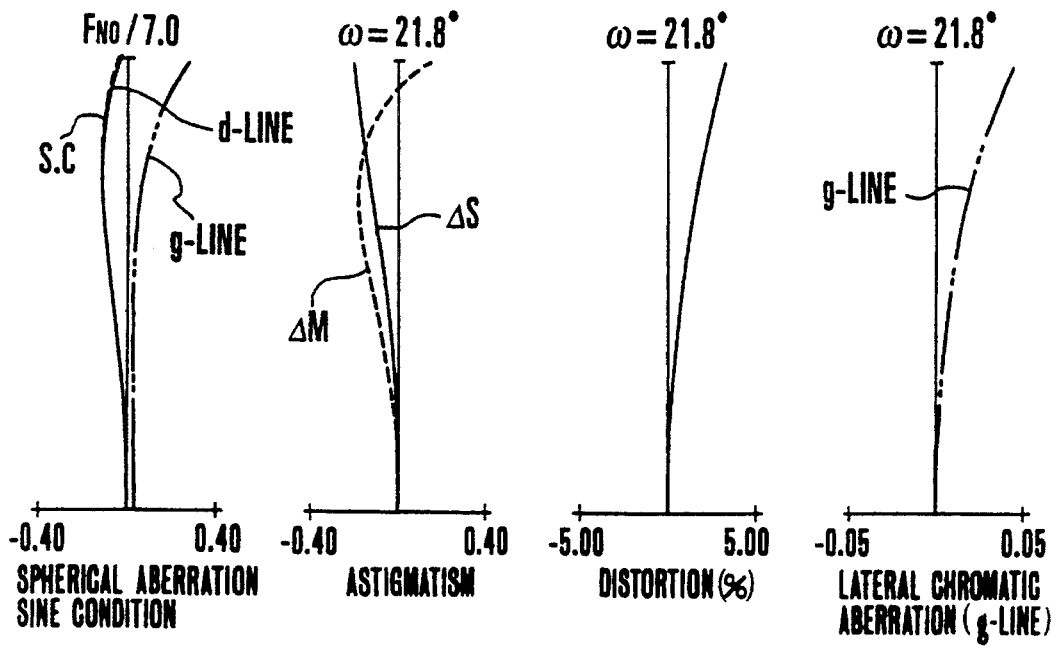

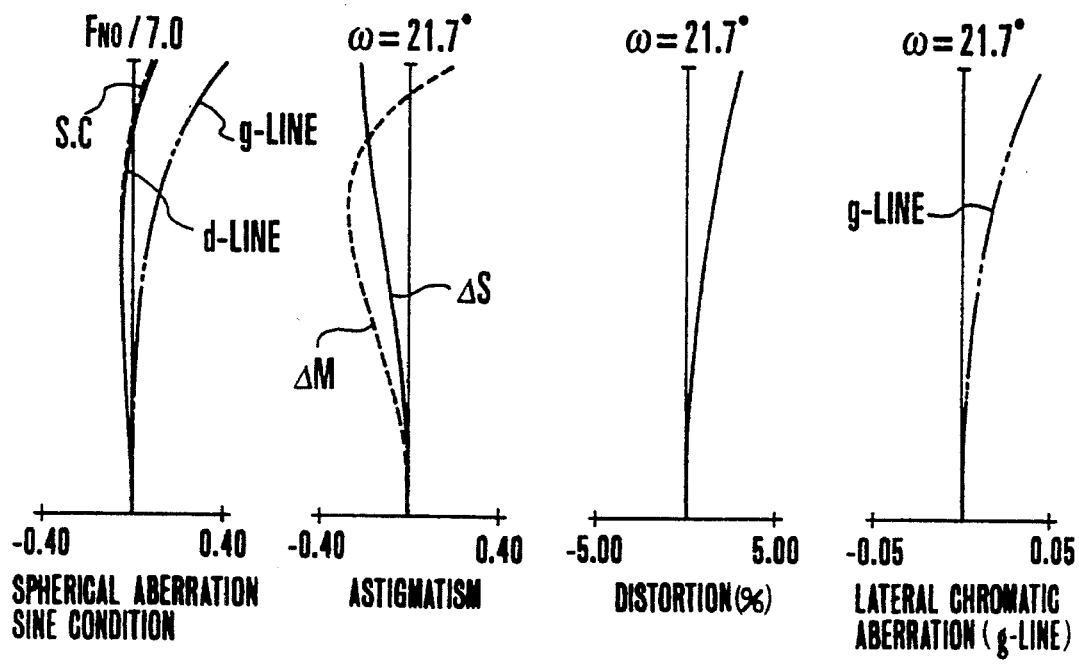
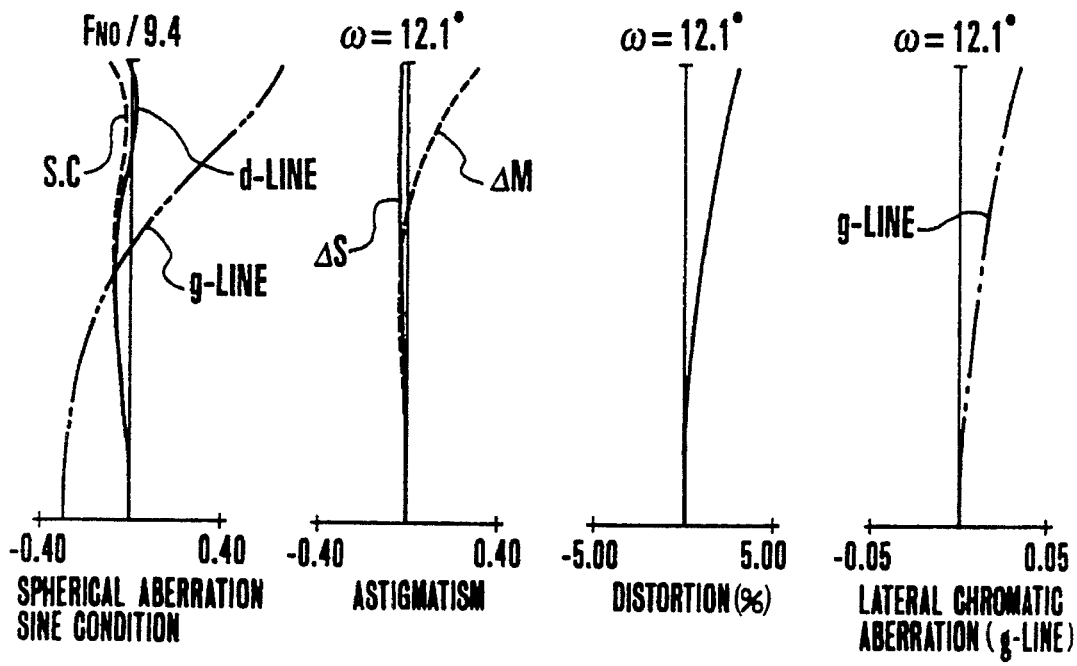

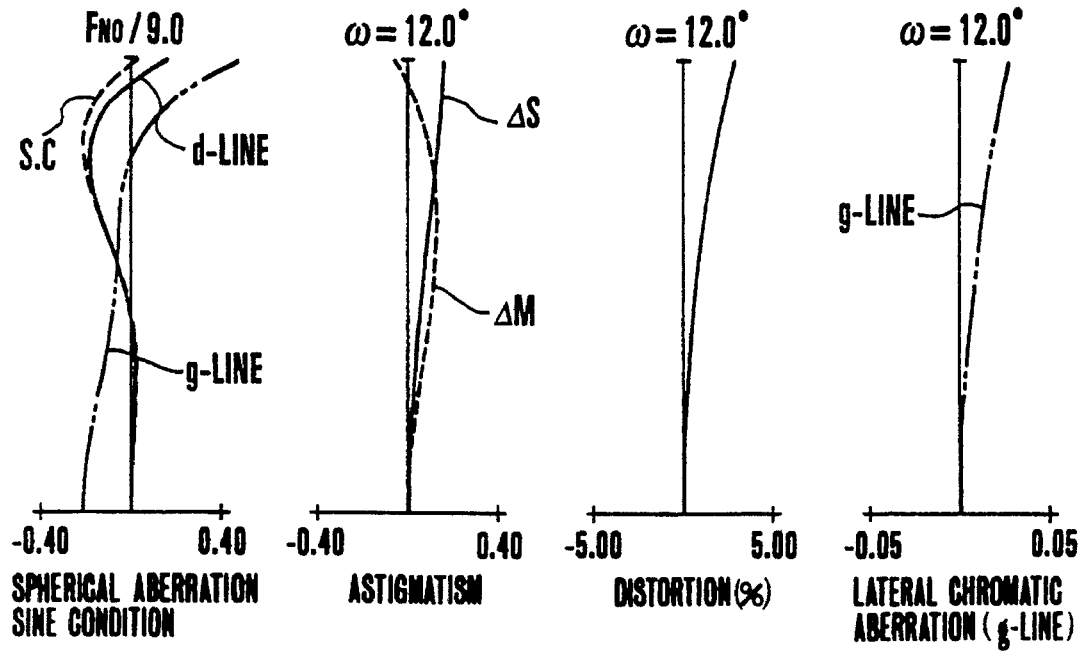
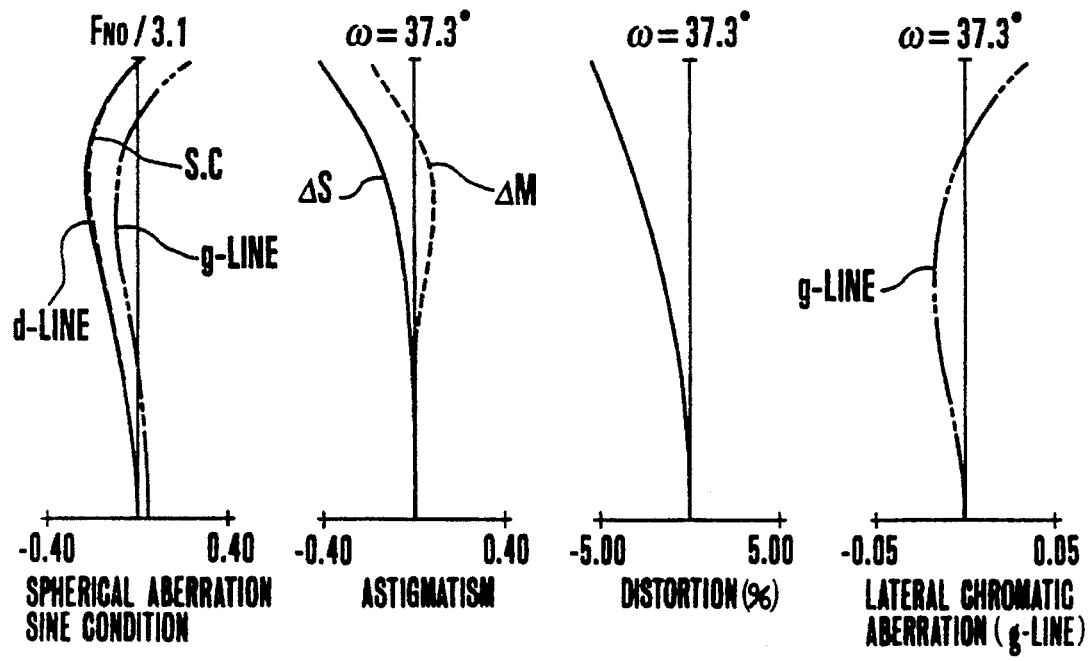

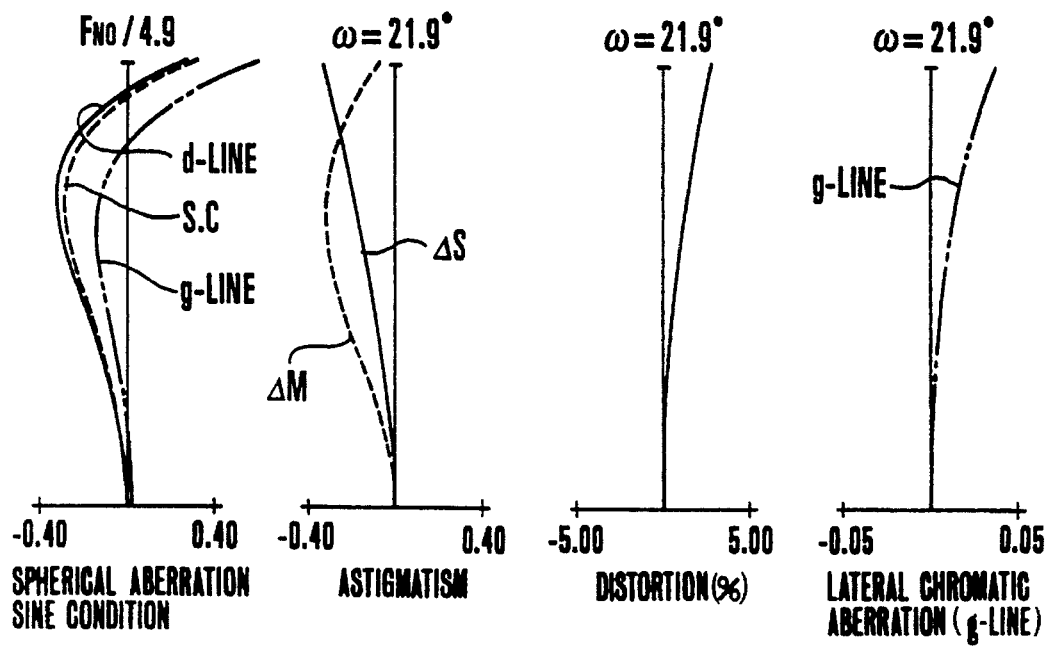
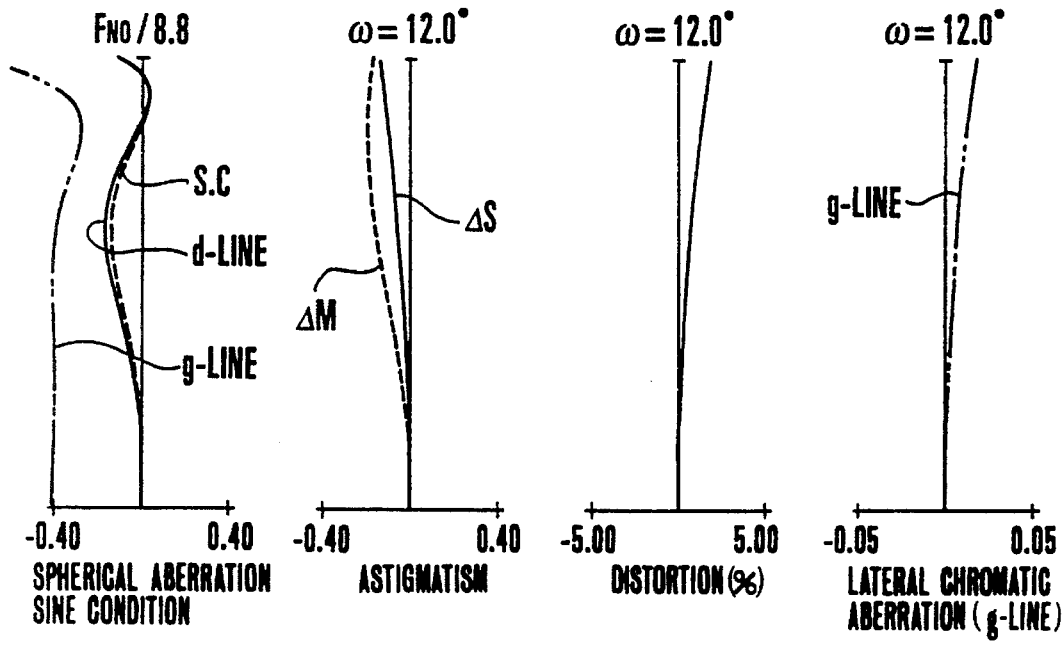

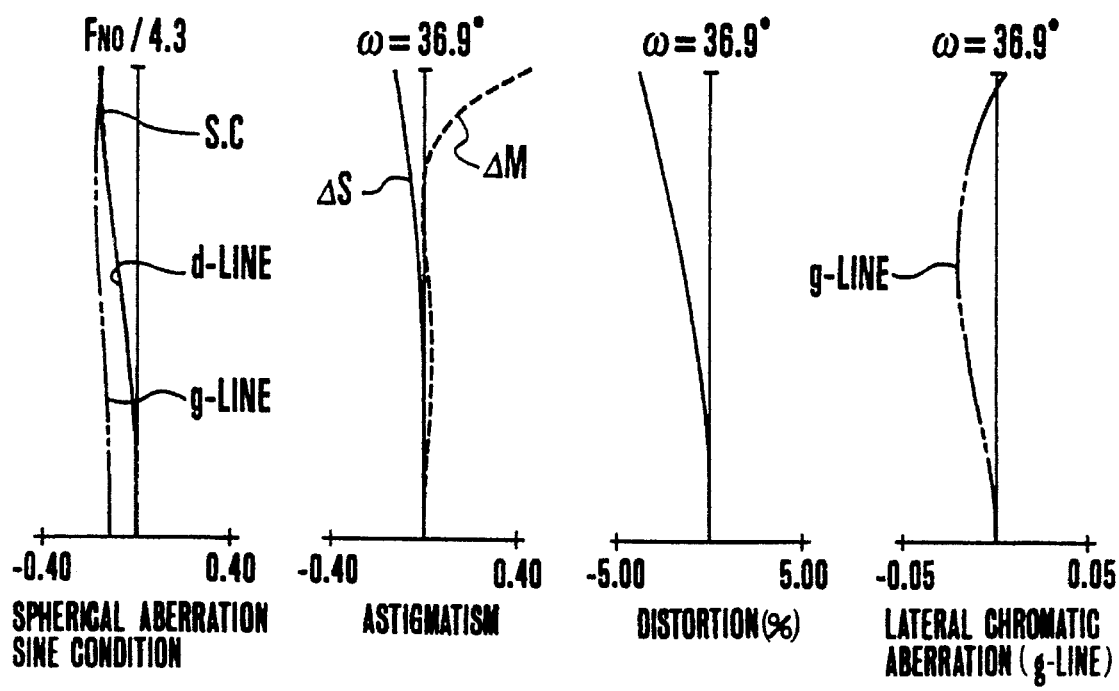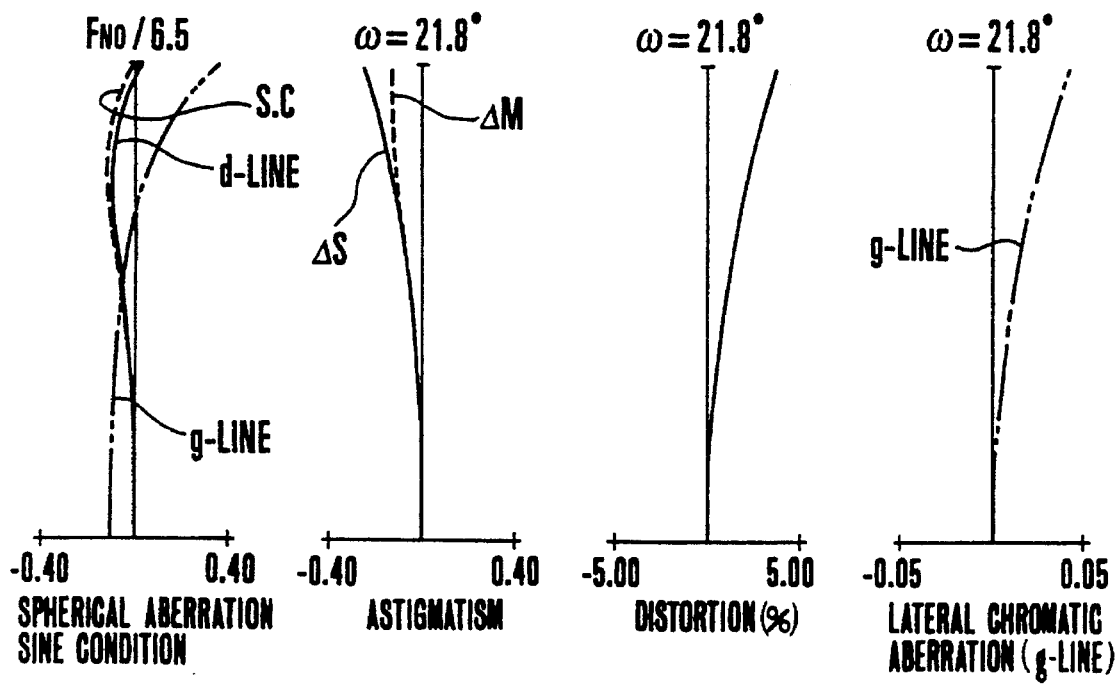

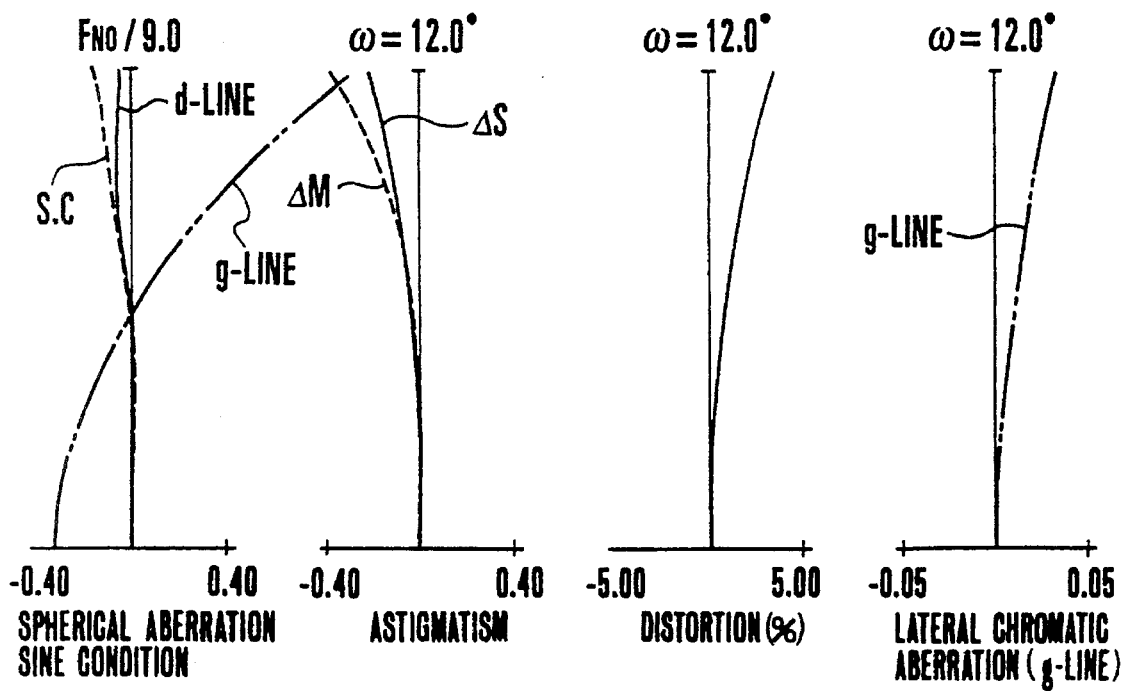

ZOOM LENS

BACKGROUND OF THE INVENTION

1. Field of the Invention

This invention relates to high-range, wide-angle zoom lenses of compact size suited to be used in lens shutter cameras or video cameras and, more particularly, to zoom lenses having an angular field widened while still permitting the total length (the distance from the front vertex to the image plane) to be shortened for excellent portability.

2. Description of the Related Art

Recently, the art of leaf shutter cameras, or video cameras, has shown a tendency to reduce the size of the camera. Along with this, there is a growing demand for compact zoom lenses of short total length.

Particularly, the leaf shutter camera, owing to the advancement of technology of the peripheral devices such as an electric circuit for driving the zooming lens members, is getting smaller and smaller in size. The photographic lens with which such a camera is equipped, too, is required to be compact despite the high range as it is of the zoom type.

In the past, for the zoom lenses for the leaf shutter cameras, the use of two lens units of positive and negative refractive powers in total, or the so-called 2-unit type constituted the mainstream. Since this 2-unit zoom lens is simple in construction and easy to operate, the minimization of the size of the camera is facilitated, the production cost is relatively low and other advantages are gained.

However, because only one lens unit bears all the function of varying the focal length, the zoom ratio is as low as 1.6 to 2. Much increase of the zoom ratio calls for a rapid increase of the size of the lens system. At the same time, the difficulty of maintaining good stability of high optical performance increases greatly.

Given the 2-unit zoom lens as a base, its first lens unit may be divided into two parts of positive refractive powers. Thus, the three lens units of positive, positive and negative refractive powers constitute the entire system with an aim at obtaining an ever higher range. Such a 3-unit zoom lens is proposed in, for example, Japanese Laid-Open Patent Applications Nos. Hei 3-282409, Hei 4-37810 and Hei 4-76511.

However, with this type in use, when the angular field is widened to 35° or more in the semiangle, the distance that the entrance pupil moves with zooming gets longer. For this reason, to increase the zoom ratio, a difficult problem of suppressing the variation of aberrations with zooming to a minimum is encountered.

Besides this, there is another technique that makes use of an even larger number of lens units. By employing this technique, the semiangle of field for the wide-angle end can be widened to 38° or thereabout and the range can be increased to 3.5 or thereabout. Such a wide-angle, high-range zoom lens is proposed in, for example, Japanese Laid-Open Patent Applications Nos. Hei 2-72316 and Hei 3-249614.

However, these zoom lenses of the character described above suffer large increases both of the diameter of the front lens members and of the total length of the entire system, and are, therefore, not always sufficiently amenable to a photographic lens for a compact camera.

Particularly, in application to the camera using the external finder, a problem arises in that, in wide-angle settings, the lens barrel vignettes the field of view of the finder. To avoid this, an alternative problem is encountered in that a limitation has to be imposed on the finder arrangement and the form of the camera.

In general, zoom lenses have a property that the stronger the refractive power of each of the lens units, the shorter the required movement of each of the lens units for the predetermined zoom ratio becomes. This means that the zoom ratio can be increased in such a manner that the total length of the entire system is shortened. However, if the refractive power of each of the lens units is merely strengthened, the aberrations vary to greater extent with zooming. Particularly, when the requirements of increasing the zoom ratio and of widening the angular field are fulfilled at once, there arises a difficult problem of obtaining good optical performance through the entire zooming range.

SUMMARY OF THE INVENTION

The present invention is to make use of four lens units in constructing the entire system and to set forth proper design rules for the zooming movements and refractive powers of all the lens units. An object of the invention is to provide a zoom lens having a field angle of about 74° in the wide-angle end and a zoom ratio of about 3.5, while still maintaining high optical performance over the entire zooming range.

A zoom lens of the invention comprises, from front to rear, a first lens unit of negative refractive power, a second lens unit of positive refractive power, a third lens unit of positive refractive power and a fourth lens unit of negative refractive power, wherein all the lens units axially move in such relation that, as compared with the wide-angle end, when in the telephoto end, the separations between the first and second lens units and between the third and fourth lens units are shorter, and the separation between the second and third lens units is longer. A feature of this zoom lens which is characteristic of the invention is that the separations D1w and D1t for the wide-angle end and the telephoto end between the first and second lens units, respectively, and the separations D2w and D2t for the wide-angle end and the telephoto end between the second and third lens units, respectively, satisfy the following condition:

$$D1w - D1t < D2t - D2w \tag{1}$$

Further features will reveal themselves from the following description of embodiments of the invention by reference to the drawings.

BRIEF DESCRIPTION OF THE DRAWINGS

FIGS. 11A–11D show graphs of the aberrations of the numerical example 1 of the invention in the wide-angle end.

FIGS. 12A–12D show graphs of the aberrations of the numerical example 1 of the invention in a middle position.

FIGS. 13A–13D show graphs of the aberrations of the numerical example 1 of the invention in the telephoto end.

FIGS. 14A–14D show graphs of the aberrations of the numerical example 2 of the invention in the wide-angle end.

FIGS. 15A–15D show graphs of the aberrations of the numerical example 2 of the invention in a middle position.

FIGS. 16A–16D show graphs of the aberrations of the numerical example 2 of the invention in the telephoto end.

FIGS. 17A–17D show graphs of the aberrations of the numerical example 3 of the invention in the wide-angle end.

FIGS. 18A–18D show graphs of the aberrations of the numerical example 3 of the invention in a middle position.

FIGS. 19A–19D show graphs of the aberrations of the numerical example 3 of the invention in the telephoto end.

FIGS. 20A–20D show graphs of the aberrations of the numerical example 4 of the invention in the wide-angle end.

FIGS. 21A–21D show graphs of the aberrations of the numerical example 4 of the invention in a middle position.

FIGS. 22A–22D show graphs of the aberrations of the numerical example 4 of the invention in the telephoto end.

FIGS. 23A–23D show graphs of the aberrations of the numerical example 5 of the invention in the wide-angle end.

FIGS. 24A–24D show graphs of the aberrations of the numerical example 5 of the invention in a middle position.

FIGS. 25A–25D show graphs of the aberrations of the numerical example 5 of the invention in the telephoto end.

FIGS. 26A–26D show graphs of the aberrations of the numerical example 6 of the invention in the wide-angle end.

FIGS. 27A–27D show graphs of the aberrations of the numerical example 6 of the invention in a middle position.

FIGS. 28A–28D show graphs of the aberrations of the numerical example 6 of the invention in the telephoto end.

FIGS. 29A–29D show graphs of the aberrations of the numerical example 7 of the invention in the wide-angle end.

FIGS. 30A–30D show graphs of the aberrations of the numerical example 7 of the invention in a middle position.

FIGS. 31A–31D show graphs of the aberrations of the numerical example 7 of the invention in the telephoto end.

FIGS. 32A–32D show graphs of the aberrations of the numerical example 8 of the invention in the wide-angle end.

FIGS. 33A–33D show graphs of the aberrations of the numerical example 8 of the invention in a middle position.

FIGS. 34A–34D show graphs of the aberrations of the numerical example 8 of the invention in the telephoto end.

FIGS. 35A–35D show graphs of the aberrations of the numerical example 9 of the invention in the wide-angle end.

FIGS. 36A–36D show graphs of the aberrations of the numerical example 9 of the invention in a middle position.

FIGS. 37A–37D show graphs of the aberrations of the numerical example 9 of the invention in the telephoto end.

FIGS. 45A–45D show graphs of the aberrations of the numerical example 10 of the invention in the wide-angle end.

FIGS. 46A–46D show graphs of the aberrations of the numerical example 10 of the invention in a middle position.

FIGS. 47A–47D show graphs of the aberrations of the numerical example 10 of the invention in the telephoto end.

FIGS. 48A–48D show graphs of the aberrations of the numerical example 11 of the invention in the wide-angle end.

FIGS. 49A!D show graphs of the aberrations of the numerical example 11 of the invention in a middle position.

FIGS. 50A–50D show graphs of the aberrations of the numerical example 11 of the invention in the telephoto end.

FIGS. 51A–51D show graphs of the aberrations of the numerical example 12 of the invention in the wide-angle end.

FIGS. 52A–52D show graphs of the aberrations of the numerical example 12 of the invention in a middle position.

FIGS. 55A–55D show graphs of the aberrations of the numerical example 13 of the invention in a middle position.

FIGS. 56A–56D show graphs of the aberrations of the numerical example 13 of the invention in the telephoto end.

FIGS. 59A–59D show graphs of the aberrations of the numerical example 14 of the invention in the telephoto end.

FIGS. 60A–60D show graphs of the aberrations of the numerical example 15 of the invention in the wide-angle end.

FIGS. 61A–61D show graphs of the aberrations of the numerical example 15 of the invention in a middle position.

FIGS. 62A–62D show graphs of the aberrations of the numerical example 15 of the invention in the telephoto end.

FIGS. 63A–63D show graphs of the aberrations of the numerical example 16 of the invention in the wide-angle end.

FIGS. 64A–64D show graphs of the aberrations of the numerical example 16 of the invention in a middle position.

FIGS. 65A–65D show graphs of the aberrations of the numerical example 16 of the invention in the telephoto end.

In these diagrams and graphic representations,
L1: First Lens Unit
L2: Second Lens Unit
L3: Third Lens Unit
L4: Fourth Lens Unit
SP: Stop
IP: Image Plane
d: Spectral d-line
g: Spectral g-line
S.C: Sine Condition
ΔS: Sagittal Image Focus
ΔM: Meridional Image Focus

DETAILED DESCRIPTION OF THE PREFERRED EMBODIMENTS

Figure 1A:
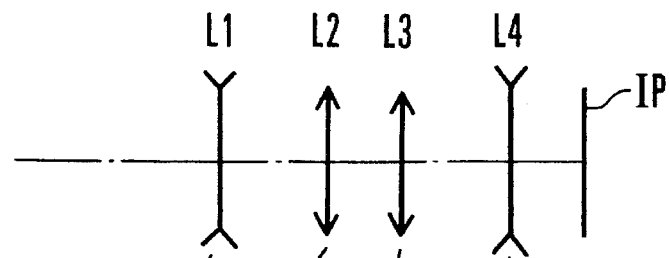
FIGS. 1(A) and 1(B) are diagrams for explaining the paraxial refractive power arrangements of a zoom lens of the invention.
Figure 1B:
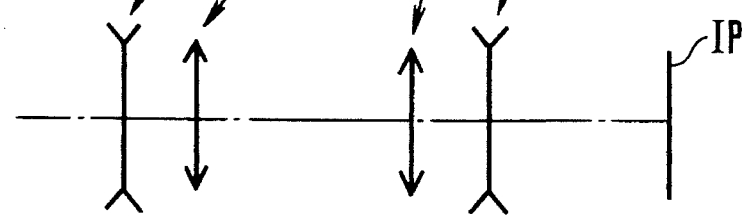
Figure 2:
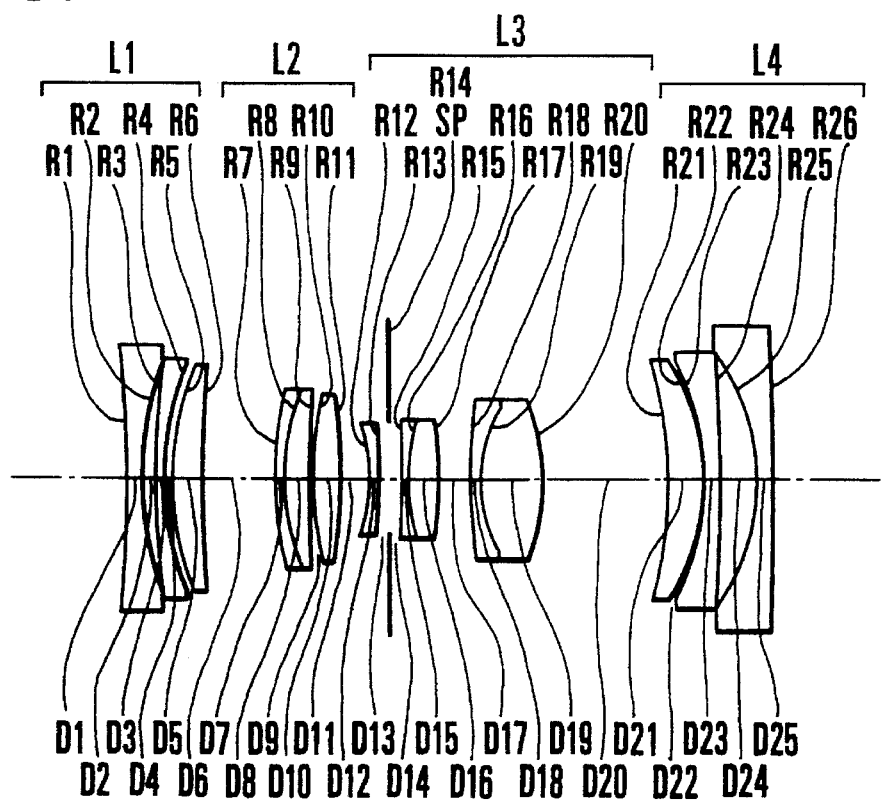
FIG. 2 is a lens block diagram of a numerical example 1 of the invention in the wide-angle end.
Figure 3:
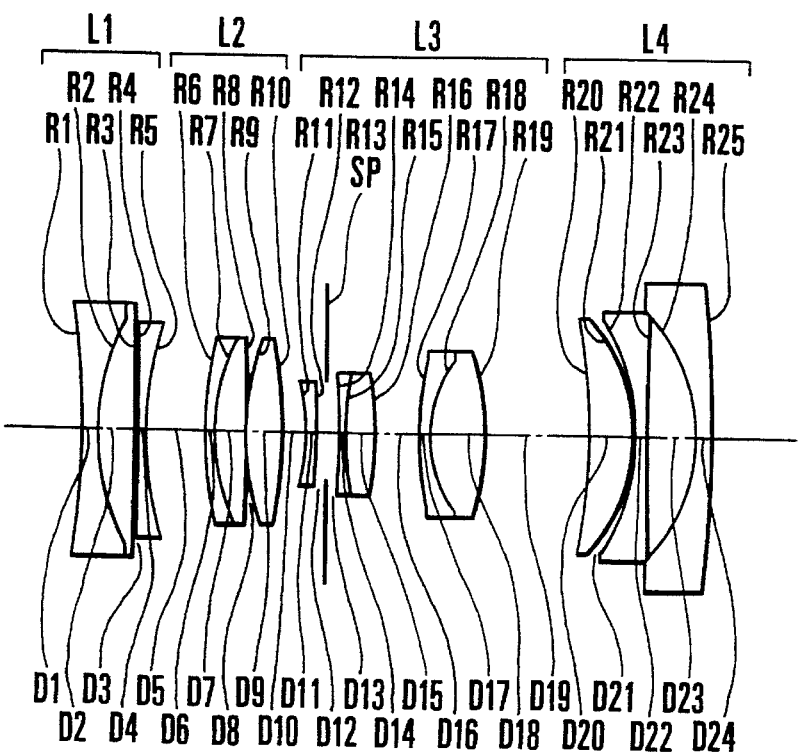
FIG. 3 is a lens block diagram of a numerical example 2 of the invention in the wide-angle end.
Figure 4:
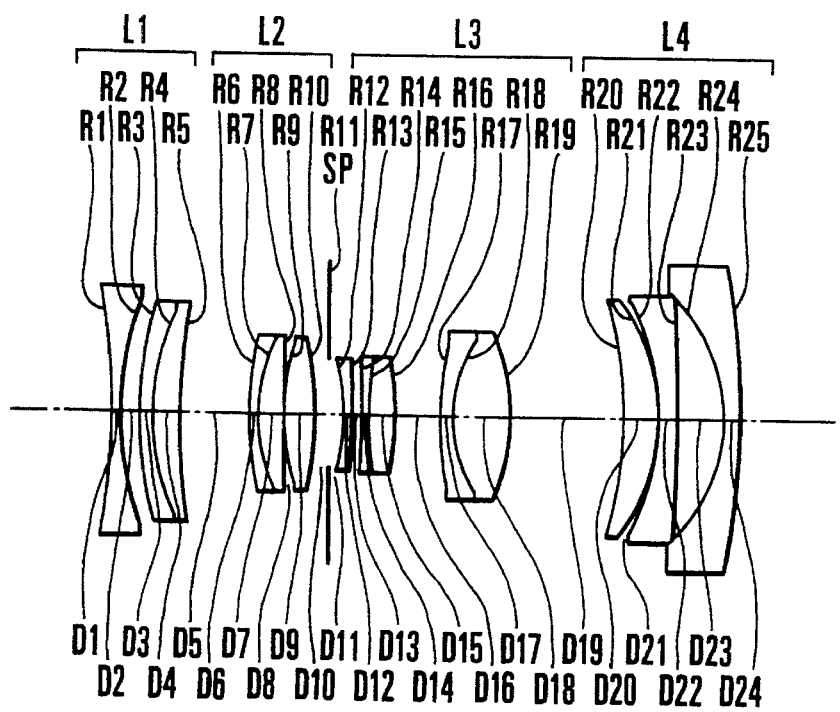
FIG. 4 is a lens block diagram of a numerical example 3 of the invention in the wide-angle end.
Figure 5:
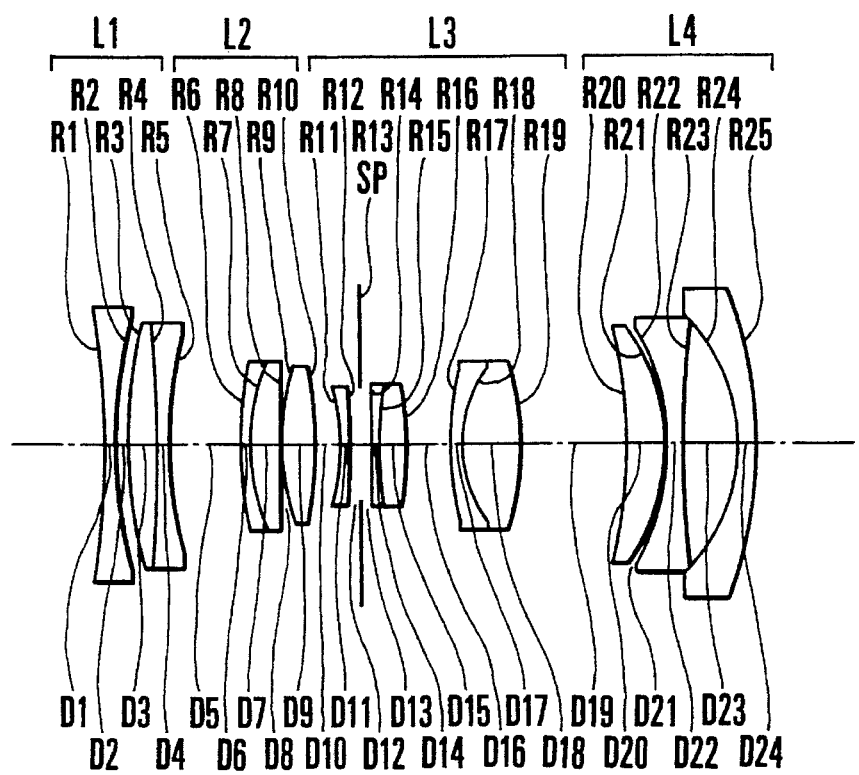
FIG. 5 is a lens block diagram of a numerical example 4 of the invention in the wide-angle end.
Figure 6:
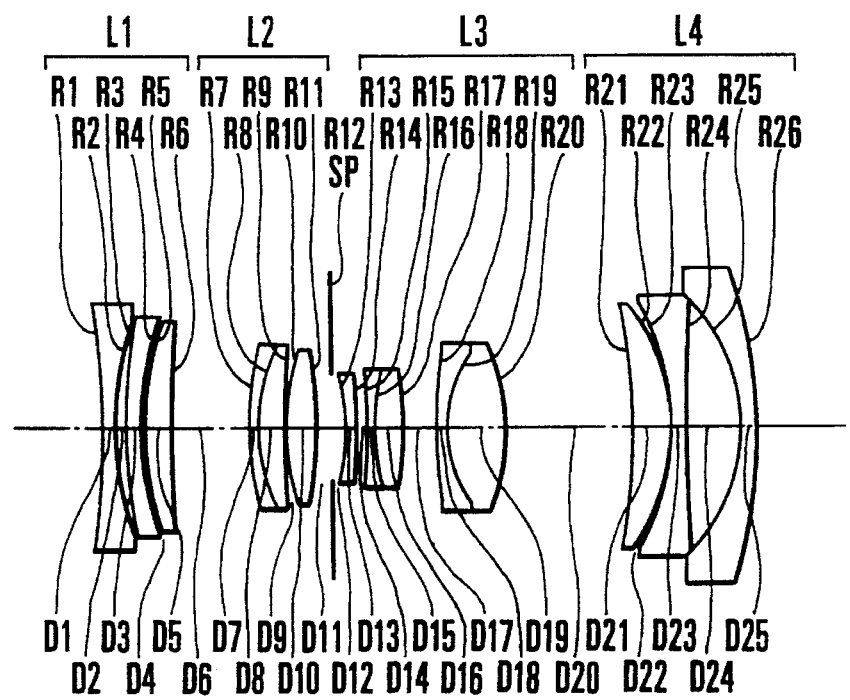
FIG. 6 is a lens block diagram of a numerical example 5 of the invention in the wide-angle end.
Figure 7:
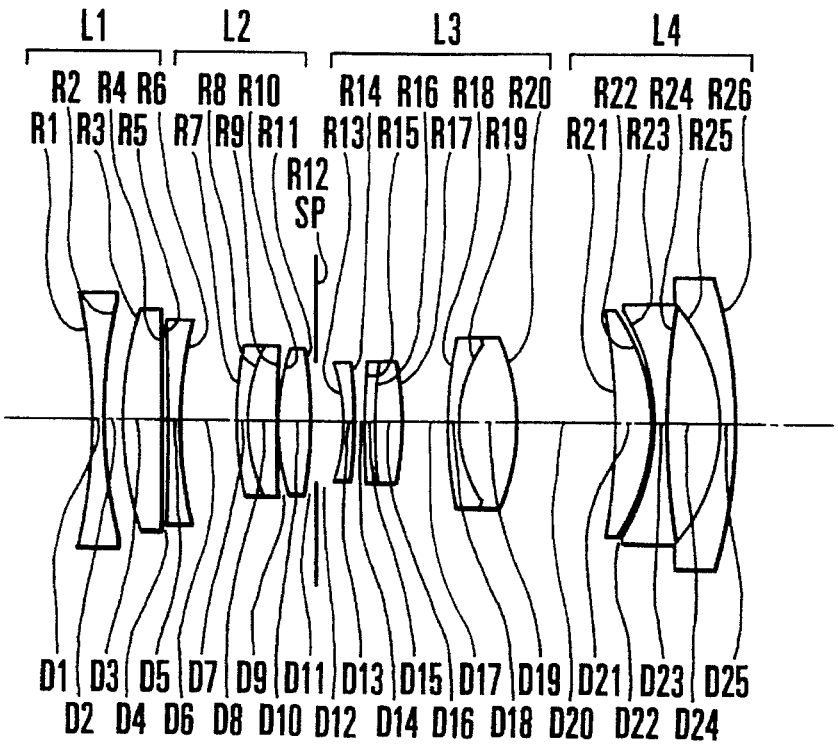
FIG. 7 is a lens block diagram of a numerical example 6 of the invention in the wide-angle end.
Figure 8:
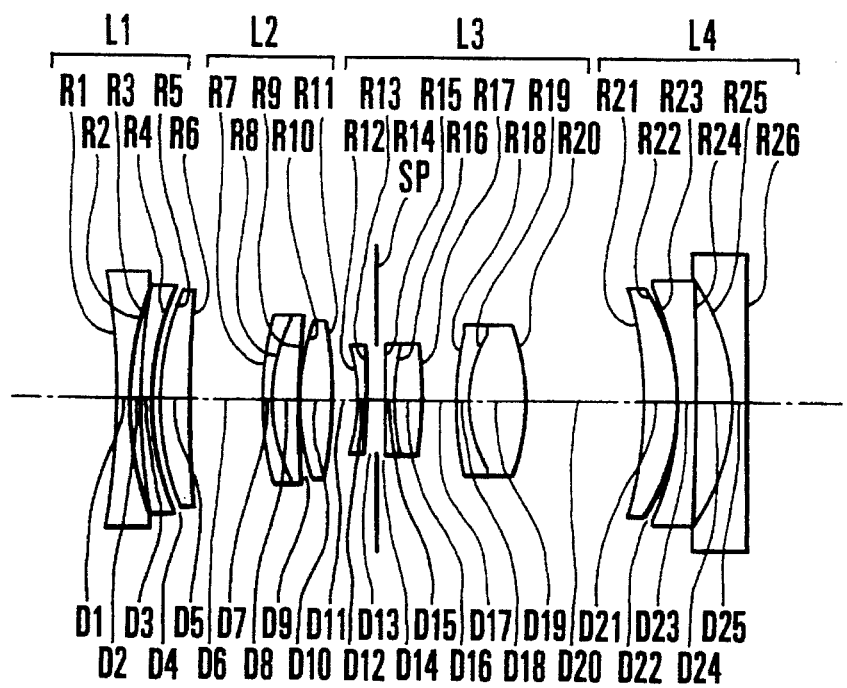
FIG. 8 is a lens block diagram of a numerical example 7 of the invention in the wide-angle end.
Figure 9:
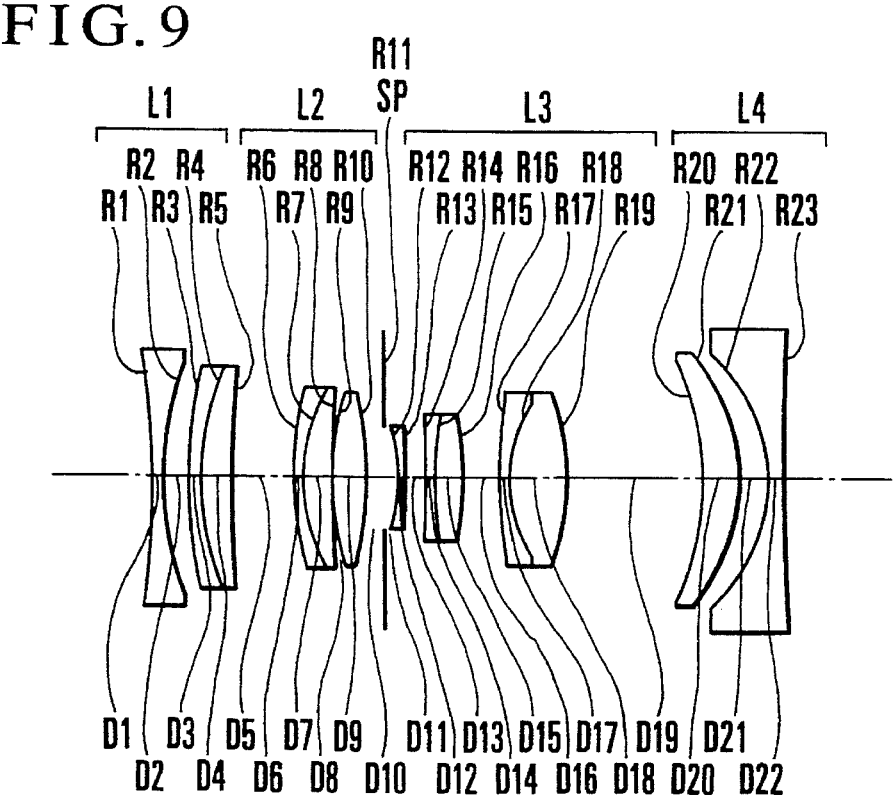
FIG. 9 is a lens block diagram of a numerical example 8 of the invention in the wide-angle end.
Figure 10:
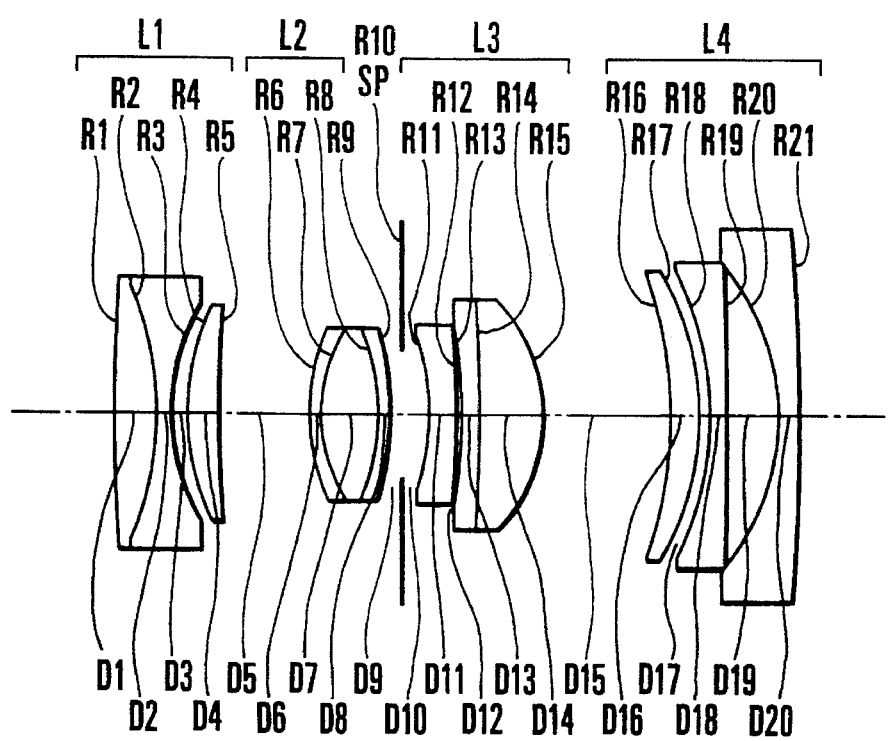
FIG. 10 is a lens block diagram of a numerical example 9 of the invention in the wide-angle end.
Figure 38:
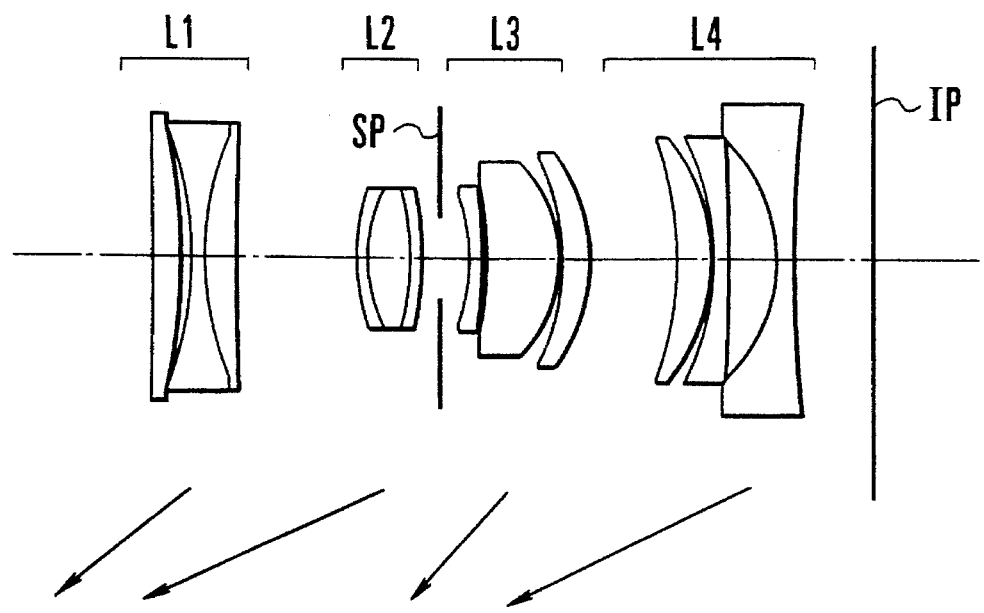
FIG. 38 is a lens block diagram of a numerical example 10 of the invention in the wide-angle end.
Figure 39:
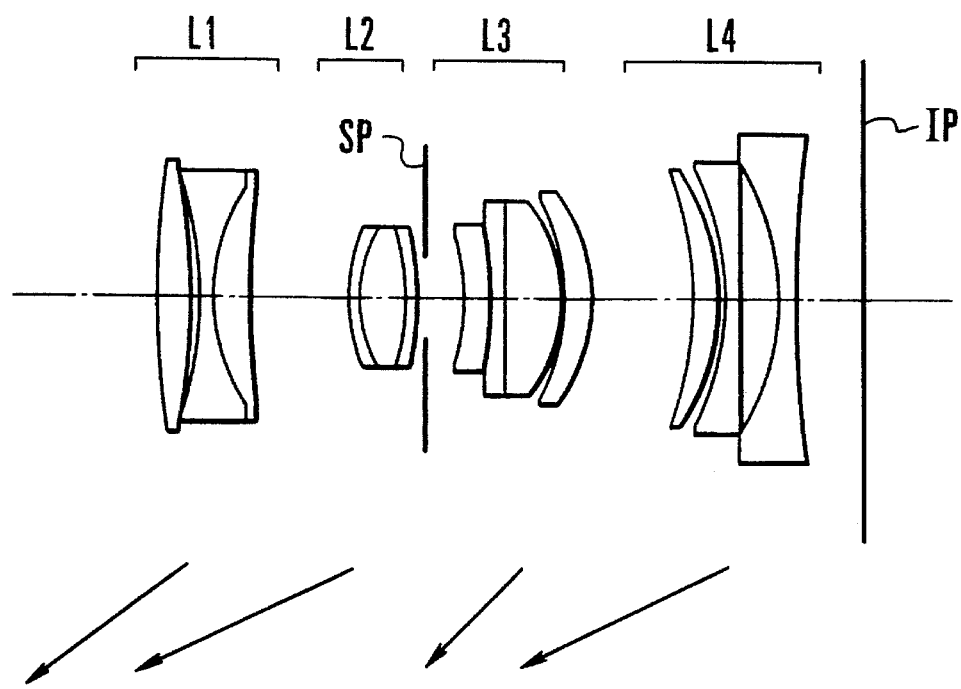
FIG. 39 is a lens block diagram of a numerical example 11 of the invention in the wide-angle end.
Figure 40:
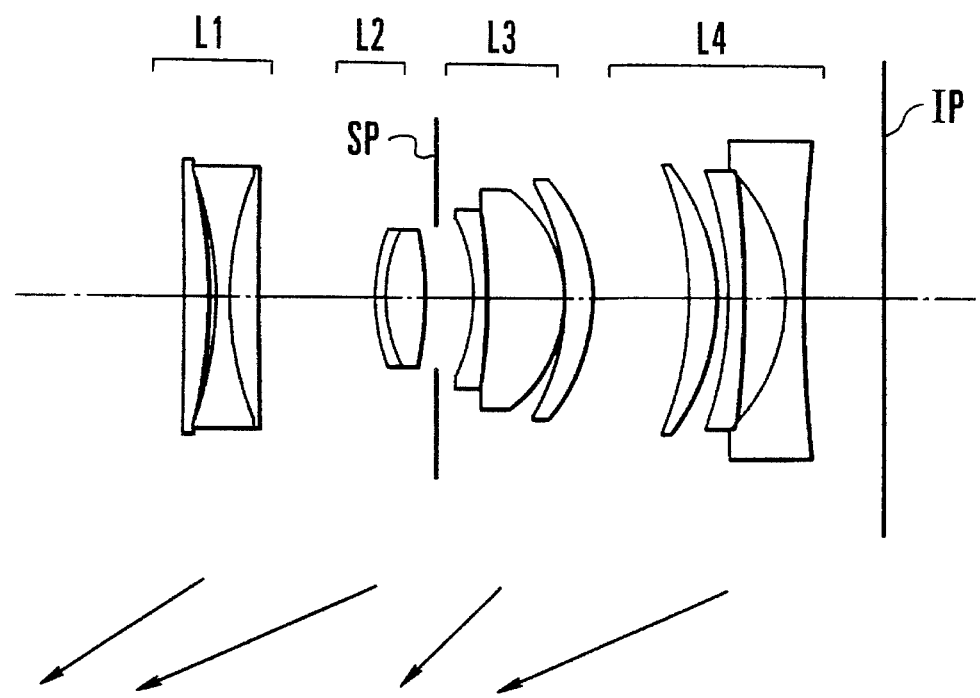
FIG. 40 is a lens block diagram of a numerical example 12 of the invention in the wide-angle end.
Figure 41:
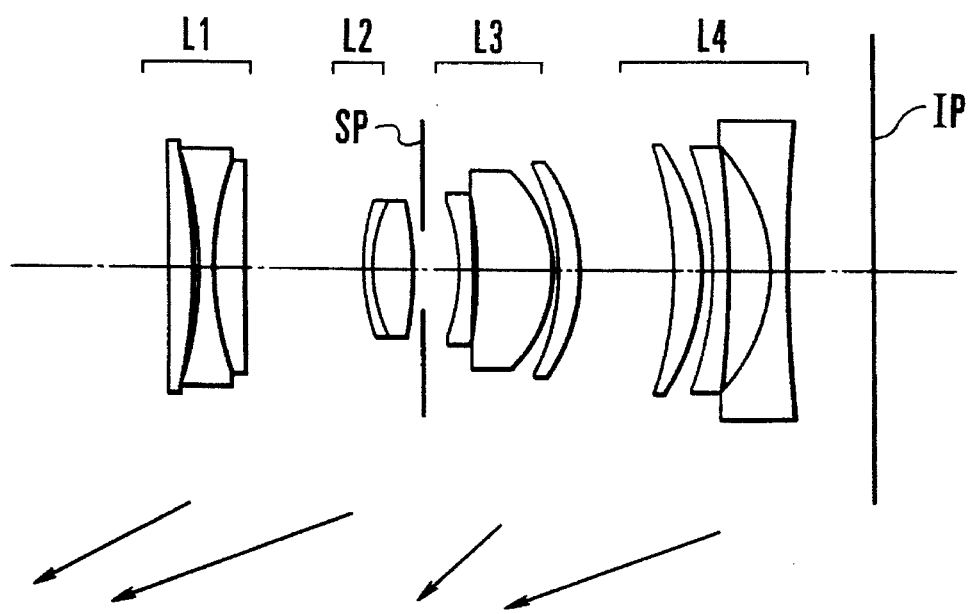
FIG. 41 is a lens block diagram of a numerical example 13 of the invention in the wide-angle end.
Figure 42:
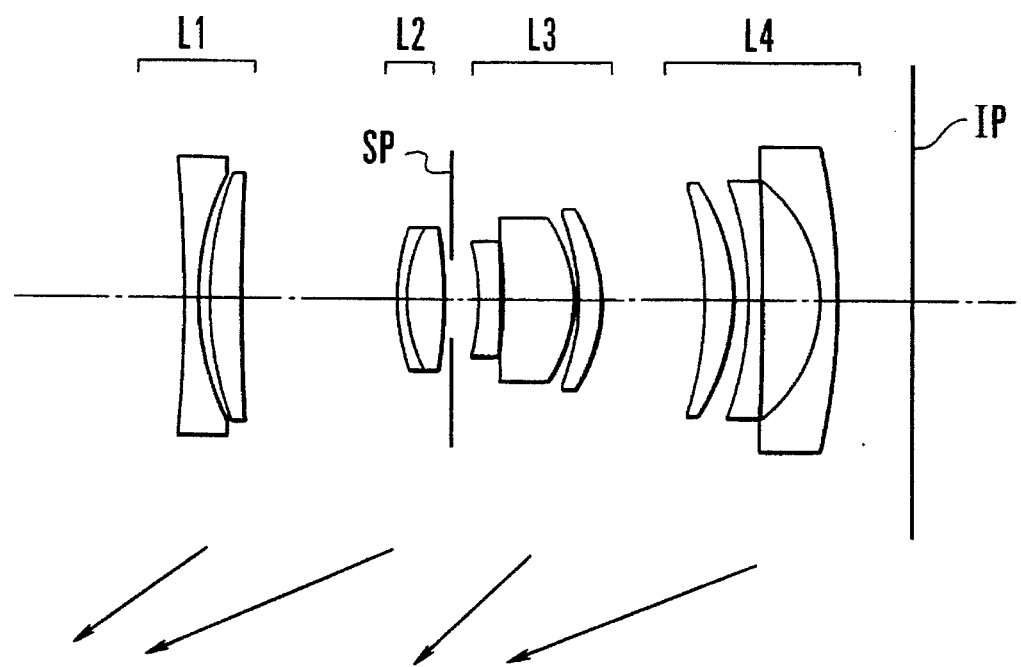
FIG. 42 is a lens block diagram of a numerical example 14 of the invention in the wide-angle end.
Figure 43:
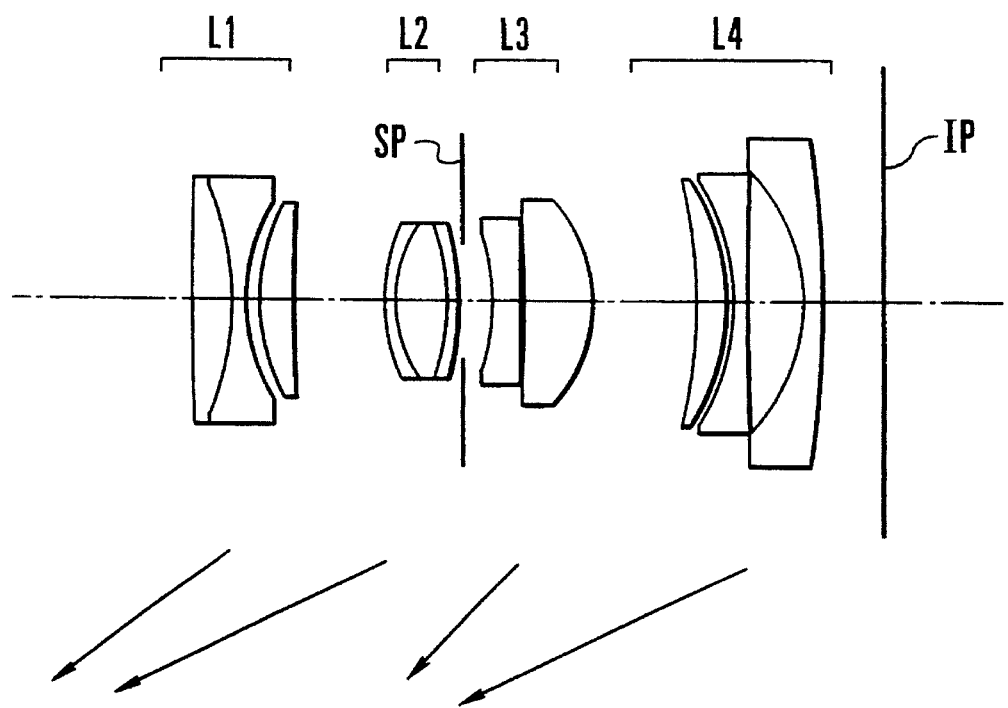
FIG. 43 is a lens block diagram of a numerical example 15 of the invention in the wide-angle end.
Figure 44:
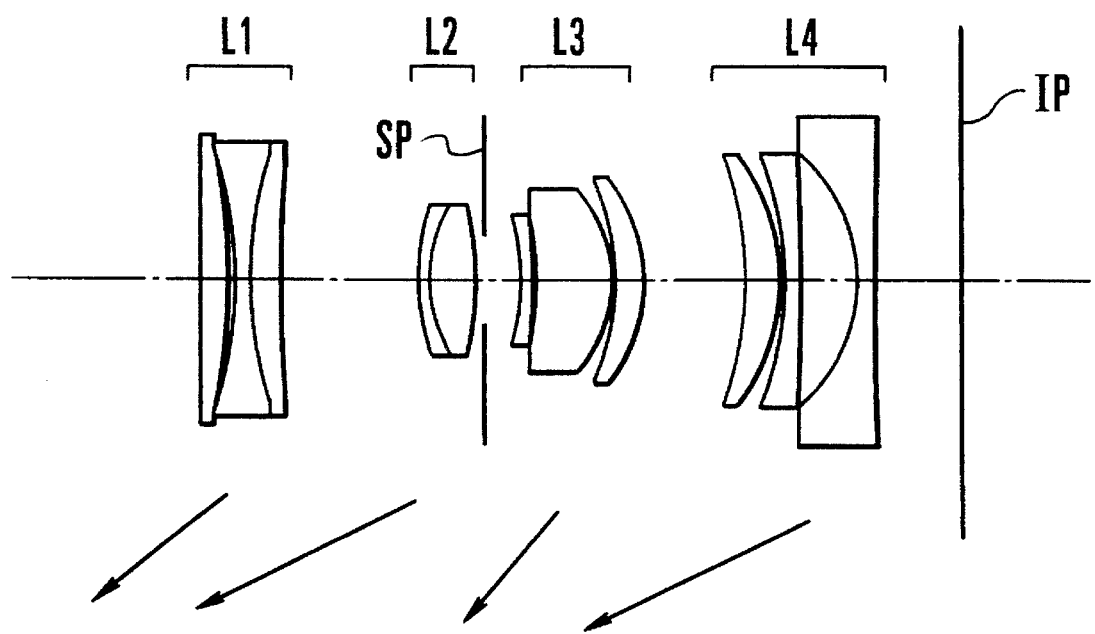
FIG. 44 is a lens block diagram of a numerical example 16 of the invention in the wide-angle end.
Figures 53A, 53B, 53C, 53D:
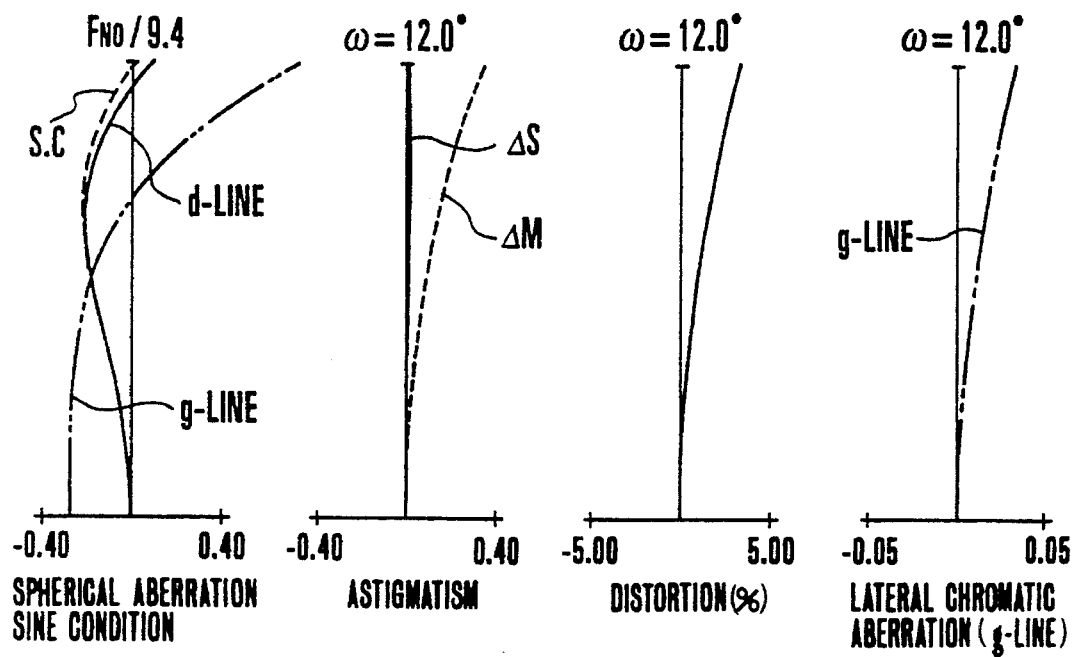
FIGS. 53A–53D show graphs of the aberrations of the numerical example 12 of the invention in the telephoto end.
Figures 54A, 54B, 54C, 54D:
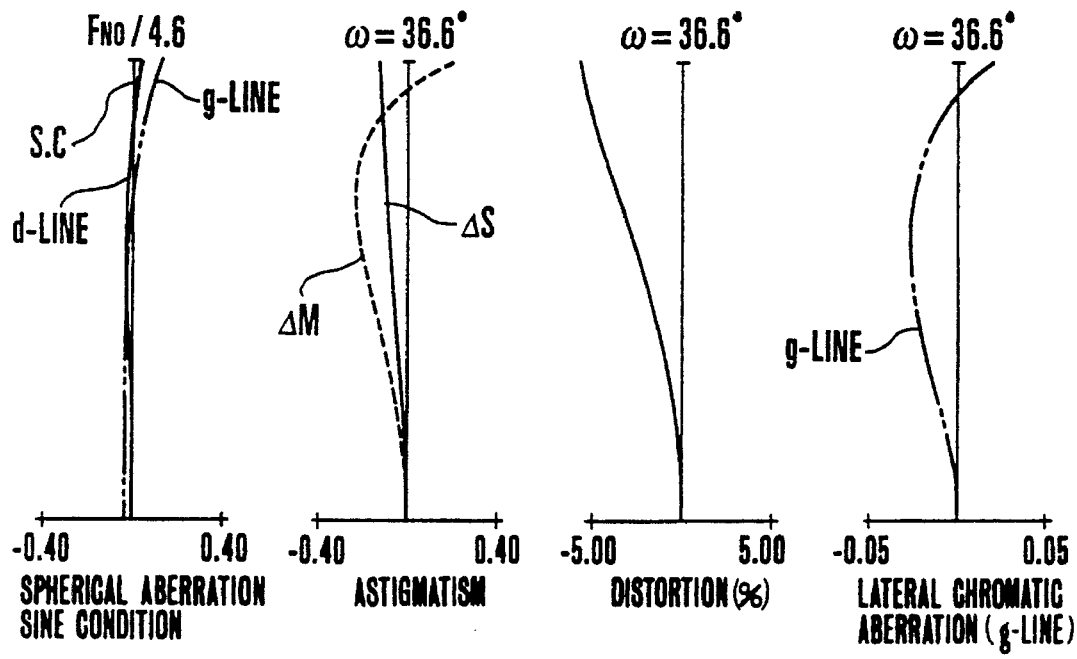
FIGS. 54A–54D show graphs of the aberrations of the numerical example 13 of the invention in the wide-angle end.
Figures 57A, 57B, 57C, 57D:
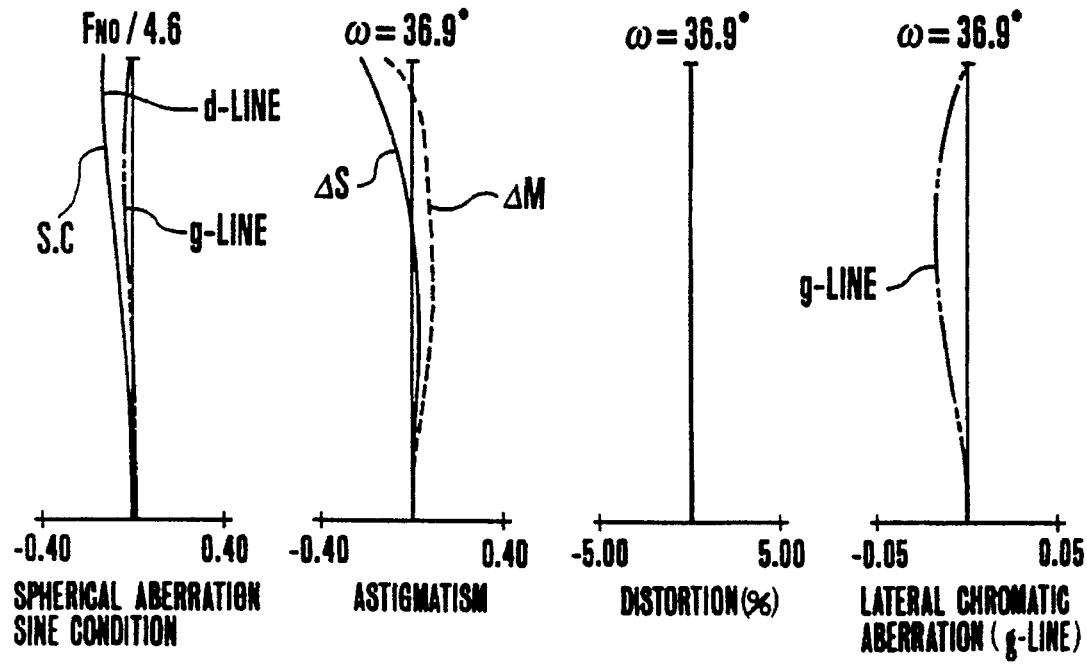
FIGS. 57A–57D show graphs of the aberrations of the numerical example 14 of the invention in the wide-angle end.
Figures 58A, 58B, 58C, 58D:
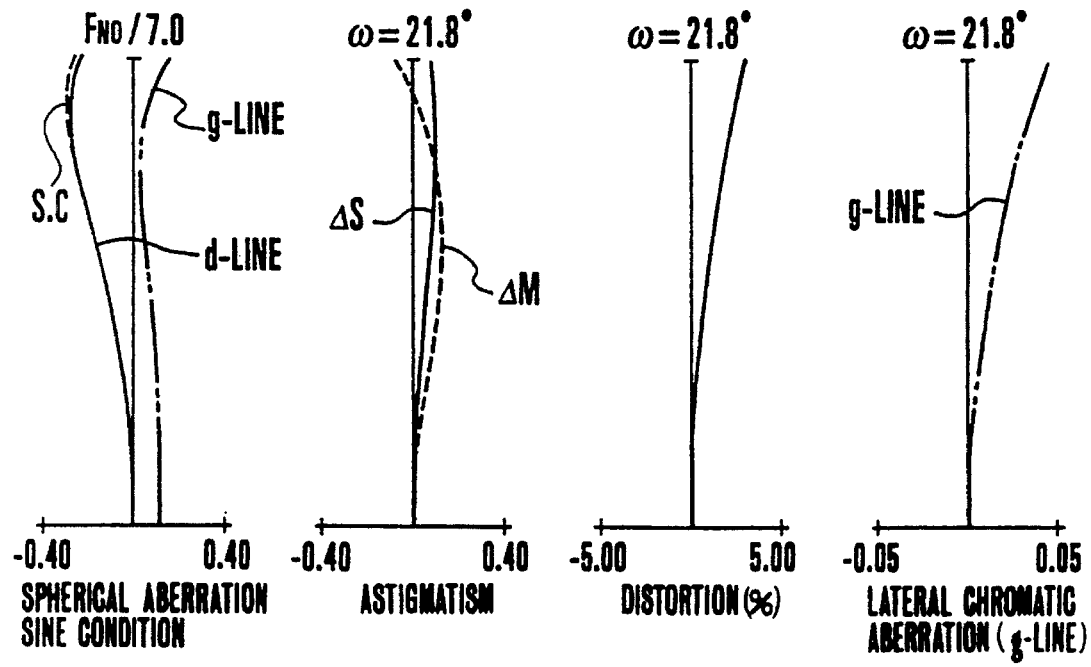
FIGS. 58A–58D show graphs of the aberrations of the numerical example 14 of the invention in a middle position.

FIGS. 1(A) and 1(B) show the variation of the paraxial refractive power arrangement of the zoom lens of the invention with zooming from the wide angle end to the telephoto end. FIGS. 2 to 10 in longitudinal section views show the numerical examples 1 to 9 of zoom lenses of the invention, respectively. The aberrations of the zoom lenses of the numerical examples 1 to 9 are shown in FIGS. 11A to 37D.

In the drawings, reference character L1 denotes the first lens unit of negative refractive power ($\phi 1$), reference character L2 denotes the second lens unit of positive refractive power ($\phi 2$), reference character L3 denotes the third lens unit of positive refractive power ($\phi 3$) and reference character L4 denotes the fourth lens unit of negative refractive power ($\phi 4$). The arrows indicate the directions in which the lens units move when zooming from the wide-angle end to the telephoto end. SP stands for the stop and IP for the image plane.

In the present embodiment, all the lens units are made to axially move forward in such differential relation that as zooming goes from the wide-angle end to the telephoto end, the separations between the first and second lens units and between the third and fourth lens units decrease and the separation between the second and third lens units increases.

This assures advantageous achievement of increases of the zoom ratio and the maximum field angle to the predetermined values, while still permitting the size of the entire lens system to be minimized.

A feature of the paraxial refractive power arrangement of the zoom lens which is characteristic of the present embodiment is described below.

On the assumption that, as in the 2-component zoom lens, the first component (front group) of refractive power $\phi 1$ and the second component (rear group) of refractive power $\phi 2$ are positioned in spaced relation by a principal point interval "e", the complete lens system has an overall refractive power $\phi 1,2$ given by the following expression:

$$\phi 1,2 = \phi 1 + \phi 2 - e \cdot \phi 1 \cdot \phi 2 \tag{a}$$

In the present invention, on the other hand, for the purpose of convenience, the first lens unit of negative refractive power and the second lens unit of positive refractive power are considered in combination to be a front group LF, while the third lens unit of positive refractive power and the fourth lens unit of negative refractive power in combination to be a rear group LR. Then, it is in the wide-angle end that the refractive powers of the front group LF and the rear group LR both become positive.

When the equation (a) is applied to this case, the parameters $\phi 1$ and $\phi 2$ are regarded as the refractive powers of the front and rear groups LF and LR, respectively. From this, it is understood that all that is needed to do for increasing the maximum field angle is only to make small the principal point interval "e". However, it is impossible to as far reduce the principal point interval "e" as desired, because there is such a limitation that the front and rear groups have to be prevented from mechanically interfering with each other.

In the front group of the present invention, for the wide-angle end, the negative first lens unit, when counted from the object side, is followed after a rather longer distance by the positive second lens unit. For this reason, the front group as a whole takes the form of the retrofocus type. Because of this, the rear principal point of the front group is placed on the image side. With the help of this feature, despite the principal point interval "e" being made shorter than heretofore possible, the front and rear groups are prevented from mechanically interfering with each other at their confronting lens surfaces. In such a manner, the much-desired increase of the maximum field angle is achieved.

It is also understood from the equation (a), that, if the refractive powers $\phi 1$ and $\phi 2$ are of opposite sign, decreasing of the principal point interval "e" provides a possibility of decreasing the overall refractive power $\phi 1,2$ (or, for the second lens unit to perform the function of increasing the image magnification).

Here, in terms of the overall focal length f1,2 of the first and second lens units, there is obtained the relationship: f1,2=1/$\phi 1,2$. As is understandable from this, if the refractive power $\phi 1,2$ has a smaller value, the overall focal length is caused to change to a longer value.

On this account, the present invention differentiates the signs of the two lens units in each pair, namely, the first and second lens units, or the third and fourth lens units, from each other, and narrows their separation as zooming goes from the wide-angle end to the telephoto end. Thus, the overall focal length of each of the groups is made to vary to even longer values. In other words, the groups each are made to change to a telephoto lens system.

In addition, both of the refractive powers of the front and rear groups are positive in the wide-angle end. As is understandable from the equation (a), therefore, as going to the telephoto end, the principal point interval "e" (which is identified as the interval between the principal points of the front and rear groups) is made to increase as shown in FIGS. 1(A) and 1(B). Thus, the telephoto form is strengthened with higher efficiency than was heretofore possible.

Also, resulting from the increase of the range, the zoom lens of the invention acquires a property that the refractive power of the rear group changes from positive to negative at a point near the telephoto end. In other words, it is in the telephoto region that as the positive refractive power is disposed in the front group and the negative refractive power in the rear group, the optical system gets the telephoto type. Thus, the total length for the telephoto end of the entire system is remarkably shortened, and good correction of all aberrations is facilitated.

For the relation in which all the lens units move to effect zooming, the above-described condition (1) is then set forth. When this condition is satisfied, an improved result of the compact form of the entire system is attained while securing the predetermined value of the zoom ratio.

The inequality of condition (1) represents which value, during zooming, is longer, the range of variation of the separation between the first and second lens units, or the range of variation of the separation between the front and rear groups.

If, to secure the zoom ratio at the predetermined value, the condition (1) is violated, that is, if the value of the left side is greater than that of the right side, then there is no possibility of occurrence of mechanical interference in the telephoto end. However, in the wide-angle end, the separation between the first and second lens units becomes too large, causing the total length of the entire system to increase objectionably. To admit a certain amount of light going to the corners of the image frame, the outer diameter of the zoom lens, too, has to be increased largely.

For even more improved results, an additional condition:

$$0.1 < (D1w - D1t)/(D2t - D2w) < 1.0 \tag{1'}$$

is satisfied. When the upper limit of the condition (1') is exceeded, the above-described problems arise. When the lower limit of the condition (1') is exceeded, the separation between the first and second lens units varies to such a lesser extent that the second lens unit makes an inadequate contribution to the variation of the focal length. The movement of the front group, too, produces a lesser effect of increasing the image magnification. To compensate for this, the total length of the entire system in the telephoto end has to be increased objectionably.

To simultaneously fulfill the requirements of minimizing the variation of aberrations with zooming and of assuring high optical performance over the entire area of the image frame at an increased maximum field angle, it is recommended to satisfy the following conditions:

(i) Letting the focal length of the i-th lens unit be denoted by fi, the shortest focal length of the entire system by fw, the overall refractive power for the wide-angle end of the first and second lens units by $\phi 1,2w$, and the lateral magnification for the wide-angle end of the i-th lens unit by $\beta iw$, the following conditions:

$$0.5 < |f4/fw| < 1.5 \tag{2}$$

$$0.3 < \phi 1,2w \cdot fw < 1.0 \tag{3}$$

$$1.1 < \beta 4w < 1.8 \tag{4}$$

are satisfied.

The inequalities of condition (2) are concerned with the ratio of the refractive power of the fourth lens unit to the refractive power for the wide-angle end of the entire system and have an aim chiefly to make a good compromise between the shortening of the total length of the entire system and the correction of aberrations.

When the upper limit of the condition (2) is exceeded, as this implies that the refractive power of the fourth lens unit is too weak, the effect of varying the focal length by the fourth lens unit becomes weak. As a result, to obtain the predetermined zoom ratio, the movement of each lens unit has to be made large, causing the total length of the entire system to increase.

When the lower limit of the condition (2) is exceeded, the lens system, when in the wide-angle end, gets too strong a telephoto type function since the overall refractive power of the first to third lens units is positive and the refractive power of the fourth lens unit is negative.

As a result, the back focal distance of the lens system becomes too short. To secure the predetermined corner illumination, the outer diameter of the fourth lens unit has to be increased. Since, at the same time, the refractive power of the fourth lens unit is too strong, field curvatures and astigmatism of higher order are produced, which are difficult to correct.

The inequalities of condition (3) are concerned with the the refractive power for the wide-angle end of the front group composed of the first and second lens units. When the upper limit of the condition (3) is exceeded, as this implies that the refractive power of the front group is too strong in the wide-angle end, the telephoto type functions strongly. In some cases, therefore, the predetermined back focal distance becomes difficult to obtain. In other cases, strong undercorrection of spherical aberration results from the front group, which is difficult to correct by any design of the other lens units.

When the lower limit of the condition (3) is exceeded, on the other hand, a large increase of the total length of the entire system results. Moreover, the rear group composed of the third and fourth lens units has to strengthen its positive refractive power so that the shortest focal length of the entire system is shortened. For this reason, the difficulty of taking good balance of all aberrations throughout the entire zooming range is increased objectionably.

The inequalities of condition (4) are concerned with the lateral magnification of the fourth lens unit in the wide-angle end.

Now, in terms of the back focal distance Bfw of the lens system in the wide-angle end, the following relationship is obtained:

$$Bfw = f4 \cdot (1 - \beta 4w)$$

This relationship requires that not only the condition (2) but also the condition (4) must be taken into account, when their factors are determined to appropriate values, to make a good compromise between the shortening of the total length of the entire lens system and the correction of aberrations.

When the upper limit of the condition (4) is exceeded, the back focal distance is elongated more than necessary. Therefore, the total length of the entire system is caused to increase so largely as to spoil the improvement of the compact form.

When the lower limit is exceeded, on the other hand, it becomes difficult to keep the back focal distance at any positive value. To make it easy, therefore, the form and the arrangement of the fourth lens unit are so largely limited that many aberrations become difficult to correct.

(ii) In the invention, it is recommended that the aforesaid conditions (2) and (4) are combined to set forth a common condition for the focal length and magnification for the wide-angle end of the fourth lens unit as follows:

$$0.2 < f4 \cdot (1 - \beta 4w)/fw < 0.45 \tag{1a}$$

Outside this range, it becomes difficult to correct all aberrations in good balance in such a manner that the size of the entire lens system is minimized.

(iii) Concerning the conditions (2) and (3), it is especially better that the focal length f4 of the fourth lens unit and the aforesaid refractive power $\phi 1,2$ fall within the following narrower ranges:

$$0.55 < |f4/fw| < 1.0 \tag{2a}$$

$$0.45 < \phi 1,2w \cdot fw < 0.80 \tag{3a}$$

(iv) Letting the focal length of the i-th lens unit be denoted by fi, the shortest focal length of the entire system by fw and the magnification for the wide-angle end of the third lens unit by $\beta 3w$, the following conditions are satisfied:

$$0.6 < f2/fw < 2.0 \tag{5}$$

$$0.8<f3/fw<1.6 \qquad (6)$$

$$0.2<\beta 3w<0.60 \qquad (7)$$

The inequalities of condition (5) are concerned with the refractive power of the second lens unit. When the upper limit of the condition (5) is exceeded, as this implies that the refractive power of the second lens unit is too weak, the total zooming movement of the second lens unit becomes large, causing the lens system to increase largely.

When the lower limit is exceeded, the second lens unit produces strong spherical aberrations of higher order, which are difficult to correct.

The inequalities of condition (6) are concerned with the refractive power for the wide-angle end of the third lens unit. When the refractive power of the third lens unit is too weak as exceeding the upper limit of the condition (6), the refractive powers of the negative lens units have to be strengthened. Otherwise, the shortest focal length could not take the predetermined value. So, the lens system comes to increase in size. Also, the refractive power of the positive lens unit in the front group, too, has to be strengthened. This leads to production of large spherical aberrations of higher order in the telephoto end, which are difficult to correct.

Meanwhile, when the refractive power of the third lens unit is too strong as exceeding the lower limit, the third and fourth lens units get too strong a telephoto type function so that the predetermined value of the back focal distance is hardly obtained. In addition, the third lens unit produces many aberrations which are difficult to correct by any design of the other lens units.

The inequalities of condition (7) are concerned with the magnification for the wide-angle end of the third lens unit.

When the upper limit of the condition (7) is exceeded, the back focal distance can hardly take the predetermined value in the wide-angle end. As a result, the outer diameter of the third lens unit is caused to increase largely.

When the lower limit is exceeded, the refractive powers of the other lens units become stronger in order to obtain an equivalent focal length. Therefore, the variation of aberrations with zooming becomes difficult to correct.

(v) The first lens unit is better constructed with at least one negative lens and at least one positive lens. The second lens unit is better constructed with at least one negative lens and at least one positive lens.

The third lens unit is better constructed to a form that the frontmost lens surface is concave toward the object side and the rearmost lens surface is convex toward the object side and with at least one negative lens and at least one positive lens. Besides these, it is preferred to introduce an aspheric sphere to the rearmost lens surface, so that a further improvement of the optical performance is achieved.

(v) It is desired that the fourth lens unit is constructed with at least one negative lens having a concave surface of strong curvature facing the object side and at least one positive lens. Further, it is preferred that, letting the mean values of the Abbe numbers of the positive lenses and the negative lenses in the fourth lens unit be denoted by v4P and v4N, respectively, the following condition is satisfied:

$$12.0<v4N-v4P<35.0 \qquad (8)$$

When the condition (8) is violated, large variation of chromatic aberrations with zooming is produced, which is difficult to correct by any design of the other lens units.

(vii) To suppress the variation of aberrations with zooming, the entrance pupil must take an appropriate position. For this purpose, the stop better lies in one of the air spaces intervening between the rearmost surfaces of the second and third lens units.

The stop is then better arranged on zooming to axially move in differential relation to the lens units. This makes it possible that, as the entrance pupil changes its position with zooming, the stop finds its place always near the entrance pupil. Thus, the curvature of field is effectively prevented from varying at a time when the size of the aperture opening is small.

In a case where the focusing lens unit contains the stop, the stop remains stationary during the time when the focusing lens unit moves. By this, the driving torque can be reduced from that which would otherwise be necessary to move the diaphragm mechanism during focusing.

In view of achieving a further improvement of the performance, the third lens unit may be divided into two parts, the separation between which varies so finely during zooming or focusing that the variation of aberrations can be corrected.

Next, numerical examples 1 to 9 of the invention are shown. In the numerical data for the numerical examples 1 to 9, Ri is the radius of curvature of the i-th lens surface, when counted from the object side, Di is the i-th axial thickness or air separation, when counted from the object side, and Ni and i are respectively the refractive index and Abbe number of the glass of the i-th lens element, when counted from the object side.

The values of the factors in the above-described conditions for the numerical examples 1 to 9 are listed in a Table-1.

The shape of an aspheric surface is expressed in the coordinates with an X-axis in the axial directions and an H-axis in the direction perpendicular to the optical axis, the direction in which light advances being taken as positive, by the following equation:

$$X = (1/R)H^2/(1 + \sqrt{1-(1+k)(H/R)^2}) + AH^2 + BH^4 + CH^6 + DH^8 + EH^{10}$$

where R is the radius of the osculating sphere, and k, A, B, C, D and E are the aspheric coefficients.

Numerical Example 1:

| f = 28.84–101.49 | Fno = 1:3.8–8.2 | 2ω = 73.8°–24.1° | |
|---|---|---|---|
| R1 = –97.40 | D1 = 1.30 | N1 = 1.77250 | v1 = 49.6 |
| R2 = 31.81 | D2 = 1.16 | | |
| R3 = 55.44 | D3 = 1.20 | N2 = 1.71300 | v2 = 53.8 |
| R4 = 28.39 | D4 = 0.88 | | |
| R5 = 28.00 | D5 = 2.60 | N3 = 1.80518 | v3 = 25.4 |
| R6 = 109.66 | D6 = Variable | | |
| R7 = 32.52 | D7 = 0.90 | N4 = 1.84666 | v4 = 23.8 |
| R8 = 17.67 | D8 = 2.50 | N5 = 1.48749 | v5 = 70.2 |
| R9 = 95.90 | D9 = 0.30 | | |
| R10 = 30.71 | D10 = 5.80 | N6 = 1.61800 | v6 = 63.4 |
| R11 = –50.14 | D11 = Variable | | |
| R12 = –17.18 | D12 = 0.87 | N7 = 1.64769 | v7 = 33.8 |
| R13 = –66.48 | D13 = 1.10 | | |
| R14 = (Stop) | D14 = 1.10 | | |
| R15 = –121.40 | D15 = 0.80 | N8 = 1.48749 | v8 = 70.2 |
| R16 = 28.56 | D16 = 2.68 | N9 = 1.84666 | v9 = 23.8 |
| R17 = –46.26 | D17 = 3.20 | | |
| R18 = 43.20 | D18 = 1.10 | N10 = 1.84666 | v10 = 23.8 |
| R19 = 12.23 | D19 = 5.60 | N11 = 1.58313 | v11 = 59.4 |
| R20 = –22.17 | D20 = Variable | | |
| R21 = –48.29 | D21 = 3.60 | N12 = 1.84666 | v12 = 23.8 |
| R22 = –19.52 | D22 = 0.15 | | |
| R23 = –22.60 | D23 = 1.30 | N13 = 1.80610 | v13 = 41.0 |
| R24 = –218.09 | D24 = 3.56 | | |
| R25 = –20.01 | D25 = 1.50 | N14 = 1.78590 | v14 = 44.2 |
| R26 = –415.60 | | | |

-continued

| Variable | Focal Length | | |
|---|---|---|---|
| Separation | 28.84 | 53.64 | 101.49 |
| D6 | 7.01 | 2.78 | 0.20 |
| D11 | 2.60 | 12.83 | 23.25 |
| D20 | 11.91 | 5.81 | 0.75 |

| | Aspheric Coefficient | | |
|---|---|---|---|
| R20 | K = $-2.876 \times 10^{-1}$ | A = 0 | B = $1.410 \times 10^{-5}$ |
| | C = $-3.293 \times 10^{-8}$ | D = $-1.524 \times 10^{-9}$ | E = 0 |

Numerical Example 2:

f = 28.84–101.28  Fno = 1:3.8–8.2  2ω = 73.8°–24.1°

| R1 = −71.13 | D1 = 1.30 | N1 = 1.80400 | ν1 = 46.6 |
| R2 = 23.11 | D2 = 3.50 | N2 = 1.80518 | ν2 = 25.4 |
| R3 = 314.23 | D3 = 0.45 | | |
| R4 = 282.20 | D4 = 1.10 | N3 = 1.59551 | ν3 = 39.2 |
| R5 = 38.53 | D5 = Variable | | |
| R6 = 38.86 | D6 = 1.00 | N4 = 1.84666 | ν4 = 23.8 |
| R7 = 19.11 | D7 = 3.00 | N5 = 1.48749 | ν5 = 70.2 |
| R8 = 3090.15 | D8 = 0.30 | | |
| R9 = 28.26 | D9 = 3.30 | N6 = 1.61800 | ν6 = 63.4 |
| R10 = −48.98 | D10 = Variable | | |
| R11 = −18.17 | D11 = 0.87 | N7 = 1.64769 | ν7 = 33.8 |
| R12 = −67.16 | D12 = 1.10 | | |
| R13 = (Stop) | D13 = 1.10 | | |
| R14 = −146.59 | D14 = 0.80 | N8 = 1.48749 | ν8 = 70.2 |
| R15 = 33.69 | D15 = 2.68 | N9 = 1.84666 | ν9 = 23.8 |
| R16 = −46.03 | D16 = 4.65 | | |
| R17 = 35.62 | D17 = 1.10 | N10 = 1.84666 | ν10 = 23.8 |
| R18 = 12.07 | D18 = 5.60 | N11 = 1.58313 | ν11 = 59.4 |
| R19 = −25.78 | D19 = Variable | | |
| R20 = −56.40 | D20 = 4.30 | N12 = 1.84666 | ν12 = 23.8 |
| R21 = −18.35 | D21 = 0.20 | | |
| R22 = −22.09 | D22 = 1.30 | N13 = 1.80610 | ν13 = 41.0 |
| R23 = 437.79 | D23 = 4.94 | | |
| R24 = −17.68 | D24 = 1.50 | N14 = 1.78590 | ν14 = 44.2 |
| R25 = −143.98 | | | |

| Variable | Focal Length | | |
|---|---|---|---|
| Separation | 28.84 | 54.75 | 101.28 |
| D5 | 6.00 | 3.54 | 0.50 |
| D10 | 2.60 | 11.98 | 26.30 |
| D19 | 10.65 | 4.39 | 0.69 |

| | Aspheric Coefficient | | |
|---|---|---|---|
| R5 | K = $1.335 \times 10^{-1}$ | A = 0 | B = $-1.750 \times 10^{-8}$ |
| | C = $-3.129 \times 10^{-9}$ | D = $-2.400 \times 10^{-11}$ | E = 0 |
| R19 | K = $-3.231 \times 10^{-1}$ | A = 0 | B = $1.318 \times 10^{-5}$ |
| | C = $-3.665 \times 10^{-8}$ | D = $-7.598 \times 10^{-10}$ | E = 0 |

Numerical Example 3:

f = 28.84–101.54  Fno = 1:3.5–8.2  2ω = 73.8°–24.1°

| R1 = −92.99 | D1 = 1.30 | N1 = 1.77250 | ν1 = 49.6 |
| R2 = 35.00 | D2 = 1.99 | | |
| R3 = 43.43 | D3 = 1.20 | N2 = 1.71300 | ν2 = 53.8 |
| R4 = 25.10 | D4 = 2.60 | N3 = 1.80518 | ν3 = 25.4 |
| R5 = 67.27 | D5 = Variable | | |
| R6 = 33.52 | D6 = 0.90 | N4 = 1.84666 | ν4 = 23.8 |
| R7 = 17.95 | D7 = 2.50 | N5 = 1.48749 | ν5 = 70.2 |
| R8 = 89.93 | D8 = 0.30 | | |
| R9 = 30.32 | D9 = 2.80 | N6 = 1.61800 | ν6 = 63.4 |
| R10 = −52.44 | D10 = Variable | | |
| R11 = (Stop) | D11 = 1.40 | | |
| R12 = −17.76 | D12 = 0.85 | N7 = 1.64769 | ν7 = 33.8 |
| R13 = −64.57 | D13 = 0.88 | | |
| R14 = −106.10 | D14 = 0.80 | N8 = 1.48749 | ν8 = 70.2 |
| R15 = 35.88 | D15 = 2.68 | N9 = 1.84666 | ν9 = 23.8 |
| R16 = −45.76 | D16 = 4.77 | | |
| R17 = 40.58 | D17 = 1.10 | N10 = 1.84666 | ν10 = 23.8 |
| R18 = 13.46 | D18 = 5.60 | N11 = 1.58313 | ν11 = 59.4 |
| R19 = −22.39 | D19 = Variable | | |
| R20 = −45.76 | D20 = 3.60 | N12 = 1.84666 | ν12 = 23.8 |
| R21 = −18.79 | D21 = 0.15 | | |
| R22 = −23.35 | D22 = 1.30 | N13 = 1.80610 | ν13 = 41.0 |
| R23 = −512.49 | D23 = 5.03 | | |
| R24 = −16.73 | D24 = 1.50 | N14 = 1.78590 | ν14 = 44.2 |
| R25 = −86.24 | | | |

| Variable | Focal Length | | |
|---|---|---|---|
| Separation | 28.84 | 53.17 | 101.54 |
| D5 | 7.06 | 4.32 | 0.94 |
| D10 | 1.80 | 9.05 | 21.34 |
| D19 | 11.69 | 5.15 | 0.66 |

| | Aspheric Coefficient | | |
|---|---|---|---|
| R19 | K = $-2.924 \times 10^{-1}$ | A = 0 | B = $1.535 \times 10^{-5}$ |
| | C = $-6.564 \times 10^{-9}$ | D = $-5.435 \times 10^{-10}$ | E = 0 |

Numerical Example 4:

f = 28.84–101.50  Fno = 1:3.5–8.2  2ω = 73.8°–24.1°

| R1 = −88.02 | D1 = 1.30 | N1 = 1.77250 | ν1 = 49.6 |
| R2 = 46.12 | D2 = 1.04 | | |
| R3 = 45.13 | D3 = 2.90 | N2 = 1.80518 | ν2 = 25.4 |
| R4 = −149.73 | D4 = 1.20 | N3 = 1.65844 | ν3 = 50.9 |
| R5 = 38.02 | D5 = Variable | | |
| R6 = 37.38 | D6 = 1.00 | N4 = 1.84666 | ν4 = 23.8 |
| R7 = 18.65 | D7 = 2.90 | N5 = 1.48749 | ν5 = 70.2 |
| R8 = 157.55 | D8 = 0.30 | | |
| R9 = 27.35 | D9 = 3.10 | N6 = 1.60311 | ν6 = 60.7 |
| R10 = −51.26 | D10 = Variable | | |
| R11 = −17.43 | D11 = 0.87 | N7 = 1.64769 | ν7 = 33.8 |
| R12 = −64.45 | D12 = 1.10 | | |
| R13 = (Stop) | D13 = 1.00 | | |
| R14 = −291.09 | D14 = 0.80 | N8 = 1.48749 | ν8 = 70.2 |
| R15 = 37.16 | D15 = 2.68 | N9 = 1.84666 | ν9 = 23.8 |
| R16 = −43.91 | D16 = 4.45 | | |
| R17 = 38.10 | D17 = 1.10 | N10 = 1.84666 | ν10 = 23.8 |
| R18 = 12.77 | D18 = 5.60 | N11 = 1.58313 | ν11 = 59.4 |
| R19 = −23.29 | D19 = Variable | | |
| R20 = −54.35 | D20 = 4.00 | N12 = 1.84666 | ν12 = 23.8 |
| R21 = −18.59 | D21 = 0.20 | | |
| R22 = −21.49 | D22 = 1.30 | N13 = 1.80610 | ν13 = 41.0 |
| R23 = 82.65 | D23 = 5.75 | | |
| R24 = −16.50 | D24 = 1.50 | N14 = 1.78590 | ν14 = 44.2 |
| R25 = −44.14 | | | |

| Variable | Focal Length | | |
|---|---|---|---|
| Separation | 28.84 | 53.85 | 101.50 |
| D5 | 7.08 | 4.54 | 1.45 |
| D10 | 2.60 | 12.19 | 21.64 |
| D19 | 10.10 | 4.32 | 0.82 |

| | Aspheric Coefficient | | |
|---|---|---|---|
| R19 | K = $-2.757 \times 10^{-1}$ | A = 0 | B = $1.867 \times 10^{-5}$ |
| | C = $-1.440 \times 10^{-8}$ | D = $-3.877 \times 10^{-10}$ | E = 0 |

Numerical Example 5:

| f = 28.84–101.28 | Fno = 1:3.7–8.2 | 2ω = 73.8°–24.1° | |
|---|---|---|---|
| R1 = −95.52 | D1 = 1.30 | N1 = 1.77250 | ν1 = 49.6 |
| R2 = 32.09 | D2 = 1.15 | | |
| R3 = 53.75 | D3 = 1.20 | N2 = 1.71300 | ν2 = 53.8 |
| R4 = 28.12 | D4 = 0.42 | | |
| R5 = 27.91 | D5 = 2.60 | N3 = 1.80518 | ν3 = 25.4 |
| R6 = 105.55 | D6 = Variable | | |
| R7 = 34.52 | D7 = 0.90 | N4 = 1.84666 | ν4 = 23.8 |
| R8 = 18.13 | D8 = 2.50 | N5 = 1.48749 | ν5 = 70.2 |
| R9 = 91.80 | D9 = 0.30 | | |
| R10 = 29.06 | D10 = 2.80 | N6 = 1.61800 | ν6 = 63.4 |
| R11 = −50.01 | D11 = Variable | | |
| R12 = (Stop) | D12 = 1.40 | | |
| R13 = −16.92 | D13 = 0.80 | N7 = 1.64769 | ν7 = 33.8 |
| R14 = −64.83 | D14 = 1.10 | | |
| R15 = −103.91 | D15 = 0.80 | N8 = 1.48749 | ν8 = 70.2 |
| R16 = 27.47 | D16 = 2.68 | N9 = 1.84666 | ν9 = 23.8 |
| R17 = −44.26 | D17 = 3.43 | | |
| R18 = 46.80 | D18 = 1.10 | N10 = 1.84666 | ν10 = 23.8 |
| R19 = 12.37 | D19 = 5.60 | N11 = 1.58313 | ν11 = 59.4 |
| R20 = −21.95 | D20 = Variable | | |
| R21 = −62.18 | D21 = 3.60 | N12 = 1.84666 | ν12 = 23.8 |
| R22 = −20.46 | D22 = 0.15 | | |
| R23 = −23.83 | D23 = 1.30 | N13 = 1.80610 | ν13 = 41.0 |
| R24 = 138.77 | D24 = 5.31 | | |
| R25 = −17.74 | D25 = 1.50 | N14 = 1.78590 | ν14 = 44.2 |
| R26 = −52.95 | | | |

| Variable | Focal Length | | |
|---|---|---|---|
| Separation | 28.84 | 53.50 | 101.28 |
| D6 | 7.57 | 3.48 | 0.61 |
| D11 | 1.80 | 11.38 | 22.11 |
| D20 | 12.37 | 5.84 | 0.67 |

| Aspheric Coefficient | | | |
|---|---|---|---|
| R20 | K = −9.971 × 10⁻¹ | A = 0 | B = 6.923 × 10⁻⁶ |
| | C = −4.313 × 10⁻⁸ | D = −1.302 × 10⁻⁹ | E = 2.974 × 10⁻¹³ |

Numerical Example 6:

| f = 30.90–107.02 | Fno = 1:3.5–9.0 | 2ω = 70.0°–22.9° | |
|---|---|---|---|
| R1 = −63.65 | D1 = 1.30 | N1 = 1.77250 | ν1 = 49.6 |
| R2 = 50.97 | D2 = 2.03 | | |
| R3 = 35.27 | D3 = 3.50 | N2 = 1.80518 | ν2 = 25.4 |
| R4 = −4607.45 | D4 = 0.50 | | |
| R5 = −327.52 | D5 = 1.20 | N3 = 1.65844 | ν3 = 50.9 |
| R6 = 40.32 | D6 = Variable | | |
| R7 = 33.94 | D7 = 1.00 | N4 = 1.84666 | ν4 = 23.8 |
| R8 = 17.30 | D8 = 2.90 | N5 = 1.48749 | ν5 = 70.2 |
| R9 = 128.62 | D9 = 0.30 | | |
| R10 = 29.59 | D10 = 2.80 | N6 = 1.60311 | ν6 = 60.7 |
| R11 = −48.87 | D11 = Variable | | |
| R12 = (Stop) | D12 = Variable | | |
| R13 = −16.66 | D13 = 0.85 | N7 = 1.64769 | ν7 = 33.8 |
| R14 = −69.94 | D14 = 1.17 | | |
| R15 = −310.27 | D15 = 0.80 | N8 = 1.48749 | ν8 = 70.2 |
| R16 = 38.90 | D16 = 2.68 | N9 = 1.84666 | ν9 = 23.8 |
| R17 = −43.33 | D17 = 4.51 | | |
| R18 = 38.70 | D18 = 1.10 | N10 = 1.84666 | ν10 = 23.8 |
| R19 = 13.51 | D19 = 5.60 | N11 = 1.58313 | ν11 = 59.4 |
| R20 = −21.49 | D20 = Variable | | |
| R21 = −75.00 | D21 = 3.70 | N12 = 1.84666 | ν12 = 23.8 |
| R22 = −19.10 | D22 = 0.20 | | |
| R23 = −20.77 | D23 = 1.30 | N13 = 1.80610 | ν13 = 41.0 |
| R24 = 63.09 | D24 = 5.32 | | |
| R25 = −17.24 | D25 = 1.50 | N14 = 1.78590 | ν14 = 44.2 |
| R26 = −50.00 | | | |

| Variable | Focal Length | | |
|---|---|---|---|
| Separation | 30.90 | 57.06 | 107.02 |
| D6 | 5.70 | 3.69 | 0.81 |
| D11 | 0.80 | 3.95 | 11.99 |
| D12 | 2.80 | 8.15 | 7.07 |
| D20 | 9.73 | 4.09 | 0.79 |

| Aspheric Coefficient | | | |
|---|---|---|---|
| R20 | K = −2.878 × 10⁻¹ | A = 0 | B = 2.060 × 10⁻⁵ |
| | C = 1.344 × 10⁻⁸ | D = −7.158 × 10⁻¹⁰ | E = 0 |

Numerical Example 7:

| f = 28.84–101.49 | Fno = 1:3.8–8.2 | 2ω = 73.8°–24.1° | |
|---|---|---|---|
| R1 = −89.96 | D1 = 1.30 | N1 = 1.77250 | ν1 = 49.6 |
| R2 = 31.72 | D2 = 1.19 | | |
| R3 = 56.05 | D3 = 1.20 | N2 = 1.71300 | ν2 = 53.8 |
| R4 = 28.28 | D4 = 0.88 | | |
| R5 = 27.97 | D5 = 2.60 | N3 = 1.80518 | ν3 = 25.4 |
| R6 = 115.76 | D6 = Variable | | |
| R7 = 32.45 | D7 = 0.90 | N4 = 1.84666 | ν4 = 23.8 |
| R8 = 17.70 | D8 = 2.50 | N5 = 1.48749 | ν5 = 70.2 |
| R9 = 97.69 | D9 = 0.30 | | |
| R10 = 30.58 | D10 = 2.80 | N6 = 1.61800 | ν6 = 63.4 |
| R11 = −50.59 | D11 = Variable | | |
| R12 = −17.19 | D12 = 0.87 | N7 = 1.64769 | ν7 = 33.8 |
| R13 = −65.18 | D13 = 1.10 | | |
| R14 = (Stop) | D14 = 0.70 | | |
| R15 = −135.55 | D15 = 0.80 | N8 = 1.48749 | ν8 = 70.2 |
| R16 = 29.17 | D16 = 2.68 | N9 = 1.84666 | ν9 = 23.8 |
| R17 = −46.54 | D17 = 3.52 | | |
| R18 = 43.19 | D18 = 1.10 | N10 = 1.84666 | ν10 = 23.8 |
| R19 = 12.16 | D19 = 5.60 | N11 = 1.58313 | ν11 = 59.4 |
| *R20 = −22.08 | D20 = Variable | | |
| R21 = −44.97 | D21 = 3.60 | N12 = 1.84666 | ν12 = 23.8 |
| R22 = −19.71 | D22 = 0.15 | | |
| R23 = −22.98 | D23 = 1.30 | N13 = 1.80400 | ν13 = 46.6 |
| R24 = −243.30 | D24 = 3.51 | | |
| R25 = −21.35 | D25 = 1.50 | N14 = 1.78800 | ν14 = 47.4 |
| R26 = −707.09 | | | |

| Variable | Focal Length | | |
|---|---|---|---|
| Separation | 28.84 | 53.45 | 101.49 |
| D6 | 7.17 | 2.94 | 0.49 |
| D11 | 2.60 | 12.69 | 23.55 |
| D20 | 11.94 | 5.96 | 0.80 |

| Aspheric Coefficient | | | |
|---|---|---|---|
| R20 | K = −2.834 × 10⁻¹ | A = 0 | B = 1.509 × 10⁻⁵ |
| | C = −2.356 × 10⁻⁸ | D = −1.656 × 10⁻⁹ | E = 0 |

Numerical Example 8:

| f = 28.84–83.43 | Fno = 1:3.9–7.4 | 2ω = 73.8°–29.0° | |
|---|---|---|---|
| R1 = −90.17 | D1 = 1.30 | N1 = 1.77250 | ν1 = 49.6 |
| R2 = 32.23 | D2 = 2.51 | | |
| R3 = 51.37 | D3 = 1.20 | N2 = 1.71300 | ν2 = 53.8 |
| R4 = 25.57 | D4 = 2.80 | N3 = 1.80518 | ν3 = 25.4 |
| R5 = 83.16 | D5 = Variable | | |
| R6 = 32.70 | D6 = 0.90 | N4 = 1.84666 | ν4 = 23.8 |
| R7 = 17.75 | D7 = 2.80 | N5 = 1.48749 | ν5 = 70.2 |
| R8 = 98.57 | D8 = 0.30 | | |
| R9 = 30.46 | D9 = 3.00 | N6 = 1.61800 | ν6 = 63.4 |
| R10 = −45.64 | D10 = Variable | | |

-continued

| R11 = (Stop) | D11 = 1.20 | | |
|---|---|---|---|
| R12 = -17.60 | D12 = 0.85 | N7 = 1.64769 | v7 = 33.8 |
| R13 = -63.35 | D13 = 1.92 | | |
| R14 = -107.89 | D14 = 0.80 | N8 = 1.48749 | v8 = 70.2 |
| R15 = 35.60 | D15 = 2.68 | N9 = 1.84666 | v9 = 23.8 |
| R16 = -46.75 | D16 = 3.85 | | |
| R17 = 46.78 | D17 = 1.10 | N10 = 1.84666 | v10 = 23.8 |
| R18 = 14.03 | D18 = 5.60 | N11 = 1.58313 | v11 = 59.4 |
| *R19 = -23.66 | D19 = Variable | | |
| R20 = -29.25 | D20 = 3.60 | N12 = 1.84666 | v12 = 23.8 |
| R21 = -17.86 | D21 = 2.81 | | |
| *R22 = -14.82 | D22 = 1.30 | N13 = 1.80610 | v13 = 41.0 |
| R23 = 183.33 | | | |

| Variable | Focal Length | | |
|---|---|---|---|
| Separation | 28.84 | 49.42 | 83.43 |
| D5 | 6.25 | 4.19 | 1.05 |
| D10 | 2.00 | 11.10 | 22.35 |
| D19 | 13.44 | 5.82 | 0.89 |

| Aspheric Coefficient | | | |
|---|---|---|---|
| R19 | K = -3.678 × 10⁻¹ | A = 0 | B = 1.757 × 10⁻⁵ |
| | C = 1.288 × 10⁻⁸ | D = -6.733 × 10⁻¹⁰ | E = 0 |
| R22 | K = 4.715 × 10⁻² | A = 0 | B = 1.556 × 10⁻⁵ |
| | C = 5.971 × 10⁻⁸ | D = 5.147 × 10⁻¹⁰ | E = 0 |

Numerical Example 9:

f = 28.85-101.49  Fno = 1:3.3-9.0  2ω = 73.7°-24.1°

| R1 = 163.89 | D1 = 3.25 | N1 = 1.51633 | v1 = 64.2 |
|---|---|---|---|
| R2 = -26.34 | D2 = 1.20 | N2 = 1.80400 | v2 = 46.6 |
| R3 = 16.98 | D3 = 1.21 | | |
| R4 = 18.93 | D4 = 2.50 | N3 = 1.84666 | v3 = 23.8 |
| *R5 = 108.28 | D5 = Variable | | |
| R6 = 16.38 | D6 = 0.90 | N4 = 1.84666 | v4 = 23.8 |
| R7 = 11.85 | D7 = 4.60 | N5 = 1.48749 | v5 = 70.2 |
| R8 = -19.38 | D8 = 0.90 | N6 = 1.84666 | v6 = 23.8 |
| R9 = -25.91 | D9 = Variable | | |
| R10 = ∞ (Stop) | D10 = 2.00 | | |
| *R11 = -24.61 | D11 = 2.07 | N7 = 1.8051B | v7 = 25.4 |
| R12 = -71.21 | D12 = 0.48 | | |
| R13 = -44.54 | D13 = 1.30 | N8 = 1.65160 | v8 = 58.5 |
| R14 = -317.49 | D14 = 5.00 | N9 = 1.77250 | v9 = 49.6 |
| *R15 = -13.39 | D15 = Variable | | |
| R16 = -33.60 | D16 = 2.30 | N10 = 1.84666 | v10 = 23.8 |
| R17 = -22.01 | D17 = 0.77 | | |
| R18 = -25.47 | D18 = 1.30 | N11 = 1.69680 | v11 = 55.5 |
| R19 = -654.85 | D19 = 4.11 | | |
| R20 = -18.51 | D20 = 1.50 | N12 = 1.77250 | v12 = 49.6 |
| R21 = -202.43 | | | |

| Variable | Focal Length | | |
|---|---|---|---|
| Separation | 28.85 | 54.11 | 101.49 |
| D5 | 7.30 | 4.25 | 0.29 |
| D9 | 1.00 | 5.83 | 8.72 |
| D15 | 10.18 | 4.20 | 0.79 |

| Aspheric Coefficient | | | |
|---|---|---|---|
| R3 | K = 2.790 × 10⁻¹ | A = 0 | B = -5.495 × 10⁻⁶ |
| | C = -1.753 × 10⁻⁸ | D = 0 | E = 0 |
| R11 | K = 5.794 × 10⁻¹ | A = 0 | B = -7.033 × 10⁻⁵ |
| | C = -5.377 × 10⁻⁷ | D = -8.804 × 10⁻⁹ | E = 0 |
| R15 | K = -2.657 × 10⁻¹ | A = 0 | B = -1.393 × 10⁻⁴ |
| | C = 1.880 × 10⁻⁷ | D = -2.909 × 10⁻⁹ | E = 0 |

TABLE 1

| | Numerical Example | | | | |
|---|---|---|---|---|---|
| Condition | 1 | 2 | 3 | 4 | 5 |
| (D1w - D1t)/(D2t - D2w) | 0.33 | 0.23 | 0.31 | 0.30 | 0.34 |
| \|f4/fw\| | 0.77 | 0.72 | 0.76 | 0.70 | 0.81 |
| φ1,2w · fw | 0.60 | 0.55 | 0.54 | 0.54 | 0.58 |
| β4w | 1.41 | 1.36 | 1.35 | 1.43 | 1.35 |
| f2/fw | 1.07 | 0.96 | 1.11 | 1.04 | 1.08 |
| f3/fw | 1.18 | 1.18 | 1.19 | 1.08 | 1.27 |
| β3w | 0.49 | 0.45 | 0.44 | 0.41 | 0.48 |
| v4N - v4P | 18.8 | 18.8 | 18.8 | 18.8 | 18.8 |

| | Numerical Example | | | |
|---|---|---|---|---|
| Condition | 6 | 7 | 8 | 9 |
| (D1w - D1t)/(D2t - D2w) | 0.44 | 0.32 | 0.26 | 0.91 |
| \|f4/fw\| | 0.64 | 0.77 | 0.92 | 0.65 |
| φ1,2w · fw | 0.57 | 0.60 | 0.60 | 0.78 |
| β4w | 1.51 | 1.42 | 1.33 | 1.50 |
| f2/fw | 1.00 | 1.19 | 1.30 | 1.11 |
| β3w | 0.41 | 0.42 | 0.45 | 0.51 |
| v4N - v4P | 18.8 | 23.2 | 17.2 | 28.8 |

According to the present invention, in the foregoing embodiment thereof, as the four lens units are used in total, the appropriate features or conditions for their zooming movements and refractive powers are set forth to thereby make it possible to provide a zoom lens having a field angle of about 74° in the wide-angle end and a zoom ratio of about 3.5, while still maintaining good stability of high optical performance over the entire zooming range to be achieved.

Next, another embodiment of the invention is described in connection with features which are characteristic thereof.

A zoom lens to which the features to be described later are applied comprises, from front to rear, a first lens unit of negative refractive power, a second lens unit of positive refractive power, a third lens unit of positive refractive power and a fourth lens unit of negative refractive power, all the lens units axially moving in such relation that, as compared with the wide-angle end, when in the telephoto end, the separations between the first and second lens units and between the third and fourth lens units are shorter, and the separation between the second and third lens units is longer. Among the first to fourth lens units, the fourth lens unit varies its lateral magnification at a highest ratio during zooming from one end to the other. For the first and second lens units, their overall refractive power φ1,2w is made positive, and the following condition in terms of the shortest focal length fw of the entire system is set forth:

$$0.4 < fw \cdot \phi1,2w < 1.2 \tag{9}$$

Another zoom lens comprises, from front to rear, a first lens unit of negative refractive power, a second lens unit of positive refractive power, a third lens unit of positive refractive power and a fourth lens unit of negative refractive power, all the units axially moving in such relation that, as compared with the wide-angle end, when in the telephoto end, the separations between the first and second lens units and between the third and fourth lens units are shorter, and the separation between the second and third lens units is longer, and the ratio of variation of the lateral magnification of the fourth lens unit being highest among the first to fourth lens units, wherein the third lens unit includes at least a lens whose front surface is exposed to air and concave toward the object side, and the focal length f4 of the fourth lens unit in terms of the shortest focal length fw of the entire system satisfies the following condition:

$$0.45<|f4/fw|<1.2 \quad (10)$$

In particular, the above-stated lens included in the third lens unit, or the one having that surface exposed to air and concave toward the object side is placed in the frontmost position, and this concave surface is formed to an aspheric shape such that the negative refractive power gets progressively stronger toward the margin.

Still another zoom lens comprises, from front to rear, a first lens unit of negative refractive power, a second lens unit of positive refractive power, a third lens unit of positive refractive power and a fourth lens unit of negative refractive power, the separations between the first and second lens units and between the third and fourth lens units being shorter when in the telephoto end than when in the wide-angle end, wherein the third lens unit includes a negative lens whose front surface is concave toward the object side and a positive lens positioned on the image side of the negative lens and whose rear surface is convex toward the image side, satisfying the following condition:

$$0.75<f3/fw<6.0 \quad (11)$$

where f3 is the focal length of the third lens unit and fw is the shortest focal length of the entire system.

In particular, this zoom lens is characterized by an aperture stop positioned in the space between the second and third lens units.

FIG. 38 to FIG. 44 in lens block diagram show numerical examples 10 to 16 of the invention, respectively. The aberrations of the numerical examples 10 to 16 of the invention are shown in FIGS. 45A to 65D.

In these drawings, reference character L1 denotes the first lens unit of negative refractive power ($\phi 1$), reference character L2 denotes the second lens unit of positive refractive power ($\phi 2$), reference character L3 denotes the third lens unit of positive refractive power ($\phi 3$) and reference character L4 denotes the fourth lens unit of negative refractive power ($\phi 4$). The arrows indicate the directions in which the lens units move during zooming from the wide-angle end to the telephoto end. Reference character SP stands for the stop, and reference character IP stands for the image plane.

In the present embodiment, all the lens units axially move forward in such relation that, during zooming from the wide-angle end to the telephoto end, the separations between the first and second lens units and between the third and fourth lens units decrease, and the separation between the second lens unit and the third lens unit increases.

This assures much-desired increases of the zoom ratio and the maximum field angle while still maintaining minimization of the bulk and size of the entire lens system to be achieved advantageously.

Next, the features of the paraxial power arrangement of the zoom lens which are characteristic of the present embodiment are described.

Assuming that the first lens unit (front unit) of the refractive power $\phi 1$ and the second lens unit (rear unit) of the refractive power $\phi 2$ are arranged in spaced relation by a principal point interval "e", then the overall refractive power $\phi 1,2$ of the whole lens system is given by the following expression:

$$\phi 1,2 = \phi 1 + \phi 2 - e \cdot \phi 1 \cdot \phi 2 \quad (a)$$

The present invention is to make up a front group from the negative first lens unit and the positive second lens unit arranged on setting in the wide-angle end to be spaced from each other by an appreciable distance. The front group thus takes the form of the retrofocus type as a whole. Because of this, the front group has its rear principal point placed on the image side. With the help of this feature, the principal point interval "e" is made shorter than ever, while still preventing the first and second lens units from mechanically interfering at their confronting surfaces with each other. In such a manner, the desired increase of the maximum field angle is achieved.

Also from the equation (a), it is to be understood that, if the refractive powers $\phi 1$ and $\phi 2$ are of opposite sign, decreasing of the principal point interval "e" provides a possibility of decreasing the the overall refractive power $\phi 1,2$. In other words, it is made possible for the second lens unit to achieve a function of increasing the image magnification.

Here, letting the overall focal length of the first and second lens units be denoted by f1,2, there is obtained the relationship: $f1,2=1/\phi 1,2$. As is understandable from this, decreasing of the value of the refractive power $\phi 1,2$ shifts the overall focal length to longer values.

In the invention, adjacent two lens units which are of opposite sign are first taken into account. Thus, the first and second lens units are paired up, and the third and fourth lens units are paired up. Then, the separation in each pair is made to get narrower as zooming goes from the wide-angle end to the telephoto end, thereby varying the overall focal length of each pair toward longer values. As a result, the pairs each become a telephoto lens system.

At this time, all the lens units are given such a refractive power arrangement and such total zooming movements that the ratio of variation of the lateral magnification of the fourth lens unit takes a highest value, as zooming goes from one end to the other. (Generally speaking, letting the lateral magnifications for the wide-angle end and the telephoto end of the i-th lens unit be denoted by $\beta it$ and $\beta iw$, respectively, the ratio of variation of the lateral magnification is defined by $\beta it/\beta iw$.) The thus-obtained strong telephoto function in the wide-angle end assures shortening of the total length of the entire system and, at the same time, minimization of the total zooming movement of each of the lens units.

Another feature is that the third and fourth lens units are so arranged to strengthen the negative refractive power aspect of their overall focal length as going from the wide-angle end to the telephoto end, and that the first and second lens units are so arranged that the positive refractive power aspect of their overall focal length always prevails throughout the entire zooming range. For the telephoto end, therefore, the entire system is made to have a strong telephoto function. Thus, a shortening of the total length of the entire system is assured with high efficiency.

The stop is positioned in the space between the second and third lens units so that the arrangement of the lens units in the entire system is nearly symmetric with respect to the stop, thus permitting all aberrations to be corrected in good balance throughout the entire zooming range. Incidentally, in the invention, for the focusing purposes, the third lens unit is moved forward as the object distance decreases.

Next, the rules of design for the constituent parts of the zoom lens of the invention are described successively.

The first and second lens units have a positive overall refractive power $\phi 1,2w$ in the telephoto end, satisfying the condition (9) in terms of the shortest focal length fw of the entire system. Thus, a good compromise is made between the reduction of the size of the entire system and the improvement of the optical performance.

The inequalities of condition (9) are concerned with the refractive power for the wide-angle end of the front group composed of the first and second lens units. When the upper limit is exceeded, as this implies that the refractive power of the front group is too strong in the wide-angle end, the function of the telephoto type becomes so strong that the predetermined value of the back focal distance is difficult to obtain. Moreover, strong under-correction of spherical aberration results in the front group, which is difficult to correct by any design of the other lens units.

When the lower limit of the condition (9) is exceeded, on the other hand, the total length of the entire system gets larger. To retain the shortest focal length at the predetermined value, the rear group composed of the third and fourth lens units has to strengthen the aspect of the positive refractive power. Therefore, the difficulty of correcting all aberrations in good balance throughout the entire zooming range is increased objectionably.

In the invention, particularly, the optical performance is to be improved. In this respect, it is desirable to alter the limits of the inequalities of condition (9) as follows:

$$0.6 < fw \cdot \phi 1,2w < 0.85 \qquad (9a)$$

Within the framework of the the zoom configuration described above, the third lens unit is better constructed with inclusion of at least one lens surface of negative refracting power exposed to air and concave toward the object side. This lens surface is used in effectively correcting the negative spherical aberration produced by the first and second lens units. So, the lens system, though being compact, holds good optical performance throughout the entire zooming range.

In this case, also for the focal length f4 of the fourth lens unit, the condition (10) is set forth in terms of the shortest focal length fw of the entire system.

The inequalities of condition (10) give a proper range for the refractive power of the fourth lens unit and have an aim chiefly to correct all aberrations in good balance with the limitation of the total length of the entire system to a minimum. When the upper limit of the condition (10) is exceeded, as this implies that the refractive power of the fourth lens unit is too weak, the zooming movement of the fourth lens unit contributes to a lesser variation of the focal length. As a result, the total zooming movement of each of the lens units has to be increased to obtain the certain zoom ratio, causing the physical length of the lens system to increase.

When the lower limit of the condition (10) is exceeded, the lens system in the wide-angle end gets too strong a telephoto type function, since the overall refractive power of the first to third lens units is positive and the refractive power of the fourth lens unit is negative. For this reason, the back focal distance of the lens system becomes too short. To secure the predetermined corner illumination, therefore, an increase of the outer diameter of the fourth lens unit is invited. At the same time, because the refractive power of that lens unit is too strong, field curvatures and astigmatism of higher order are produced, which are difficult to correct.

Again, for the fourth lens unit, a further condition is set forth as follows:

$$1.1 < \beta 4w < 1.9 \qquad (10a)$$

The inequalities of condition (10a) are concerned with the lateral magnification for the wide-angle end of the fourth lens unit. Now notice that the back focal distance Bfw for the wide-angle end of the lens system is expressed by:

$$Bfw = f4 \cdot (1 - \beta 4w)$$

On this account, the invention is to combine the condition (10) with the condition (10a). When these conditions are satisfied at once, a good compromise can be made between the shortening of the total length of the entire system and the correction of all aberrations.

When the upper limit of the condition (10a) is exceeded, the back focal distance is elongated more than necessary. The total length of the entire system is, therefore, caused to increase, which is objectionable to improve the compact form.

When the lower limit is exceeded, on the other hand, it becomes difficult to keep the back focal distance at any positive value. Therefore, the form and the arrangement of the fourth lens unit are so largely limited that the various aberrations become difficult to correct.

In the present invention, particularly the optical performance is improved. In this respect, it is desirable to alter the ranges of the conditions (10) and (10a) as follows:

$$0.5 < |f4/fw| < 0.8 \qquad (10b)$$

$$1.35 < \beta 4w < 1.65 \qquad (10c)$$

In addition, it is recommended that the third lens unit is constructed with inclusion of a lens whose front surface is exposed to air and concave toward the object side as arranged in the frontmost position. Such a concave curvature of the frontmost lens surface toward the object side is effective to correct longitudinal chromatic aberration within the third lens unit. Moreover, the lens surfaces on the image side in the third lens unit are allowed to use for correcting off-axial and on-axial aberrations in good balance.

It is then recommended that this lens surface that is concave toward the object side is formed to such an aspheric shape that the negative refractive power gets progressively stronger away from the optical axis. According to this, the high image quality is obtained even with a reduced total number of lens elements. Besides these, the negative spherical aberrations of higher order produced by the first and second lens units are well corrected over the entire zooming range.

For the refractive power $\phi 3A$ of this surface (in the case of using the aspheric sphere, the refracting power of the paraxial zone), the following condition (10d) is set forth to further improve the optical performance:

$$0.75 < 1/|\phi 3A \cdot f3| < 1.5 \qquad (10d)$$

where f3 is the focal length of the third lens unit.

The inequalities of condition (10d) have an aim to correct well, among others, spherical aberration over the entire zooming range. When the upper limit of the condition (10d) is exceeded, under-correction of spherical aberration results, which is difficult to correct well. When the lower limit is exceeded, over-correction of spherical aberration results, which is difficult to correct in good balance with the other aberrations. It is preferred to alter the condition (10d) as follows:

$$0.9 < 1/|\phi 3A \cdot f3| < 1.25 \qquad (10e)$$

When this condition is satisfied, an even more improved optical performance is obtained.

Next, within the framework of the above-described zoom configuration, the third lens unit is better constructed with a negative lens R3N having a concave surface facing the object side and, on the image side of it, a positive lens R3P having a convex surface of strong curvature facing the image side. Thereby the spherical aberration produced by the first and second lens units is corrected mainly by the negative lens R3N, while the off-axial aberrations are corrected by the positive lens R3P with high efficiency. Thus, good optical performance is obtained.

In particular, the negative lens R3N is formed to a meniscus shape convex toward the image side, and the positive lens R3P to a meniscus shape convex toward the image side. These forms are preferred, since aberrations of higher order can be well corrected.

For the focal length f3 of the third lens unit, the condition (11) is set forth in terms of the shortest focal length fw of the entire system. When this condition is satisfied, aberrations of higher order are well corrected particularly in the telephoto end.

The inequalities of condition (11) are concerned with the refractive power for the wide-angle end of the third lens unit. When the upper limit of the condition (11) is exceeded, as this implies that the refractive power of the third lens unit is weak, it is in one case that the refractive power of the other negative lens group has to be weakened to obtain the certain value of the shortest focal length, thereby causing the size of the lens system to increase. In another case where the positive lens unit in the front group is strengthened in the refractive power, spherical aberrations of higher order are produced in the telephoto end, which are difficult to correct.

Conversely when the lower limit is exceeded, as this implies that the refractive power of the third lens unit is too strong, the third and fourth lens units get too strong a function of the telephoto type. In some cases, therefore, it becomes difficult to obtain the back focal distance. In other cases, the fourth lens unit produces many aberrations, which are difficult to correct by any design of the other lens units.

If a particular emphasis is laid on the shortening of the total length for the wide-angle end of the entire system, it is desirable to alter the upper limit of the condition (11) to the following value:

$$0.75 < f3/fw < 2.0 \tag{11a}$$

To further improve the compact form of the entire lens system in good compromise with the correction of aberrations for high performance, it is preferred to further narrow the range between the upper and lower limits of the inequalities of condition (11) as follows:

$$0.85 < f3/fw < 1.3 \tag{11b}$$

Furthermore features are set forth for the focal length f2 of the second lens unit and the lateral magnification for the wide-angle end β3w of the third lens unit as follows:

$$0.8 < f2/fw < 1.7 \tag{12}$$

$$0.3 < \beta 3w < 0.7 \tag{13}$$

The inequalities of condition (12) are concerned with the refractive power of the second lens unit. When the upper limit of the condition (12) is exceeded, as this implies that the refractive power of the second lens unit is too weak, the zooming movement of the second lens unit gets longer, causing the size of the entire lens system to increase. When the lower limit is exceeded, the second lens unit produces strong spherical aberrations of higher order, which are difficult to correct.

The inequalities of condition (13) are concerned with the lateral magnification for the wide-angle end of the third lens unit. When the upper limit of the condition (13) is exceeded, the back focal distance gets shorter in the wide-angle end. As a result, an increase of the outer diameter of the third lens unit is invited. When the lower limit is exceeded, the refractive powers of the other lens units increase to obtain the certain focal lengths. As a result, it becomes difficult to correct the variation of aberrations with zooming.

In the invention, a high image quality is obtained. In this respect, it is preferred to narrow the ranges of the conditions (12) and (13) as follows:

$$0.9 < f2/fw < 1.35 \tag{12a}$$

$$0.4 < \beta 3w < 0.55 \tag{13a}$$

Even for the telephoto end, the total length of the entire system is shortened to achieve a zoom lens of better compact form. To this purpose, letting the longest focal length of the entire system be denoted by ft, and the overall refractive power for the telephoto end of the third and fourth lens units by φ3,4t, it is recommended to satisfy the following condition:

$$0.35 < 1/|ft \cdot \phi 3,4t| < 0.75 \tag{14}$$

When the upper limit of the condition (14) is exceeded, as this implies that the negative overall refractive power of the third and fourth lens units weakens in the telephoto end, the telephoto function of the entire lens system becomes weak, causing the total length of the entire system to increase.

When the lower limit is exceeded, on the other hand, as this implies that the refractive power of the fourth lens unit is too strong, distortion of pincushion type and coma are increased largely, which are difficult to correct.

The first lens unit is better constructed with at least one negative and one positive lenses, wherein it is desirable that this negative lens takes a form concave toward the object side.

The second lens unit is better constructed with at least one negative lens and at least one positive lens. Further, this negative lens and this positive lens are cemented together to form a cemented lens of positive overall refractive power, thereby correcting well chromatic aberrations and higher order spherical aberrations.

The third lens unit has its rearmost lens in the form of a positive lens of meniscus shape convex toward the image side. To apply an aspheric sphere to this positive lens is advantageous because it provides a lens surface amenable to the easy manufacturing technique of the aspheric surface. If it is made from plastic, another advantage of reducing the production cost is produced.

It is also desirable that the fourth lens unit is constructed from at least one negative lens having a concave surface of strong curvature facing the object side and at least one positive lens. Particularly for a case where the negative refractive power is made strong for minimization of the size, it is recommended that a positive lens of meniscus shape convex toward the image side, a negative lens having a concave surface of strong refracting power facing the object side and another negative lens having a concave surface of strong refracting power facing the object side are arranged in this order from the object side.

It is recommended that, letting the mean values of the Abbe numbers of the positive lenses and the negative lenses in the fourth lens unit be denoted by v4P and v4N, respectively, the following condition is satisfied:

$$18.0 < v4N - v4P < 35.0 \tag{15}$$

When the condition (15) is violated, large variation of chromatic aberrations with zooming is produced, which is difficult to correct by any design of the other lens units. Another aspheric surfaces may be introduced into the other lens units to facilitate the improvement of the optical performance.

To suppress the variation of aberrations with zooming, the entrance pupil must take an appropriate position. For this purpose, the stop is arranged in the space between the second and third lens units on zooming to move in unison with the second or third lens unit, for simplicity of the operating mechanism. It is also preferable to arrange it in one of the spaces within the third lens unit.

The stop, when zooming, may otherwise move axially in differential relation to the lens units. This makes it possible that, as the entrance pupil changes its position with zooming, the stop finds its place always near it. Thus, the curvature of field is effectively prevented from varying at a time when the size of the aperture opening is small.

In a case where the focusing lens unit contains the stop, the stop remains stationary during the time when the focusing lens unit moves. Thereby the driving torque can be reduced from that which would otherwise be necessary to move the diaphragm mechanism during focusing.

To maintain high optical performance during focusing, the third lens unit may be divided into two parts, the separation between which varies finely with focusing, that is, the so-called "floating" is carried out. This facilitates correction of varying aberrations with focusing.

Instead of using the third lens unit in focusing, the first lens unit may be moved forward. In this case, the amount of focusing movement for the same finite distance is maintained constant during zooming, thereby giving an advantage of simplifying the focusing control mechanism.

If the back focal distance is long enough in the wide-angle end, the fourth lens unit may be used in focusing, as it moves rearward to effect focusing. In this case, there is an advantage of reducing the diameter of the first lens unit. The second lens unit may be used in focusing. Two or more of the first to fourth lens units may be moved simultaneously to effect focusing.

Next, numerical examples 10 to 16 of the invention are shown. The values of the factors in the above-described conditions for the numerical examples 10 to 16 are listed in a Table-2.

Numerical Example 10:

$f = 28.84 - 101.06$ Fno $= 4.30 - 9.00$ $2\omega = 73.8° - 24.2°$

| R1 = −1498.59 | D1 = 2.60 | N1 = 1.51741 | v1 = 52.4 |
| R2 = −54.39 | D2 = 0.93 | | |
| R3 = −33.62 | D3 = 1.20 | N2 = 1.77249 | v2 = 49.6 |
| R4 = 27.91 | D4 = 2.80 | N3 = 1.84665 | v3 = 23.8 |
| R5 = 234.39 | D5 = Variable | | |
| R6 = 19.03 | D6 = 1.00 | N4 = 1.84665 | v4 = 23.8 |
| R7 = 13.96 | D7 = 4.00 | N5 = 1.48749 | v5 = 70.2 |
| R8 = −20.86 | D8 = 1.00 | N6 = 1.84665 | v6 = 23.8 |
| R9 = −27.47 | D9 = Variable | | |
| R10 = (Stop) | D10 = 2.67 | | |
| R11 = −24.77 | D11 = 1.19 | N7 = 1.80518 | v7 = 25.4 |
| R12 = −48.25 | D12 = 0.36 | | |
| R13 = −37.57 | D13 = 6.88 | N8 = 1.67790 | v8 = 55.3 |
| R14 = −12.32 | D14 = 0.30 | | |
| R15 = −19.26 | D15 = 2.50 | N9 = 1.58312 | v9 = 59.4 |
| R16 = −16.21 | D16 = Variable | | |
| R17 = −32.86 | D17 = 3.00 | N10 = 1.76181 | v10 = 26.6 |
| R18 = −17.84 | D18 = 0.20 | | |
| R19 = −25.77 | D19 = 1.30 | N11 = 1.69679 | v11 = 55.5 |
| R20 = −259.59 | R20 = 4.60 | | |
| R21 = −14.73 | D21 = 1.50 | N12 = 1.71299 | v12 = 53.8 |
| R22 = 152.09 | | | |

| Variable | Focal Length | | |
| --- | --- | --- | --- |
| Separation | 28.84 | 53.99 | 101.06 |
| D5 | 11.13 | 7.64 | 0.78 |
| D9 | 1.75 | 5.63 | 8.50 |
| D16 | 7.81 | 3.02 | 0.72 |

Aspheric Coefficient

R11:K = 4.915 A = 0 B = −1.142e-04 C = −8.696e-07
D = −1.000e-08
R15:K = 1.178 A = 0 B = 2.221e-05 C = 1.607e-07
D = 9.896e-10

Numerical Example 11:

$f = 28.80 - 101.50$ Fno $= 4.30 - 9.00$ $2\omega = 73.8° - 24.1°$

| R1 = 90.26 | D1 = 3.00 | N1 = 1.51633 | v1 = 64.2 |
| R2 = −55.45 | D2 = 0.75 | | |
| R3 = −34.98 | D3 = 1.20 | N2 = 1.80400 | v2 = 46.6 |
| R4 = 17.23 | D4 = 3.35 | N3 = 1.84665 | v3 = 23.8 |
| R5 = 74.82 | D5 = Variable | | |
| R6 = 16.04 | D6 = 1.00 | N4 = 1.84665 | v4 = 23.8 |
| R7 = 11.70 | D7 = 4.30 | N5 = 1.48749 | v5 = 70.2 |
| R8 = −20.39 | D8 = 1.00 | N6 = 1.84665 | v6 = 23.8 |
| R9 = −28.11 | D9 = Variable | | |
| R10 = (Stop) | D10 = 3.50 | | |
| R11 = −24.12 | D11 = 2.30 | N7 = 1.80518 | v7 = 25.4 |
| R12 = −47.22 | D12 = 0.33 | | |
| R13 = −38.22 | D13 = 1.20 | N8 = 1.65159 | v8 = 58.5 |
| R14 = 1021.77 | D14 = 5.08 | N9 = 1.74319 | v9 = 49.3 |
| R15 = −13.86 | D15 = 0.30 | | |
| R16 = −19.02 | D16 = 2.50 | N10 = 1.51633 | v10 = 64.2 |
| R17 = −15.76 | D17 = Variable | | |
| R18 = −31.65 | D18 = 2.30 | N11 = 1.84665 | v11 = 23.8 |
| R19 = −20.36 | D19 = 0.73 | | |
| R20 = −24.73 | D20 = 1.30 | N12 = 1.69679 | v12 = 55.5 |
| R21 = −1409.30 | D21 = 3.58 | | |
| R22 = −22.15 | D22 = 1.50 | N13 = 1.77249 | v13 = 49.6 |
| R23 = 119.15 | | | |

| Variable | Focal Length | | |
| --- | --- | --- | --- |
| Separation | 28.80 | 54.07 | 101.50 |
| D5 | 9.30 | 5.64 | 0.71 |
| D9 | 0.86 | 5.20 | 8.97 |
| D17 | 9.21 | 3.96 | 1.05 |

Aspheric Coefficient

R11:K = 4.711 A = 0 B = −8.846e-05 C = −3.733e-07
D = −4.433e-09
R15:K = −2.631 A = 0 B = −1.203e-04 C = 1.755e-07
D = −1.028e-09

Numerical Example 12:

$f = 28.80 - 101.37$ Fno $= 4.6 - 9.4$ $2\omega = 73.8° - 24.1°$

| R1 = −573.58 | D1 = 2.20 | N1 = 1.59270 | v1 = 35.3 |
| R2 = −52.10 | D2 = 0.80 | | |
| R3 = −33.07 | D3 = 1.20 | N2 = 1.83480 | v2 = 42.7 |
| R4 = 29.90 | D4 = 2.50 | N3 = 1.84665 | v3 = 23.8 |
| R5 = 959.06 | D5 = Variable | | |
| R6 = 18.95 | D6 = 0.90 | N4 = 1.84665 | v4 = 23.8 |

-continued

| | | | |
|---|---|---|---|
| R7 = 13.05 | D7 = 3.80 | N5 = 1.48749 | ν5 = 70.2 |
| R8 = −30.77 | D8 = Variable | | |
| R9 = ∞ | D9 = 3.43 | | |
| R10 = −23.97 | D10 = 1.13 | N6 = 1.80518 | ν6 = 25.4 |
| R11 = −81.04 | D11 = 0.37 | | |
| R12 = −43.64 | D12 = 6.83 | N7 = 1.69679 | ν7 = 55.5 |
| R13 = −12.52 | D13 = 0.20 | | |
| R14 = −19.81 | D14 = 2.50 | N8 = 1.58312 | ν8 = 59.4 |
| R15 = −16.60 | D15 = Variable | | |
| R16 = −30.85 | D16 = 2.70 | N9 = 1.80810 | ν9 = 22.5 |
| R17 = −19.09 | D17 = 1.18 | | |
| R18 = −31.69 | D18 = 1.30 | N10 = 1.77249 | ν10 = 49.6 |
| R19 = −98.62 | D19 = 3.84 | | |
| R20 = −16.03 | D20 = 1.50 | N11 = 1.77249 | ν11 = 49.6 |
| R21 = 142.27 | | | |

| Variable Separation | Focal Length | | |
|---|---|---|---|
| | 28.80 | 54.03 | 101.37 |
| D5 | 11.14 | 8.25 | 0.81 |
| D8 | 1.05 | 4.32 | 7.17 |
| D15 | 9.05 | 3.33 | 0.82 |

Aspheric Coefficient

R10:K = 4.913 A = 0 B = −1.102e−04 C = −9.315e−07
D = −7.563e−09
R14:K = 1.189 A = 0 B = 2.333e−05 C = 2.482e−07
D = 4.317e−10

Numerical Example 13:

f = 29.09 − 101.23 Fno = 4.6 − 9.4 2ω = 73.3° − 24.1°

| | | | |
|---|---|---|---|
| R1 = −710.58 | D1 = 2.20 | N1 = 1.59270 | ν1 = 35.3 |
| R2 = −49.11 | D2 = 0.70 | | |
| R3 = −33.11 | D3 = 1.20 | N2 = 1.83480 | ν2 = 42.7 |
| R4 = 29.53 | D4 = 0.28 | | |
| R5 = 30.80 | D5 = 2.50 | N3 = 1.84665 | ν3 = 23.8 |
| R6 = 606.20 | D6 = Variable | | |
| R7 = 19.06 | D7 = 0.90 | N4 = 1.84665 | ν4 = 23.8 |
| R8 = 13.20 | D8 = 3.80 | N5 = 1.48749 | ν5 = 70.2 |
| R9 = −30.69 | D9 = Variable | | |
| R10 = ∞ | D10 = 3.33 | | |
| R11 = −24.42 | D11 = 1.31 | N6 = 1.80518 | ν6 = 25.4 |
| R12 = −79.74 | D12 = 0.45 | | |
| R13 = −42.23 | D13 = 6.91 | N7 = 1.69679 | ν7 = 55.5 |
| R14 = −12.50 | D14 = 0.50 | | |
| R15 = −19.63 | D15 = 2.00 | N8 = 1.49171 | ν8 = 57.4 |
| R16 = −16.68 | D16 = Variable | | |
| R17 = −34.37 | D17 = 2.70 | N9 = 1.80518 | ν9 = 25.4 |
| R18 = −19.08 | D18 = 1.06 | | |
| R19 = −29.41 | D19 = 1.30 | N10 = 1.77249 | ν10 = 49.6 |
| R20 = −99.21 | D20 = 4.00 | | |
| R21 = −15.95 | D21 = 1.50 | N11 = 1.77249 | ν11 = 49.6 |
| R22 = 158.20 | | | |

| Variable Separation | Focal Length | | |
|---|---|---|---|
| | 29.09 | 54.27 | 101.23 |
| D6 | 11.14 | 8.17 | 0.66 |
| D9 | 1.02 | 4.32 | 7.18 |
| D16 | 8.84 | 3.07 | 0.59 |

Aspheric Coefficient

R1:K = 4.913 A = 0 B = −1.096e−04 C = −8.682e−07
D = −5.993e−09
R15:K = 1.189 A = 0 B = 2.496e−05 C = 1.855e−07
D = 1.056e−09
R16:K = −4.044e−05 A = 0 B = 1.201e−06 C = 3.462e−10
D = 7.001e−11

Numerical Example 14:

f = 28.80 − 101.55 Fno = 4.60 − 9.00 2ω = 73.8° − 24.1°

| | | | |
|---|---|---|---|
| R1 = −134.92 | D1 = 1.20 | N1 = 1.77249 | ν1 = 49.6 |
| R2 = 26.10 | D2 = 1.12 | | |
| R3 = 31.65 | D3 = 2.80 | N2 = 1.84665 | ν2 = 23.8 |
| R4 = 185.20 | D4 = Variable | | |
| R5 = 19.39 | D5 = 0.90 | N3 = 1.84665 | ν3 = 23.8 |
| R6 = 13.24 | D6 = 3.50 | N4 = 1.48749 | ν4 = 70.2 |
| R7 = −40.18 | D7 = Variable | | |
| R8 = (Stop) | D8 = 2.58 | | |
| R9 = −25.05 | D9 = 2.04 | N5 = 1.80518 | ν5 = 25.4 |
| R10 = −105.85 | D10 = 0.32 | | |
| R11 = −46.68 | D11 = 6.69 | N6 = 1.63853 | ν6 = 55.4 |
| R12 = −12.71 | D12 = 0.50 | | |
| R13 = −19.02 | D13 = 2.00 | N7 = 1.49171 | ν7 = 57.4 |
| R14 = −14.66 | D14 = Variable | | |
| R15 = −32.57 | D15 = 2.70 | N8 = 1.80518 | ν8 = 25.4 |
| R16 = −18.94 | D16 = 1.34 | | |
| R17 = −30.58 | D17 = 1.30 | N9 = 1.77249 | ν9 = 49.6 |
| R18 = −432.78 | D18 = 5.47 | | |
| R19 = −13.62 | D19 = 1.50 | N10 = 1.77249 | ν10 = 49.6 |
| R20 = −61.42 | | | |

| Variable Separation | Focal Length | | |
|---|---|---|---|
| | 28.80 | 54.08 | 101.55 |
| D4 | 14.44 | 10.40 | 1.03 |
| D7 | 0.80 | 3.99 | 8.73 |
| D14 | 9.84 | 3.56 | 0.33 |

Aspheric Coefficient

R9:K = 4.289 A = 0 B = −9.288e−05 C = −5.863e−07
D = −1.682e−08
R13:K = 1.209 A = 0 B = 1.540e−05 C = 2.439e−07
D = 1.040e−08
R14:K = −4.117e−03 A = 0 B = 7.248e−06 C = 1.622e−08
D = 7.433e−09

Numerical Example 15:

f = 28.44 − 101.50 Fno = 3.12 − 8.80 2ω = 74.5° − 24.1°

| | | | |
|---|---|---|---|
| R1 = −390.93 | D1 = 3.60 | N1 = 1.51633 | ν1 = 64.2 |
| R2 = −27.82 | D2 = 1.20 | N2 = 1.80400 | ν2 = 46.6 |
| R3 = 17.07 | D3 = 1.26 | | |
| R4 = 19.22 | D4 = 3.10 | N3 = 1.84665 | ν3 = 23.8 |
| R5 = 159.84 | D5 = Variable | | |
| R6 = 16.75 | D6 = 1.00 | N4 = 1.84665 | ν4 = 23.8 |
| R7 = 11.90 | D7 = 5.00 | N5 = 1.48749 | ν5 = 70.2 |
| R8 = −20.05 | D8 = 1.00 | N6 = 1.84665 | ν6 = 23.8 |
| R9 = −27.05 | D9 = Variable | | |
| R10 = (Stop) | D10 = 2.85 | | |
| R11 = −25.72 | D11 = 2.66 | N7 = 1.80518 | ν7 = 25.4 |
| R12 = −386.36 | D12 = 0.42 | | |
| R13 = −145.42 | D13 = 6.35 | N8 = 1.77249 | ν8 = 49.6 |
| R14 = −13.98 | D14 = Variable | | |
| R15 = −46.54 | D15 = 2.70 | N9 = 1.84665 | ν9 = 23.8 |
| R16 = −21.09 | D16 = 0.71 | | |
| R17 = −21.72 | D17 = 1.30 | N10 = 1.69679 | ν10 = 55.5 |
| R18 = 317.14 | D18 = 5.37 | | |
| R19 = −16.72 | D19 = 1.50 | N11 = 1.77249 | ν11 = 49.6 |
| R20 = −122.43 | | | |

| Variable Separation | Focal Length | | |
|---|---|---|---|
| | 28.44 | 53.72 | 101.50 |
| D5 | 8.42 | 5.55 | 1.73 |
| D9 | 0.50 | 4.58 | 6.87 |
| D14 | 9.83 | 3.75 | 0.37 |

Aspheric Coefficient

R3:K = 2.761 A = 0 B = −9.179e−06 C = 1.352e−08
D = −4.895e−10

-continued

R11:K = 5.796 A = 0 B = −7.867e-05 C = −3.755e-07
D = −1.085e-08
R14:K = −2.660 A = 0 B = −1.296e-04 C = 1.492e-07
D = −2.596e-09

Numerical Example 16:

| f = 28.80 − 101.90 Fno = 4.30 − 9.00 2ω = 73.8° − 24.0° | | | |
|---|---|---|---|
| R1 = 3404.17 | D1 = 2.30 | N1 = 1.62004 | ν1 = 36.3 |
| R2 = −57.38 | D2 = 0.70 | | |
| R3 = −36.48 | D3 = 1.20 | N2 = 1.77249 | ν2 = 49.6 |
| R4 = 32.86 | D4 = 2.50 | N3 = 1.84666 | ν3 = 23.8 |
| R5 = 122.84 | D5 = Variable | | |
| R6 = 18.90 | D6 = 1.00 | N4 = 1.84666 | ν4 = 23.8 |
| R7 = 12.83 | D7 = 3.70 | N5 = 1.48749 | ν5 = 70.2 |
| R8 = −30.30 | D8 = 0.80 | | |
| R9 = (Stop) | D9 = 3.00 | | |
| R10 = −24.30 | D10 = 1.00 | N6 = 1.80518 | ν6 = 25.4 |
| R11 = −50.40 | D11 = 0.33 | | |
| R12 = −26.42 | D12 = 6.34 | N7 = 1.56883 | ν7 = 56.3 |
| R13 = −11.46 | D13 = 0.30 | | |
| R14 = −20.57 | D14 = 2.40 | N8 = 1.58312 | ν8 = 59.4 |
| R15 = −14.03 | D15 = Variable | | |
| R16 = −33.15 | D16 = 2.80 | N9 = 1.76182 | ν9 = 26.5 |
| R17 = −17.96 | D17 = 0.48 | | |
| R18 = −28.79 | D18 = 1.30 | N10 = 1.80400 | ν10 = 46.6 |
| R19 = −191.80 | D19 = 4.92 | | |
| R20 = −14.04 | D20 = 1.50 | N11 = 1.71299 | ν11 = 53.8 |
| R21 = 496.93 | | | |

| Variable | Focal Length | | |
|---|---|---|---|
| Separation | 28.80 | 64.17 | 101.90 |
| D5 | 11.50 | 8.18 | 0.84 |
| D9 | 3.00 | 5.48 | 9.16 |
| D15 | 8.23 | 3.28 | 0.89 |

Aspheric Coefficient

R10:K = 4.423 A = 0 B = −1.338e-04 C = −1.129e-06
D = −1.539e-08
R14:K = 1.573 A = 0 B = 1.443e-05 C = 2.847e-07
D = 8.847e-10

TABLE-2

| Condition | Numerical Example | | | | | | |
|---|---|---|---|---|---|---|---|
| | 10 | 11 | 12 | 13 | 14 | 15 | 16 |
| fw·φ1,2w | 0.68 | 0.68 | 0.69 | 0.73 | 0.66 | 0.75 | 0.69 |
| |f4/fw| | 0.57 | 0.61 | 0.64 | 0.65 | 0.70 | 0.65 | 0.60 |
| β4w | 1.55 | 1.47 | 1.47 | 1.47 | 1.44 | 1.46 | 1.53 |
| 1/|φ3A·f3| | 1.14 | 1.08 | 0.99 | 0.98 | 0.98 | 0.98 | 1.09 |
| f2/fw | 1.09 | 1.02 | 1.07 | 1.05 | 1.22 | 1.06 | 1.07 |
| f3/fw | 0.94 | 0.97 | 1.04 | 1.06 | 1.11 | 1.15 | 0.96 |
| β3w | 0.44 | 0.46 | 0.47 | 0.48 | 0.46 | 0.51 | 0.45 |
| 1/|ft·φ3,4t| | 0.53 | 0.54 | 0.56 | 0.56 | 0.62 | 0.43 | 0.54 |
| ν4N−ν4P | 28.1 | 28.8 | 27.1 | 24.2 | 24.2 | 28.8 | 23.7 |

According to the invention, as has been described above, the four lens units are used in total, and the appropriate rules of design for these lens units with respect to the zooming movement and the refractive power are set forth to achieve a zoom lens having a maximum field angle of about 74° and a zoom ratio of about 3.5, while still maintaining good stability of high optical performance throughout the zooming range.

What is claimed is:

1. A zoom lens comprising, from front to rear, a first lens unit of negative refractive power, a second lens unit of positive refractive power, a third lens unit of positive refractive power and a fourth lens unit of negative refractive power, zooming being performed by varying each separation between said first to fourth lens units in such a manner that, as compared with a wide-angle end, when in a telephoto end, separations between said first lens unit and said second lens unit and between said third lens unit and said fourth lens unit are shorter and a separation between said second lens unit and said third lens unit is longer, wherein letting the separations for the wide-angle end and the telephoto end between said first lens unit and said second lens unit be denoted by D1w and D1t, respectively, and the separations for the wide-angle end and the telephoto end between said second lens unit and said third lens unit be denoted by D2w and D2t, respectively, the following condition is satisfied:

$$D1w - D1t < D2t - D2w$$

2. A zoom lens according to claim 1, wherein letting the focal length of the i-th lens unit be denoted by fi, the shortest focal length of the entire system by fw, the overall refractive power for the wide-angle end of said first lens unit and said second lens unit by φ1,2w and the lateral magnification for the wide-angle end of the i-th lens unit by βiw, the following conditions are satisfied:

$$0.5 < |f4/fw| < 1.5$$

$$0.3 < \phi1,2w \cdot fw < 1.0$$

$$1.1 < \beta4w < 1.8.$$

3. A zoom lens comprising, from front to rear, a first lens unit of negative refractive power, a second lens unit of positive refractive power, a third lens unit of positive refractive power and a fourth lens unit of negative refractive power, zooming being performed by varying each separation between said first to fourth lens units in such a manner that, as compared with a wide-angle end, when in a telephoto end, separations between said first lens unit and said second lens unit and between said third lens unit and said fourth lens unit are shorter and a separation between said second lens unit and said third lens unit is longer, wherein a ratio of variation of the lateral magnification of said fourth lens unit during zooming is highest among said first to fourth lens units, and, letting the overall refractive power for the wide-angle end of said first lens unit and said second lens unit be denoted by φ1,2w, the overall refractive power φ1,2w is positive and satisfies the following condition:

$$0.4 < fw \cdot \phi1,2w < 1.2$$

where fw is the shortest focal length of the entire system.

4. A zoom lens comprising, from front to rear, a first lens unit of negative refractive power, a second lens unit of positive refractive power, a third lens unit of positive refractive power and a fourth lens unit of negative refractive power, zooming being performed by varying each separation between said first to fourth lens units in such a manner that, as compared with a wide-angle end, when in a telephoto end, separations between said first lens unit and said second lens unit and between said third lens unit and said fourth lens unit are shorter and a separation between said second lens unit and said third lens unit is longer, wherein a ratio of variation of the lateral magnification of said fourth lens unit during zooming is highest among said first to fourth lens units, said third lens unit includes at least one lens having a concave surface exposed to air and facing an object side, and said fourth lens unit satisfies the following condition:

$$0.45 < |f4/fw| < 1.2$$

where f4 is the focal length of said fourth lens unit and fw is the shortest focal length of the entire system.

5. A zoom lens according to claim 4, wherein said lens having the concave surface takes the frontmost position in said third lens unit.

6. A zoom lens according to claim 5, wherein said concave surface is formed to such aspheric shape that a negative refracting power gets progressively stronger toward a lens margin.

7. A zoom lens comprising, from front to rear, a first lens unit of negative refractive power, a second lens unit of positive refractive power, a third lens unit of positive refractive power and a fourth lens unit of negative refractive power, separations between said first lens unit and said second lens unit and between said third lens unit and said fourth lens unit being shorter when in a telephoto end than when in a wide-angle end, wherein said third lens unit includes a negative lens having a concave surface facing an object side and, on an image side of said negative lens, a positive lens having a convex surface facing the image side, and satisfies the following condition:

$$0.75 < f3/f2 < 6.0$$

where f3 is the focal length of said third lens unit and fw is the shortest focal length of the entire system.

8. A zoom lens according to claim 7, further comprising an aperture stop located between said second lens unit and said third lens unit.

* * * * *

UNITED STATES PATENT AND TRADEMARK OFFICE
CERTIFICATE OF CORRECTION

PATENT NO. : 5,523,888  
DATED : June 4, 1996  
INVENTOR(S) : Akihiro NISHIO

It is certified that error appears in the above-indentified patent and that said Letters Patent is hereby corrected as shown below:

COLUMN 1:

Line 27, "mainstream." should read --mainstream use.--.

COLUMN 4:

Line 25, "FIGS. 49A!D" should read --FIGS. 49A-49D--.

COLUMN 9:

Line 51, "(v)" should read --(vi)--.

COLUMN 15:

Line 43, "N7 = 1.8051B" should read --N7 = 1.80518--.

COLUMN 16:

Line 29, "f2/fw  1.00   1.19   1.30   1.11"  
should read  
--f2/fw  1.00   1.07   1.03   0.99  
  f3/fw  1.00   1.19   1.30   1.11--.

UNITED STATES PATENT AND TRADEMARK OFFICE
CERTIFICATE OF CORRECTION

PATENT NO. : 5,523,888
DATED : June 4, 1996
INVENTOR(S) : Akihiro NISHIO

It is certified that error appears in the above-indentified patent and that said Letters Patent is hereby corrected as shown below:

<u>COLUMN 30</u>:

Line 7, "$0.75<f3/f2<6.0$" should read --$0.75<f3/fw<6.0$--.

Signed and Sealed this

Thirty-first Day of December, 1996

Attest:

BRUCE LEHMAN

*Attesting Officer*   *Commissioner of Patents and Trademarks*